United States Patent [19]
Fancher

[11] Patent Number: 6,068,160
[45] Date of Patent: May 30, 2000

[54] PRESSURE CONTROL SYSTEM FOR FREE-FLOATING PISTON

[75] Inventor: Hershel Edward Fancher, New Albany, Ind.

[73] Assignee: Grand Soft Equipment Co., Louisville, Ky.

[21] Appl. No.: 09/193,567

[22] Filed: Nov. 16, 1998

Related U.S. Application Data

[63] Continuation-in-part of application No. 09/114,859, Jul. 13, 1998, which is a continuation of application No. 08/701,631, Aug. 22, 1996, Pat. No. 5,779,098.

[51] Int. Cl.[7] .................................................. B67D 5/22
[52] U.S. Cl. ........................... 222/41; 222/334; 222/389; 222/397
[58] Field of Search .................................... 222/152, 399, 222/389, 135, 105, 95, 23, 183, 327, 249, 334, 146.6, 444, 41, 397; 92/134

[56] References Cited

U.S. PATENT DOCUMENTS

| | | |
|---|---|---|
| 3,327,906 | 6/1967 | Gomann . |
| 4,886,189 | 12/1989 | Vanderjagt . |
| 5,048,724 | 9/1991 | Thomas . |
| 5,114,054 | 5/1992 | Watson . |
| 5,150,820 | 9/1992 | McGill . |
| 5,259,842 | 11/1993 | Plechinger et al. . |
| 5,405,054 | 4/1995 | Thomas . |
| 5,452,824 | 9/1995 | Danek et al. . |
| 5,492,249 | 2/1996 | Beach . |
| 5,779,098 | 7/1998 | Fancher ..................................... 222/41 |

*Primary Examiner*—Philippe Derakshani
*Attorney, Agent, or Firm*—Dorr, Carson, Sloan & Birney, P.C.

[57] ABSTRACT

An apparatus and method are disclosed to dispense a product out of a receptacle by moving a free-floating piston back and forth within the receptacle. Pressurized gas is used to move the piston toward the product, thereby forcing the product out of the receptacle. The pressure on the piston is released by exhausting the pressurized gas out of the receptacle through a release valve. To retract the piston away from the product, the pressurized gas is sent through a venturi that connects to the receptacle via the same aperture that is used to deliver the pressurized gas to the receptacle. The flow of pressurized gas through the venturi creates a vacuum in the receptacle that pulls the piston away from the product.

20 Claims, 23 Drawing Sheets

Fig. 1

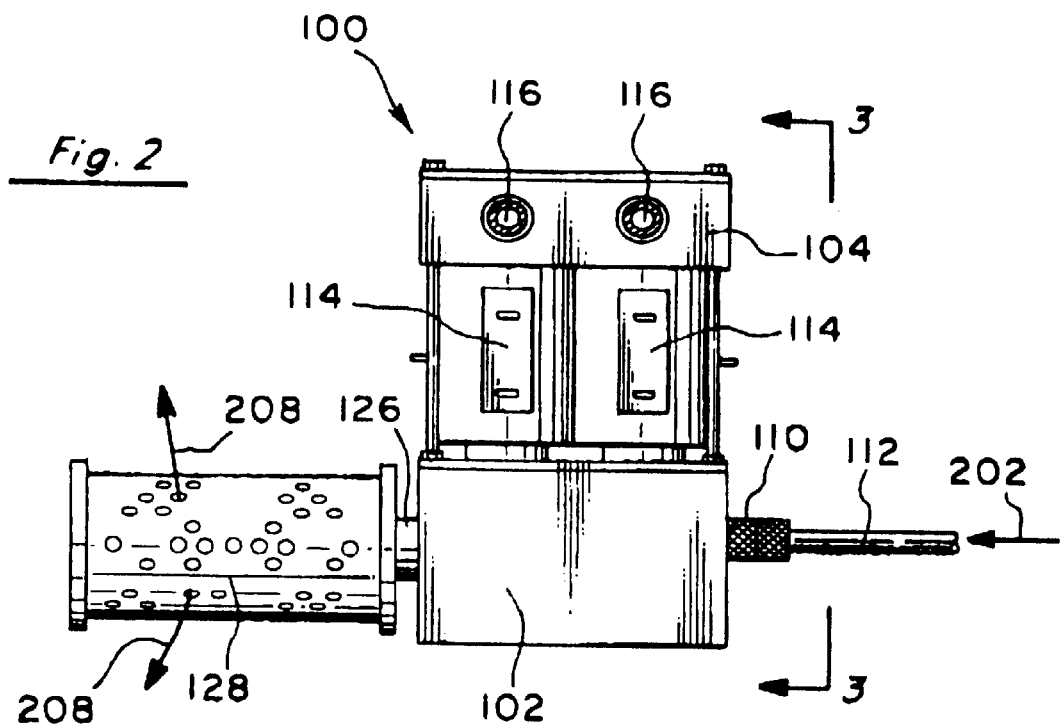
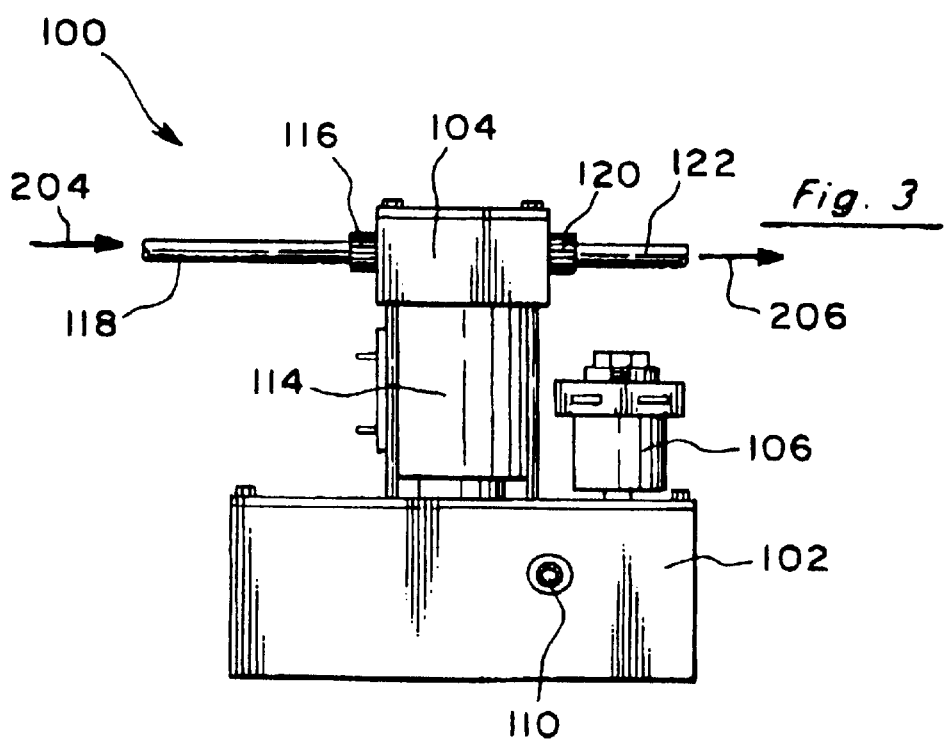

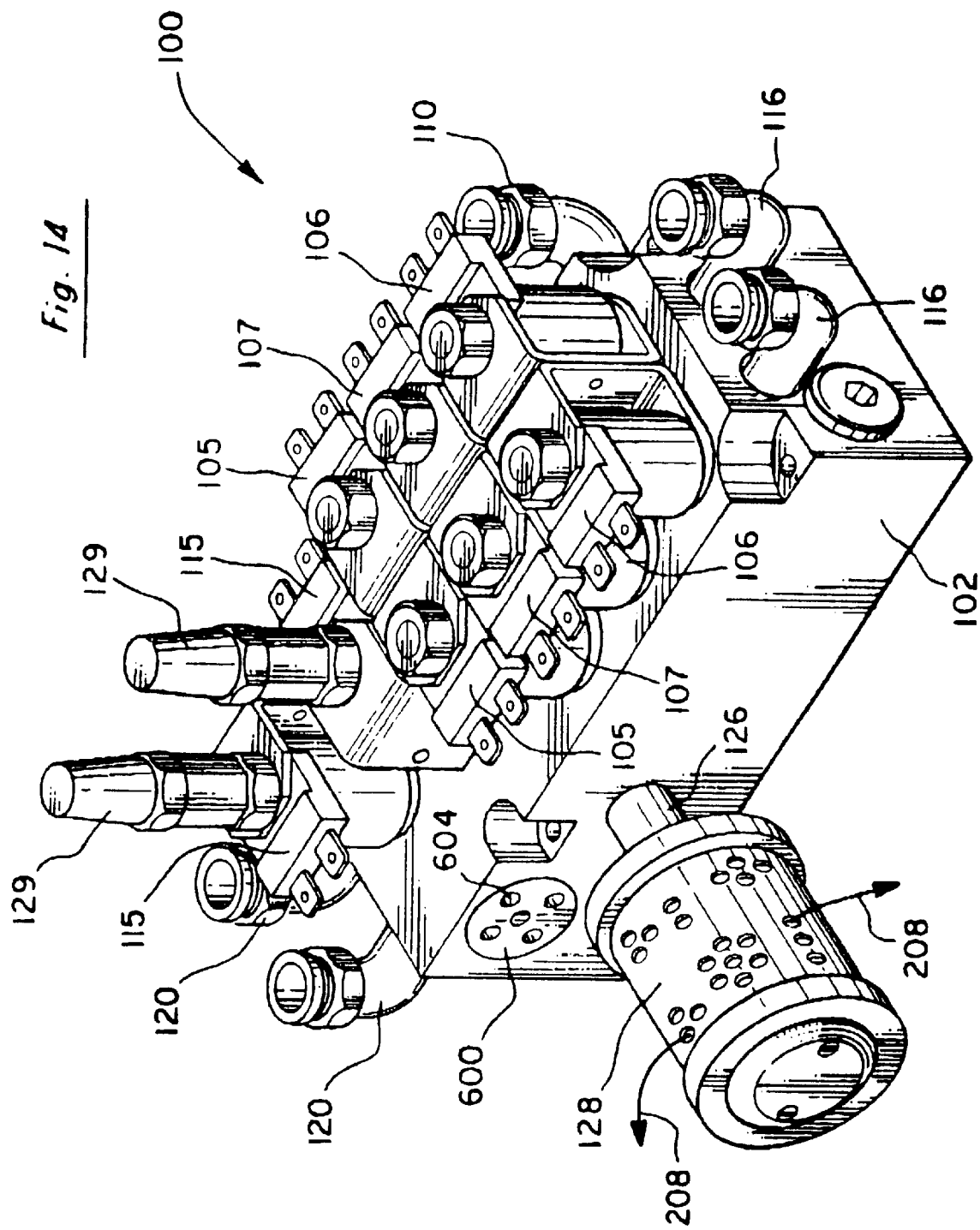

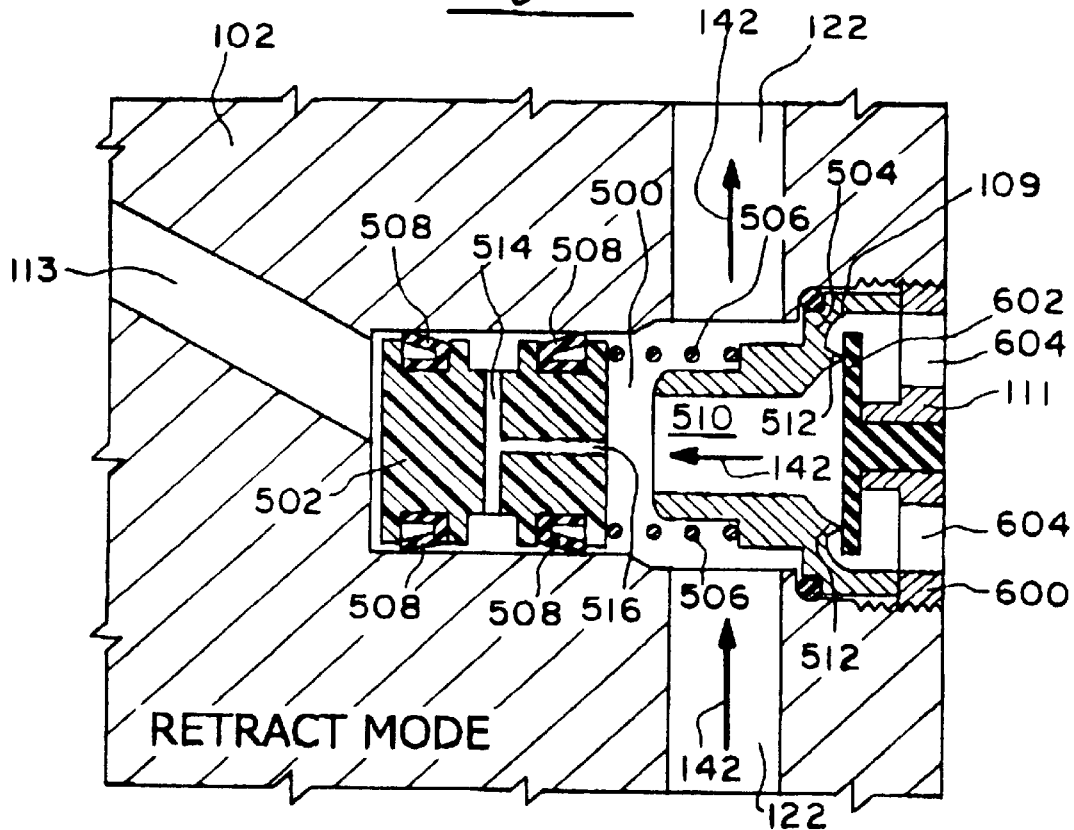
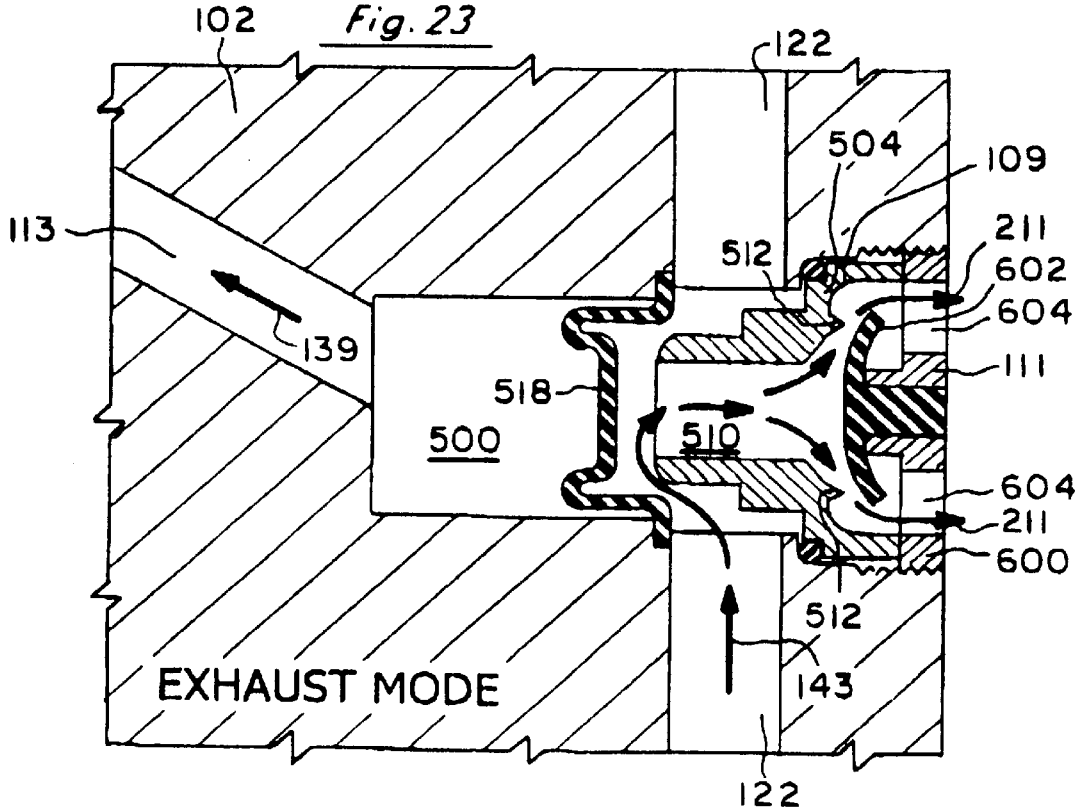

PRESSURE CONTROL SYSTEM FOR FREE-FLOATING PISTON

This application is a continuation in part of copending application Ser. No. 09/114,859, filed Jul. 13, 1998, which is a continuation of application Ser. No. 08/701,631, filed Aug. 22, 1996, which issued as U.S. Pat. No. 5,779,098 on Jul. 14, 1998.

BACKGROUND OF THE INVENTION

1. Field of the Invention

The present invention relates, in general, to pneumatically driven dispensers, and, more particularly, to using pressurized gas or air to control the dispensing of a food product.

2. Statement of the Problem

Frozen confections such as ice cream, yogurt, and sorbets are well-liked food items whose popularity has increased in recent years. As their popularity increases, so too does the necessity for dispensing these frozen confections to consumers in measured amounts quickly and easily. It is also desirable to provide a choice of flavors in one location, and to minimize the time needed to clean and refill the dispensers.

A variety of apparatuses have been developed for dispensing frozen confections quickly, easily, and in measured amounts. In general, to dispense a frozen confection, the confection is placed either directly in a receptacle or within a container that is then put in a receptacle. The confection is then forced out of the receptacle by, for example, a piston within the receptacle that is caused to move against the confection or against the collapsible container. The piston thus forces the confection out of an outlet in the receptacle.

Once the confection has been dispensed, it is necessary to retract the piston to clean the receptacle and/or insert additional confection for dispensing. Pistons can be driven by several conventional systems, for example, hydraulics, mechanical engines, or pneumatic systems. Pistons driven by hydraulic or mechanical systems are generally attached to the motive force by a driving shaft that extends from the back of the piston. The piston is both extended and retracted by the driving shaft.

Pistons driven by pneumatics are often "free floating" within their jackets or cylinders. Such free-floating pistons are extended by using pressurized gas to push against the back of the piston.

A search of the prior art in which pressurized gas is used to move a piston to dispense a product out of a receptacle discovered the following patents:

| Rowe | 5,265,764 | Nov. 30, 1993 |
|---|---|---|
| Beach | 5,492,249 | Feb. 20, 1996 |
| Gömann | 3,327,906 | June 27, 1967 |
| Vanderjagt | 4,886,189 | Dec. 12, 1989 |
| Thomas | 5,048,724 | Sep. 17, 1991 |
| Thomas | 5,405,054 | Apr. 11, 1995 |
| Watson | 5,114,054 | May 19, 1992 |
| McGill | 5,150,820 | Sept. 29, 1992 |
| Plechinger et al. | 5,259,842 | Nov. 9, 1993 |
| Danek et al. | 5,452,824 | Sept. 26, 1995 |

U.S. Pat. No. 5,265,764 issued to Rowe sets forth a dual-action free-floating piston within a cylinder. Gas pressure is used to drive the piston to dispense bagged frozen product. After the product is dispensed, the gas pressure is directed to the opposite side of the piston to drive the piston in the opposite direction.

U.S. Pat. No. 5,492,249 to Beach sets forth an apparatus that uses high-pressure air to move a free-floating piston toward the material to be dispensed. A safety device is provided so the apparatus cannot be opened until the air pressure is vented. The operator manually retracts the piston by pushing on it. This patent is assigned to the owner of the present invention.

U.S. Pat. No. 3,327,906 issued to Gömann discloses a piston in a cylinder. The piston is moved by a compressed fluid to dispense a paste contained in the cylinder. A suction generator is used to provide for better sealing of the piston to the cylinder and to remove any compressed fluid that escapes around the sides of the piston.

U.S. Pat. No. 4,886,189 to Vanderjagt teaches an approach for dispensing liquids in which a movable chamber slides down a stationary piston toward the liquid, which is kept in a separate chamber. Either air pressure or vacuum is used to move the chamber.

U.S. Pat. Nos. 5,048,724 and 5,405,054 to Thomas disclose a confection dispenser in which a collapsible container holding the confection is compressed in order to extrude the confection from the dispenser. Preferably, a bellows is used that is caused to expand by admitting pressurized air into the interior of the bellows. The expanding bellows pushes against the collapsible container. To replace the collapsible container, the air pressure inside the expanded bellows is released either automatically or manually.

U.S. Pat. No. 5,114,054 to Watson teaches a piston in a tank in which the piston is moved by air pressure.

U.S. Pat. No. 5,150,820 to McGill teaches a frozen product-dispensing apparatus in which a cylindrical deformable container holds the products. The container is compressed by a plunger that is moved by compressed air. The compressed air is applied either directly to the plunger or to a bellows that engages the plunger.

U.S. Pat. No. 5,259,842 to Plechinger et al. discloses a high-pressure liquid dispenser containing a pump piston. The pump piston is driven by a fluid-actuated drive.

U.S. Pat. No. 5,452,824 to Danek et al. teaches a syringe for automatically dispensing fluid dots. The plunger of the syringe is displaced by pressurized air.

The pistons can be retracted in several ways. In one way, as shown in the Rowe patent, the pressurized air is routed to the front of the piston to push it back. This system necessitates providing several apertures and more than one sealed pressure chamber. Frost, spilled product, and the product container itself may create a hindrance to sealing around the door at the dispensing end of the dispensing cylinder.

In another method of retraction, as for the Beach system, the piston is retracted manually by pushing against the product side of the piston by hand or with a rod after the pressurized air is released. This method may expose the operator's garments and skin to lubricants used for the piston and to spilled product, thus soiling the operator's clothing. Another, potentially greater, negative aspect of this method is that great force (up to 100 lbf) may be required to push the piston back to its fully retracted position so that new product may be placed in the dispensing cylinder. Such great force may be required due to either lack of lubrication between the piston and the cylinder walls or the build-up of frost behind the piston resulting from chilling of the compressed air used to move the piston forward. Thus, a need exists to automate the release of pressurized gas and retraction of the piston without additional apertures or sealed pressure chambers.

Yet another method by which the piston may be retracted would be the use of a mechanical device to pull the piston back, such as a metal coil compression spring, elastic band (for example, surgical tubing), or a coil spring reel with a cable located within the cylinder connecting the bottom cap of the cylinder to the piston. All these options would occupy space in the cylinder and prevent the piston from contacting the bottom cap, thus requiring a longer cylinder to dispense a product container of fixed length. If any of these mechanical devices should break, the dispensing cylinder assembly will require disassembly to repair or replace the device. In addition, frost and ice build-up may prohibit the device from functioning or may increase the force required to move the piston to a quantity greater that that produced by the device. Many elastomeric materials often become rigid and lose their elastic properties when placed in a cold environment. Any of the previous listed mechanical devices would automatically pull the piston toward the bottom cap when gas pressure is released from the dispensing cylinder (for example, during a door opening to check product levels). This may cause a partially full product container to stretch back with the piston and cause a situation in which the product container may fold upon itself, thus blocking the flow of product.

Yet another difficulty frequently encountered is the freezing of an empty container to the top of the dispensing piston. A receptacle is often incorporated into the dispensing side of the piston for receiving and managing the collapsed container. The collapsed container often becomes adhered to the receptacle, requiring great force (more than 50 lbf) to remove. Thus, a need exists to provide variable force using the same source of pressurized air or gas without additional apertures or sealed pressure chambers.

The use of pressurized gas to move the piston presents additional problems. First, and most important, it is necessary to provide for a method to release the pressurized gas from the dispenser when the piston is not moving or when the dispenser is opened. This release of the pressurized gas prevents injury to operators should the dispenser be opened inadvertently. It is further desirable to release the gas as fast as possible so that the downtime in which no product is dispensed is minimized. Finally, it is desirable to release the pressurized gas without making any additional apertures in the dispenser.

None of the dispensing systems described above provides a method for pneumatically retracting a piston by supplying a pneumatic gas source to the same side of the piston that is used when extending the piston, using the same aperture and the same sealed pressure chamber. Neither do any of the dispensing systems described above provide a system having three automatic modes of operation: a dispensing mode, a retraction mode, and a resting or exhaust mode.

SOLUTION TO THE PROBLEM

The present invention provides a dispensing control system for frozen food products or other viscous materials in which pressurized gas or air moves a free-floating piston in a dispensing cylinder in a dispenser toward the product, forcing the product out of the dispenser, and in which the same pressurized gas is used to create a vacuum that retracts the piston by creating a negative pressure on the same side of the piston on which the dispensing pressure is applied, and in which the pressurized gas can be released quickly. Both the pressurized gas and the vacuum are delivered to the dispenser through the same aperture. The invention also includes a release valve by which pressurized gas or air used during dispensing may be quickly and completely vented from the dispensing cylinder via the same aperture that is used for pressurization. The system is quickly and easily cleaned, and there is no likelihood that the system will be damaged by the retraction or removal of the piston. The dispensing control system is compact, so that it can be used on a countertop. Several dispensers can be run from a common pressurized air or gas source.

It is an object of the present invention to provide a system for pneumatically dispensing a product with a free-floating piston in which the system uses a common source of pressurized gas or air for both extending and retracting the piston.

It is a further object of the present invention to provide a pneumatic dispensing control system for products in which a vacuum is used to retract a free-floating piston after the product is dispensed or when it is desired to retract the piston.

It is an object of the present invention to use a common pressurized gas or pressurized air source both to extend the piston and to provide the vacuum that retracts the piston.

It is another object of the present invention to provide a quick release valve to release any pressure on the piston when the product is not being dispensed or when the dispenser or the door to the dispensing casing is opened.

It is yet another object of the present invention to provide a pneumatic dispensing control system that has only one pressure chamber.

It is another object of the present invention to provide a pneumatic dispensing control system for products in which several dispensing cylinders can be run simultaneously from the same source of pressurized gas or air.

It is a further object of this invention to provide a means to retract the piston (which may require the generation of great force [up to 100 lbf] to break the piston free of any frost build-up) without the addition of any devices inside of the cylinder or additional seals or pressure orifices around the door.

SUMMARY OF THE INVENTION

The present invention discloses a system for pneumatically dispensing a frozen (between 5 degrees and 15 degrees Fahrenheit) confection or other food product, using relatively low-pressure gas or air (between 15 and 60 psi). The invention comprises a dispensing assembly that contains a receptacle for holding the product. The receptacle contains a pressure chamber and a free-floating piston that slides back and forth within the receptacle. The receptacle may also have a door at an end of the receptacle, through which the product or a container holding the product is inserted. The dispensing assembly may be placed within an enclosing casing having a door.

The present invention comprises three modes of operation: a dispensing mode, a retraction mode, and an exhaust mode. The pneumatic dispensing control system of the present invention delivers pressurized gas or air (the terms "air" and "gas" are used interchangeably in this patent specification) into the pressure chamber of the receptacle when it is in the dispensing mode, and generates a vacuum in the pressure chamber of the receptacle when it is in the retraction mode. The pressurized gas in the dispensing mode causes the piston to move toward the product, forcing the product out of the receptacle. The vacuum in the retraction mode pulls the piston away from the product. When neither pressurized gas or vacuum is delivered to the receptacle, the pneumatic dispensing control system is in the exhaust mode. When the system is in exhaust mode, the piston is stationary, and the gas pressure in the receptacle is that of the ambient atmosphere.

The receptacle is divided into two chambers, a product chamber and a pressure chamber. The pressure chamber is formed in the receptacle by the pressure side of the piston, the receptacle surface, and a first end of the receptacle. An aperture is cut into the pressure chamber and is connected by a line to a source of pressurized gas and to a vacuum generator. A plurality of valves is placed between the source of pressurized gas and the receptacle. The valves include a three-way valve and at least one two-way valve. The valves may also include a release valve and a check valve. A vacuum generator comprising a venturi is placed between the pressurized gas source and an exhaust port.

The product chamber is formed by a second end of the receptacle, or by a door at the second end of the receptacle, the receptacle surface, and the dispensing side of the piston. The product can be placed either directly in the product chamber or in a container that is then placed in the product chamber. The container can be, for example, a flexible bag or a tube with accordion walls. Other types of containers will be readily evident to those skilled in the art. The container has the advantages of increasing the cleanliness of the dispensing system and making replacement of the product easier.

In a first preferred embodiment, a three-way valve is in fluid communication with the source of pressurized gas, the receptacle, and the venturi. A two-way valve is in fluid communication with the source of pressurized gas and the venturi.

Depending on the settings of the valves, either pressurized gas or vacuum is delivered to the pressure chamber in the receptacle, or the pressure in the pressure chamber is exhausted to the atmosphere. To deliver pressurized gas to the pressure chamber to dispense the product, the three-way valve is opened between the source of pressurized gas and the pressure chamber and closed to the venturi. The two-way valve is closed between the source of pressurized gas and the venturi. Thus, pressurized gas travels to the pressure chamber, where it pushes the piston toward the product, which is contained in the receptacle on the opposite side of the piston from the pressure chamber.

When neither pressurized gas nor vacuum is delivered to the pressure chamber, the pneumatic dispensing control system is in the exhaust mode. This would occur, for example, when a desired portion of product has been dispensed. When the pneumatic dispensing control system is in the exhaust mode, the piston is stationary, and the gas pressure in the pressure chamber is that of the ambient atmosphere. To achieve this state in the first preferred embodiment, the three-way valve is closed between the source of pressurized gas and the pressure chamber and opened between the pressure chamber and the venturi. The two-way valve is closed between the source of pressurized gas and the venturi. The pressurized gas remaining in the pressure chamber after the dispensing of the product thus exits the pressure chamber via the three-way valve to the venturi, from which it leaves the system through the exhaust port.

When the piston is to be retracted, the vacuum generator generates a vacuum in the pressure chamber in the following manner. The three-way valve is closed between the source of pressurized gas and the pressure chamber, and opened between the pressure chamber and the venturi. The two-way valve is opened between the source of pressurized gas and the venturi. Thus, pressurized gas flows through the two-way valve, through the venturi, and out the exhaust port. The pressurized gas flowing through the venturi increases in velocity as it passes through the venturi. This increase in velocity causes a corresponding decrease in the gas pressure, generating a vacuum in the pressure chamber, which is in fluid communication with the venturi via the three-way valve. This vacuum then retracts the piston away from the product. When the piston has been retracted the desired amount, the valves are positioned in the exhaust mode as described above, and air at atmospheric pressure enters the system, displacing the vacuum, and halting the movement of the piston.

In a second preferred embodiment of the present invention, a three-way valve, two two-way valves, a release valve run by gas pressure through a signal input line, a venturi, and at least one check valve are used to move the piston. In the second preferred embodiment, the three-way valve is in fluid communication with the source of pressurized gas, the pressure chamber in the receptacle, the signal input line of the release valve, and an exhaust port. The release valve is in fluid communication with the pressure chamber. A first two-way valve is in fluid communication with the pressurized gas source and a vacuum generator comprising a venturi. A second two-way valve is in fluid communication with the pressure chamber and the venturi. A check valve is located at the end of the outlet of the release valve. This check valve comprises a rubber disk that closes against a raised rim of the release valve outlet when air tries to enter through the release valve.

In the dispensing mode of the second preferred embodiment, the three-way valve is open between the pressurized gas source, the signal input line to the release valve, and the pressure chamber of the receptacle. The exhaust port of the three-way valve is closed. All the two-way valves are closed. The pressurized gas thus flows through the three-way valve to the pressure chamber, where it pushes the piston toward the product, as in the first preferred embodiment. The pressurized gas also flows into the signal input line to the release valve, causing the release valve to close so that no pressurized gas is exhausted through the release valve.

When the pneumatic dispensing control system is switched to the exhaust mode or the door of the casing is opened, the pneumatic dispensing control system of the second preferred embodiment is placed in the exhaust mode via a two-step process. In the first step, the three-way valve is closed between the source of pressurized gas and the pressure chamber and opened between the pressure chamber/signal input line to the release valve and the exhaust port of the three-way valve. This allows the pressure in the signal input line to exhaust through the exhaust port of the three-way valve. A small amount of pressurized gas from the pressure chamber also exits through the exhaust port of the three-way valve. The two-way valves remain closed.

The lowering of the pressure in the signal input line begins the second step of the exhaust mode, in which the release valve responds to the low gas pressure in the signal input line and opens. The pressurized gas in the pressure chamber then flows out through the open release valve, equalizing the pressure in the pressure chamber with atmospheric pressure and releasing the pressure behind the piston. The exhaust through the release valve is significantly faster than the exhaust through the venturi of the first preferred embodiment.

When the piston is to be retracted, a vacuum is generated in the pressure chamber as follows. The three-way valve is closed between the source of pressurized gas and the pressure chamber and opened between the pressure chamber/ signal input line to the release valve and the exhaust port of the three-way valve. This will cause the release valve to open as described above for the exhaust mode. The first two-way valve is opened between the source of pressurized gas and the venturi of the vacuum generator. Thus, pressurized gas flows through the venturi and out the venturi exhaust port, generating a vacuum as in the first preferred embodiment. The second two-way valve is opened between the venturi and the pressure chamber. The vacuum generated by the venturi thus extends through the second two-way valve to the pressure chamber, retracting the piston away from the product. At the same time, the vacuum enters the release valve, pulling the check valve shut and thus preventing atmospheric air from entering the pneumatic dispensing control system through the release valve. Atmospheric air does enter through the exhaust port of the three-way valve, but the rate of air infiltration from this source does not affect piston retraction performance. A second check valve may be attached to the exhaust port of the three-way valve if desired to prevent such air infiltration.

Depending on the settings of the valves, either pressurized gas or vacuum is delivered to the pressure chamber, or the pressure chamber is exhausted to the atmosphere. In contrast to the first preferred embodiment described above, the second preferred embodiment enables the pressure chamber to be exhausted through a larger outlet than the venturi, thus reducing the time required to exhaust the pressure chamber. The second preferred embodiment also allows the use of much lower wattage solenoid valves due to the elimination of direct-acting, high-flow-rate/high-wattage valves such as those used in the first preferred embodiment. The pressure-piloted release valve can provide large flow rates while being operated by a low-wattage, low-flow-rate, direct-acting three-way solenoid valve. This reduction in wattage saves energy and reduces heat build-up in the mechanical compartment of the system.

In a third preferred embodiment of the present invention, a third two-way valve is added to the pneumatic dispensing control system. The third two-way valve is positioned between the source of pressurized gas and the pressure chamber. The three-way valve is no longer in fluid communication with the pressure chamber. The three-way valve is dedicated to opening and closing the release valve. This third preferred embodiment has the advantage of eliminating unwanted release of gas pressure when the dispensing pressure is reduced by returning the dispensing handle to its upright position. It also eliminates the need for a check valve on the outlet line of the three-way valve to prevent air from entering during retraction.

When dispensing product in the third preferred embodiment, the first two-way valve is opened between the pressurized gas source and the pressure chamber, enabling pressurized gas to flow into the pressure chamber to move the piston toward the product. The second and third two-way valves are closed. The three-way valve is opened between the pressurized gas source and the signal input line to the release valve and is closed to the three-way valve outlet, causing the release valve to close as described above so that the pressurized gas flowing from the first two-way valve to the pressure chamber is not diverted through the outlet of the release valve.

The exhaust mode of the third preferred embodiment occurs in two steps. In the first step of the exhaust mode, all the two-way valves are closed. The three-way valve is closed between the source of pressurized gas and the signal input line to the release valve and opened between the signal input line and the exhaust port of the three-way valve. This allows the pressurized gas in the signal input line to exhaust through the three-way valve. This pressure release causes the pneumatic dispensing control system to enter into the second step of the exhaust mode by opening the release valve, thus allowing the pressurized gas in the receptacle to flow out through the open release valve.

When the time comes to retract the piston, the three-way valve and the first two-way valve are closed. The second two-way valve is opened between the pressurized gas source and the venturi of the vacuum generator, and the third two-way valve is opened between the venturi and the receptacle. In the same manner as described above for the second preferred embodiment, the vacuum generated by the flow of the pressurized gas through the venturi closes the check valve located on the outlet of the release valve and enters the pressure chamber of the receptacle, retracting the piston away from the product.

The present invention has the advantage of not requiring an arm attached to the piston or a push rod to retract the piston, avoiding possible damage to the system and increasing cleanliness. This lack of a retraction device means that the receptacle does not require disassembly to repair or replace a retraction device.

The present invention has the further advantage that a single aperture delivers both the pressurized gas and the vacuum to the receptacle, so that only one sealed pressure chamber is necessary, and neither the pressurized gas nor the vacuum comes into contact with the product being dispensed. Because of this single aperture, there is no need to seal around the product-loading door of the receptacle, as no high-pressure gas is ever applied to the product chamber. Further, the piston can be advanced and retracted using the same source of pressurized gas. An additional vacuum source is not necessary.

Yet another advantage of the present invention is that several dispenser systems can be run from the same source of pressurized gas. The system is compact enough to fit on a countertop, and uses only small amounts of electricity to run the valves.

The present invention eliminates exposure of the operator's garments and skin to piston lubricants and to spilled product, which exposure may occur when the piston is manually retracted.

In another advantage, the present invention generates sufficient force to retract the piston when frost or lack of lubrication might otherwise prevent a person from manually pushing the piston to its retracted position.

The present invention enables the piston to traverse the full length of the receptacle since no mechanical devices are located within the receptacle for retracting the piston. This allows a larger amount of product to be dispensed.

Another advantage of the present invention results from the fact that the piston is retracted only when desired, thus preventing a partially full product container from stretching back with the piston and resulting in a situation where the product container may fold upon itself, blocking the flow of product.

The present invention also has the advantage of containing an exhaust system that automatically releases the pressure on the piston when the door to the casing containing the dispensing assemblies is opened.

These and other advantages, features, and objects of the present invention will be more readily understood in view of the following detailed description and the drawings.

BRIEF DESCRIPTION OF THE DRAWING

FIG. 1 is a perspective view of a manifold and dispensing assemblies of a first preferred embodiment of the present invention.

FIG. 2 is an end elevational view of the manifold of FIG. 1.

FIG. 3 is a side elevational view of the manifold of FIG. 1.

FIG. 14 is a perspective view of a manifold of a third preferred embodiment of the invention.

FIG. 22 is a partial cross-sectional view of the first embodiment of the release valve and check valve of the present invention in the retraction mode.

FIG. 23 is a partial cross-sectional view of a second embodiment of a release valve and a check valve of the present invention in the exhaust mode.

DETAILED DESCRIPTION OF THE DRAWING

1. Overview

Figure 1:
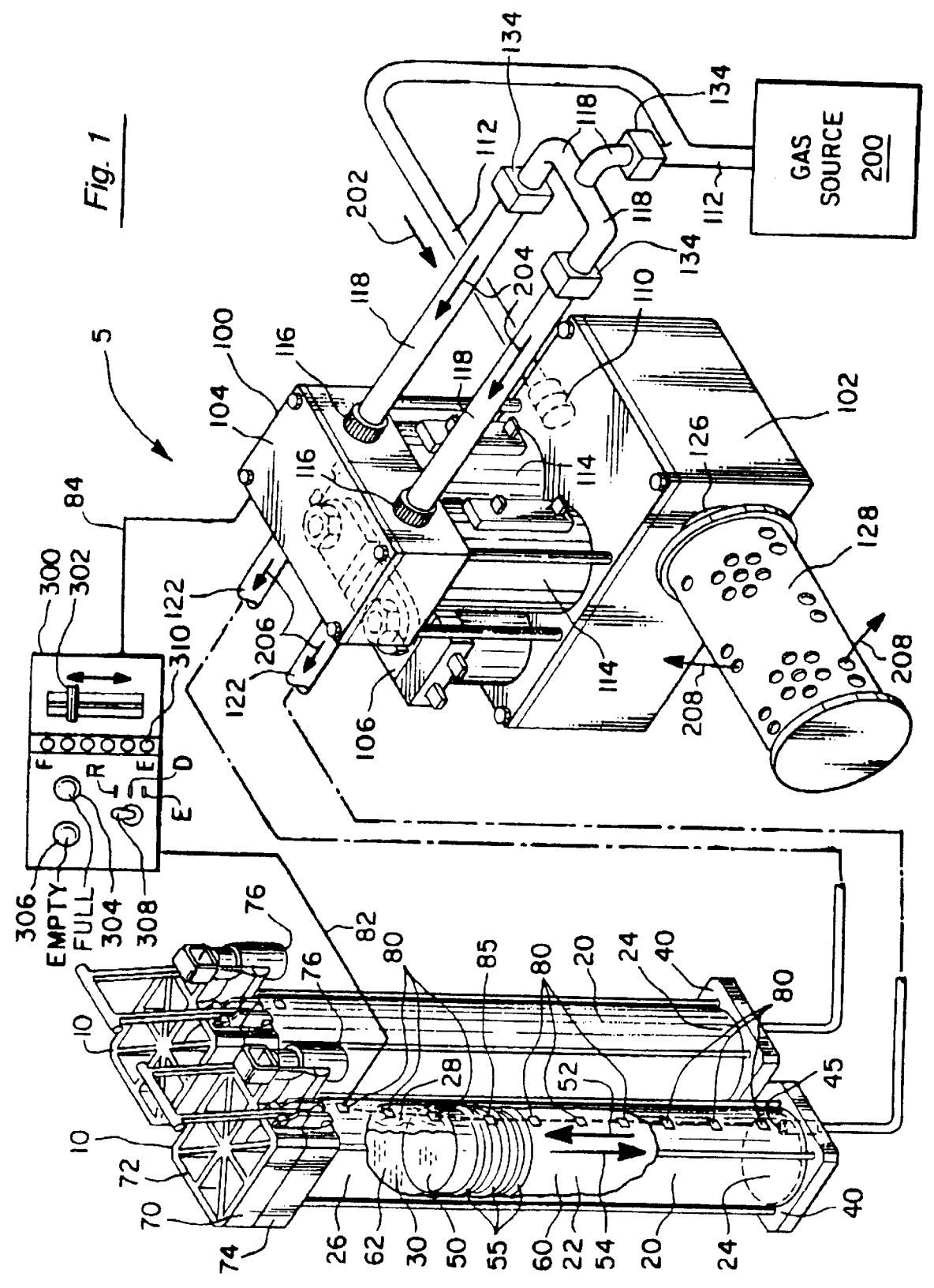
Figure 4:
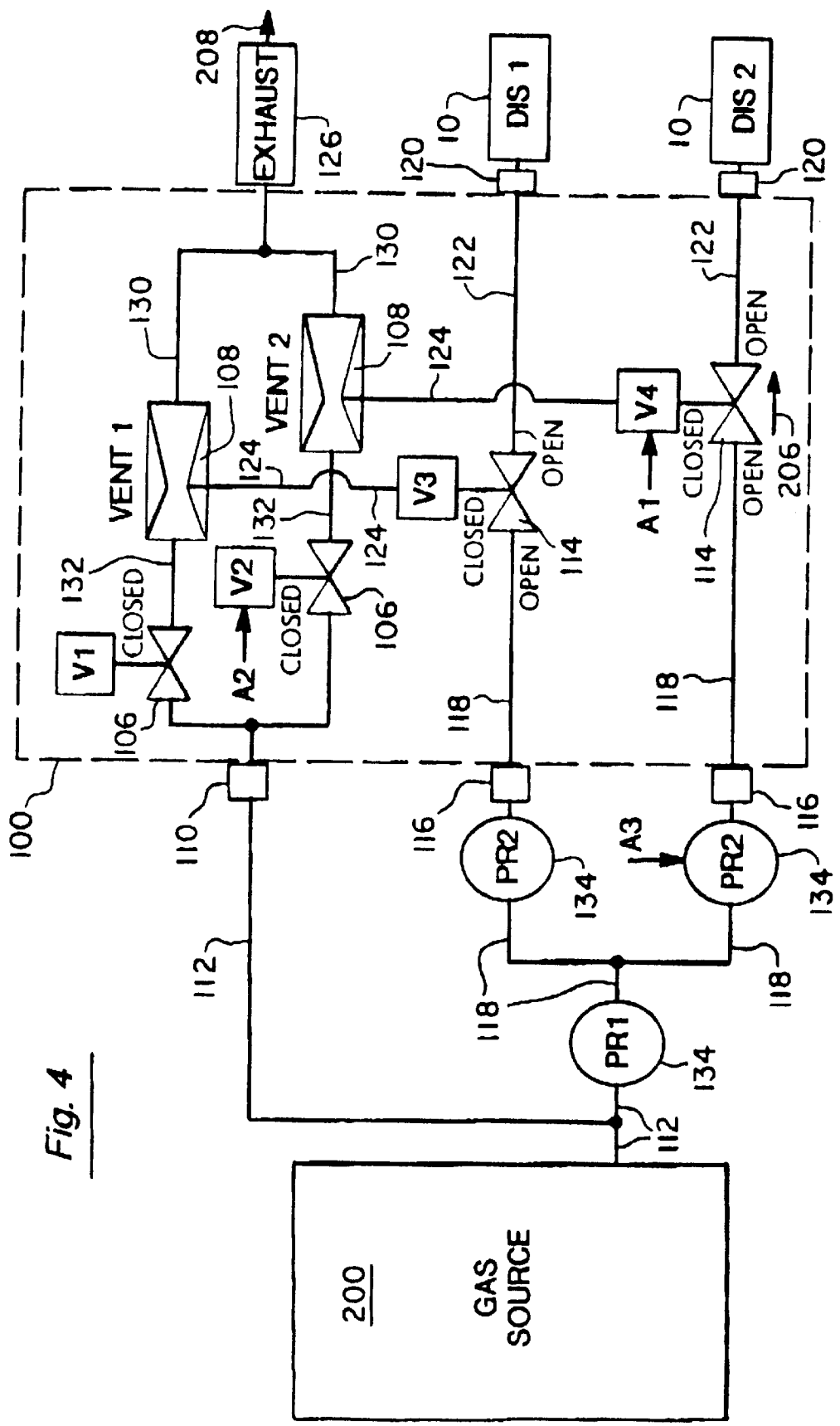
FIG. 4 is a schematic view of a first preferred embodiment of a pneumatic dispensing control system of the present invention illustrating the system in the dispensing mode.

FIG. 1 illustrates the pneumatic dispensing control system 5 of the present invention. The dispensing control system 5 dispenses product 30, preferably a food product 30, by using a free-floating piston 50 to force the product 30 in direction 52 and eventually out of a spigot 76. When needed, for example, when all the product 30 has been dispensed, the piston 50 is retracted by use of a vacuum in direction 54 so that the dispensing assembly 10 can be reloaded with product 30 and/or cleaned.

A preferred embodiment of the pneumatic dispensing control system 5 includes one or a plurality of dispensing assemblies 10, only two of which are shown in FIG. 1. Each dispensing assembly 10 includes a dispensing cylinder or receptacle 20 having a passageway 22 for receiving the product 30 and the piston 50 therein. The product 30 may be placed directly within the receptacle 20 or, preferably, the product 30 is placed in a container 28 that is placed within the receptacle 20. The container 28 can be, for example, a flexible bag or a tube with accordion walls. Other types of containers 28 will be readily evident to those skilled in the art. The present invention is particularly directed toward the dispensing of frozen dairy confections, for example, ice cream or yogurt; however, it should be understood that the pneumatic dispensing control system 5 of the present invention can be used for any system in which it is necessary to move a piston back and forth within a receptacle and that the present invention is not to be limited to the specific description herein.

The receptacle 20 is preferably an elongated sleeve generally made of fiberglass or the like, having openings in each end 24, 26 thereof. The first opening in the first end 24 receives the piston 50 therein, and the second opening in the second end 26 receives the product 30 therein.

In another embodiment (not illustrated), only one opening is placed in the second end 26, and both the piston 50 and the product 30 are placed in the receptacle 20 through the single opening.

The piston 50 fits securely within the receptacle 20. One or a plurality of slideable seals 55 both enable the piston 50 to move in the receptacle 20 and provide a fluid-tight sliding seal between the piston 50 and the receptacle 20. In a preferred embodiment illustrated in FIG. 1, three seals 55 encircle the piston 50. However, it should be understood that any number of seals 55 can be used in the present invention as long as at least one of the seals 55 provides a fluid-tight sliding seal between the piston 50 and the receptacle 20. For example, in an alternative embodiment (not shown), two U-cup seals and one wiper ring are used.

A support plate 40 covers the first end 24 of the receptacle 20. The support plate 40 preferably includes an aperture 45 through which pressurized air or gas can enter the receptacle 20. The receptacle 20, support plate 40, and piston 50 define a closed pressure chamber 60.

The second end 26 of the receptacle 20 is preferably covered by a pressure lid assembly 70. The pressure lid assembly 70 includes a pressure lid 72, a pressure lid mount plate 74, and a spigot 76. The receptacle 20, pressure lid assembly 70, and piston 50 define a product chamber 62 that contains the product 30 or the container 28 holding the product 30.

Often, the dispensing assembly 10 is placed within a casing (not shown) having a door. The spigot 76 protrudes through the door for the dispensing of the product 30. A control panel 300, which is shown in FIG. 1, is located on the door of the casing. One control panel 300 is used for each dispenser 10.

The control panel 300 comprises a manual activating handle 302 that is physically connected to the spigot 76. The manual handle 302 is also connected by an electrical signaling system 84 to the manifold assembly 100, as discussed in more detail below.

At least one sensor 80 is preferably attached to the receptacle 20 to determine the position of the piston 50 as the piston 50 moves inside the receptacle 20. Any type of sensor 80 can be utilized that can detect the piston 50. For example, sensors 80 that can be used include, but are not limited to, capacitative, inductive, Hall, and Reed type sensors. A metallic or magnetic material 85 may be attached to the piston 50 depending on the type of sensor 80 used. By detecting the position of the piston 50 within the receptacle 20, the sensor 80 can be used to correlate the position of the piston 50 with the amount of product 30 remaining within the receptacle 20, to indicate when a preferred portion size has been dispensed, and/or to control the portion size dispensed. The control panel 300 also comprises two signal lights, 304 and 306. These signal lights 304, 306 are connected to the sensor 80 via line 82. When the receptacle 20 is full of product 30, signal light 304 (F) is lit. When the receptacle 20 is empty and the product 30 has been dispensed, signal light 306 (E) becomes activated.

In a preferred embodiment, as illustrated in FIG. 1, a plurality of sensors 80 are placed along the receptacle 20. The sensors 80 are located at intervals equal to or less than the distance traveled by the piston 50 to dispense a desired portion of product 30. The signals from the sensors 80 are sent via line 82 to the pneumatic dispensing control system 5 and to a plurality of lights 310 on the control panel 300. The signals from the sensors 80 can be utilized in several methods to indicate that a desired portion of product 30 has been dispensed.

In a first method, a single light 310 is illuminated after a given number of sensors 80 have been activated to indicate to the operator pulling the dispensing handle that a desired portion has been dispensed. When the light 310 is illuminated the operator releases the dispensing handle.

In another method, the sensors 80 control the portion size by automatically ending the dispensing mode and initiating the exhaust mode (described in more detail below) when a given number of sensors 80 have been activated. That is, the operator inputs the size of the portion into the pneumatic dispensing control system 5. During dispensing of the product 30, the pneumatic dispensing control system 5 uses the sensors 80 to measure the distance traveled by the piston 50. When the appropriate distance is measured by the sensors 80, that is, when a given number of sensors 80 have been activated by the movement of the piston 50, a signal is sent via line 82 to the pneumatic dispensing control system 5 to end the dispensing mode (described below). In another embodiment, when the last sensor 80 at the first end 24 of the receptacle 20 is activated, a signal is sent via line 82 to the pneumatic dispensing control system 5 to enter the retraction mode (described below).

Alternatively, a plurality of lights 310 are illuminated corresponding to the activation of a number of sensors 80. As the product 30 is dispensed, more sensors 80 are activated, in turn illuminating more lights 310. Thus, the operator has a visual indication of the residual volume of product 30 by noting how many lights 310 are illuminated. That is, when the product chamber 62 is full, a top light 310 F is illuminated. As the product 30 is dispensed, more lights 310 are illuminated until the bottom light 310 E is lit, indicating that the product chamber 62 is empty. When the last sensor 80 at the second end 26 is activated, the retraction mode (described below) can be automatically activated or activated by the operator.

In one preferred embodiment of the present invention, the manual handle 302 is in an actuating relationship with the piston 50 through the manifold assembly 10 of the pneumatic dispensing control system 5 via line 84, as is discussed in more detail below, so that upon the manual handle 302 being actuated by a operator to a preselected position, the piston 50 is actuated and moves toward the second end 26 of the receptacle 20 as shown by arrow 52, forcing the product 30 out of the receptacle 20 through the spigot 76. Upon the release of the handle 302, the pneumatic dispensing control system 5 enters the exhaust mode, releasing the pressurized gas, and the movement of the piston 50 toward the product 30 is stopped. In a preferred embodiment, discussed in more detail below, the piston 50 is operable in response to a pressurized gas source 200 that both moves the piston 50 toward the second end 26 as shown by arrow 52 in FIG. 1 for dispensing the product 30 and retracts the piston 50 toward the first end 24 as shown by arrow 54 when it is desired to replace the product 30 and/or clean the receptacle 20.

2. First Preferred Embodiment

A. Details of the pneumatic dispensing control system 5

The pneumatic dispensing control system 5 comprises one or a plurality of dispensing assemblies 10 as described above connected to a manifold assembly 100. In a first preferred embodiment of the present invention, two dispensing assemblies 10 are connected to one manifold assembly 100 as shown in FIG. 1. In another embodiment (not shown), a plurality of manifold assemblies 100, each having two dispensing assemblies 10 connected thereto, are set up wherein all the manifold assemblies 100 are connected to a single source of pressurized gas 200. In another embodiment (not shown), a single dispensing assembly 10 is connected to each manifold assembly 100. Other combinations of dispensing assemblies 10 and manifold assemblies 100 will be evident to those skilled in the art and are contemplated under the teachings of the resent invention.

Figure 5:
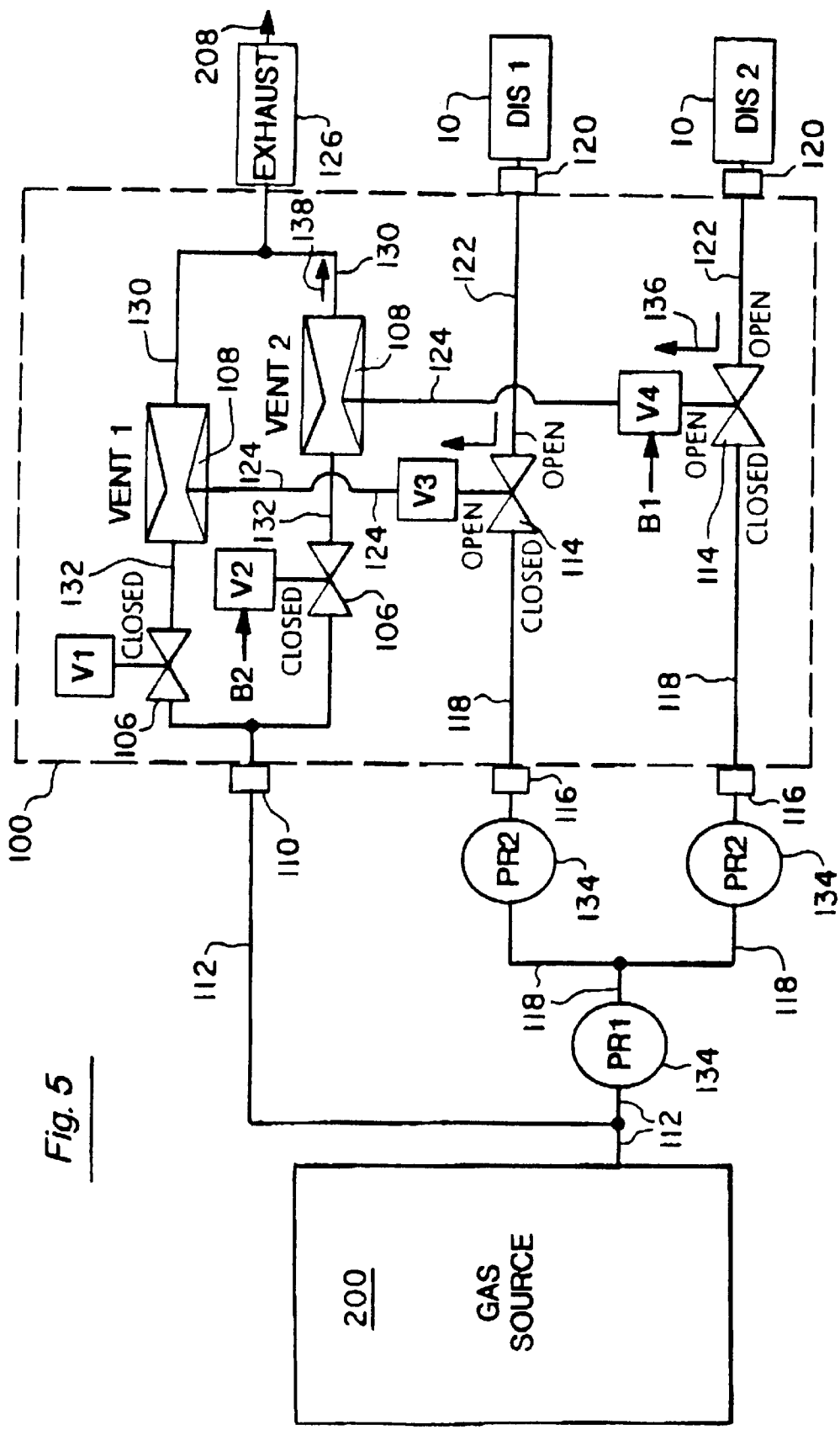
FIG. 5 is a schematic view of a first preferred embodiment of a pneumatic dispensing control system of the present invention illustrating the system in the exhaust mode.
Figure 6:
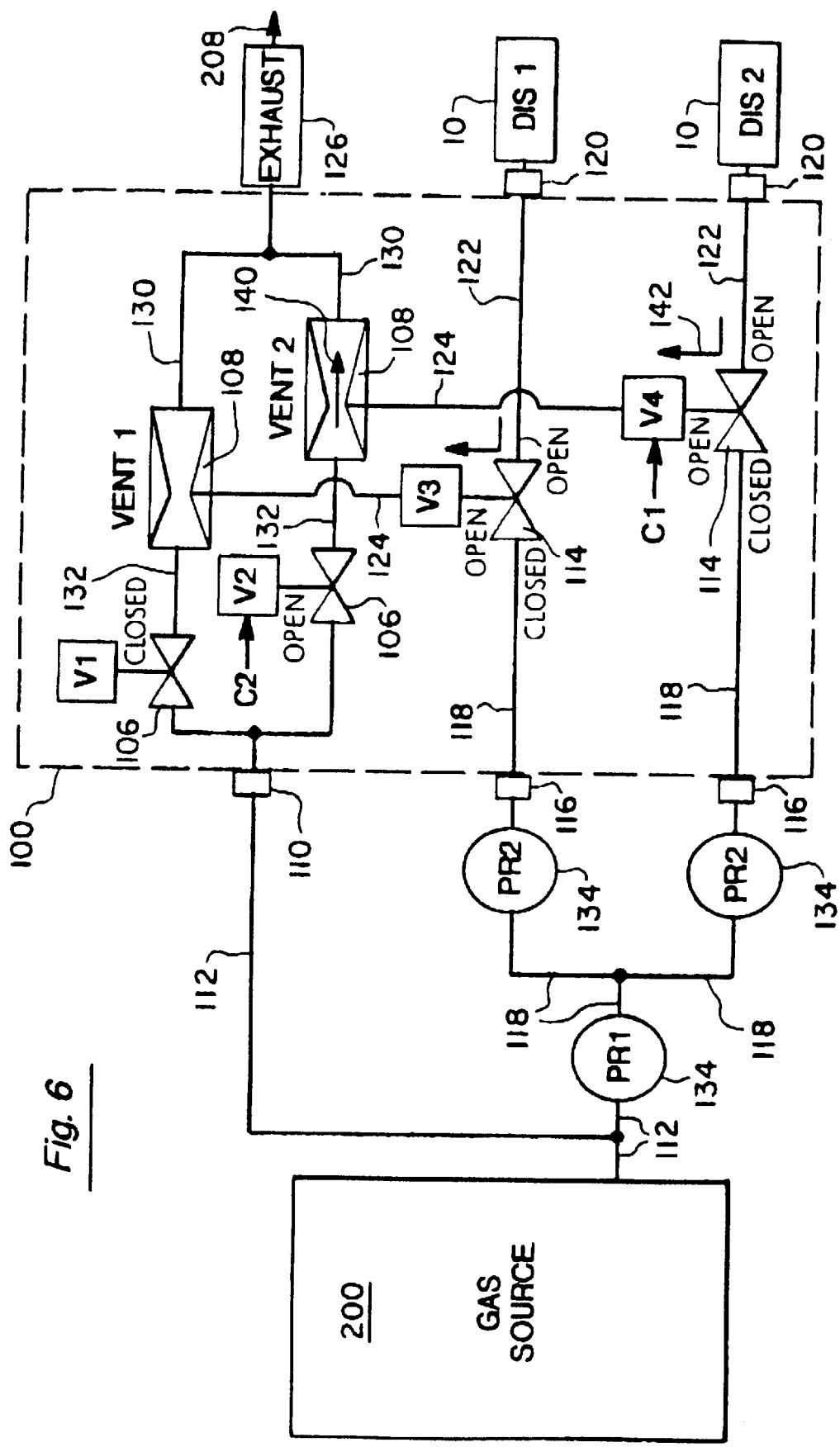
FIG. 6 is a schematic view of a first preferred embodiment of a pneumatic dispensing control system of the present invention illustrating the system in the retraction mode.

The manifold assembly 100 of a first preferred embodiment as illustrated in FIGS. 1–3 comprises a base manifold 102 and a switching manifold 104. The base manifold 102 houses one or a plurality of two-way valves 106 and one or a plurality of venturis 108 (the venturis 108 are shown in FIGS. 4 to 6). Preferably, one venturi 108 is used for each dispensing assembly 10 that is connected to the manifold assembly 100. The base manifold 102 also includes an inlet port 110, as seen in FIG. 2, to which is attached by line 112 a source of pressurized gas 200 (see FIG. 1) that flows through line 112 in the direction indicated by arrow 202. The pressurized gas source 200 is in fluid communication via line 112 with the plurality of two-way valves 106 and venturis 108 contained within the base manifold 102. The pressurized gas source 200, via the two-way valves 106 and venturis 108, is also in fluid communication with an exhaust port 126 delivering exhausted gas 208, which is described in greater detail below.

The switching manifold 104 of the manifold assembly 100 houses one or a plurality of three-way valves 114, at least one three-way valve 114 for each dispensing assembly 10. Each three-way valve 114 includes an inlet port 116, illustrated in FIG. 1, to which the pressurized gas source 200 is connected by a line 118 through which the pressurized gas 200 flows in the direction indicated by arrow 204. Each three-way valve 114 also includes an outlet port 120, as shown in FIG. 3, to which a dispensing assembly 10 is connected by a line 122 through which pressurized gas flows in the direction indicated by arrow 206 (this can also be seen in FIG. 1). Each three-way valve 114 is also connected to a venturi 108 by a line 124 (as shown in FIGS. 4–6). Thus, via its respective three-way valve 114, each dispensing assembly 10 is in fluid communication with the pressurized gas source 200 and also with its respective venturi 108.

The valves 106, 114 in the first preferred embodiment are preferably solenoid valves; however, the present invention is not meant to be limited to the use of solenoid valves, and other types of valves known to those skilled in the art are included in the present invention.

The base manifold 102 also comprises an exhaust port 126 to which a muffler 128 is attached, as illustrated in FIGS. 1 and 2. The exhaust port 126 is connected to each venturi 108 by lines 130, as shown in FIGS. 4 to 6. Thus, each dispensing assembly 10, via its respective venturi 108, is in fluid communication with the exhaust port 126. Gas is exhausted from the exhaust port 126 through the attached muffler 128 as shown by arrows 208.

The connections among the dispensing assembly 10, the manifold assembly 100, and the pressurized gas source 200 are illustrated in more detail in FIGS. 4 to 6 and are discussed in more detail below.

B. Regulation of the pressurized gas flow

FIGS. 4, 5, and 6 provide schematic illustrations of the connections that are made between the dispensing assembly 10, the manifold assembly 100, and the pressurized gas source 200 in the various operating modes of the first preferred embodiment of the pneumatic dispensing control system 5 of the present invention. In the first preferred embodiment, the pneumatic dispensing control system 5 has three operating modes: the dispensing mode shown in FIG. 4, the exhaust mode shown in FIG. 5, and the retraction mode shown in FIG. 6. FIGS. 4 to 6 illustrate a first preferred embodiment with two dispensing assemblies 10 connected to one manifold assembly 100. In the discussion below, it should be understood that each dispensing assembly 10 has its respective two-way valve 106, three-way valve 114, and venturi 108, but shares a common pressurized gas source 200 with another dispensing assembly 10. For example, in FIG. 4, dispensing assembly 10 DIS2 is connected to three-way valve 114 V4, two-way valve 106 V2, and venturi 108 VENT2.

The pressurized gas source 200 in the first preferred embodiment illustrated in FIGS. 4 to 6 comprises a 2.5-gallon storage tank containing air or gas pressurized to a pressure of at least 100 psi. It is to be understood that other types of pressurized gas sources are included under the teachings of the present invention. For example, a compressor can be used to maintain the pressurized air or gas. Other methods of providing pressurized air or gas (or other suitable fluid) will be evident to those skilled in the art, and the present invention is not meant to be limited by the particular description herein.

Pressurized air or gas at 100 psi flows directly via line 112 to each two-way valve 106 and from each two-way valve 106 via a line 132 to the respective venturi 108. For the three-way valves 114, however, in the first preferred embodiment the gas pressure is regulated by a plurality of step-down pressure regulators 134 before the gas reaches the three-way valves 114. As shown in FIG. 4, each dispensing assembly 10 is connected to the pressurized gas source 200. Between the pressurized gas source 200 and the three-way valve 114 connected to the dispensing assembly 10 is located at least one step-down pressure regulator 134 to reduce the gas pressure from 100 psi to a range of about 15 to about 60 psi. In the first preferred embodiment illustrated in FIGS. 1 and 4, two step-down regulators 134, PR1 and PR2, are located on line 118 for each dispensing assembly 10. The first step-down regulator, PR1, reduces the gas pressure from about 100 psi to about 60 psi. The second step-down regulator, PR2, further reduces the gas pressure to between about 15 psi and about 60 psi. The second step-down regulator PR2 provides a variable amount of gas pressure to the pressure chamber 60 in response to the amount of pull on the manual handle 302, as discussed in more detail below.

i. Dispensing Mode

In the dispensing mode shown in FIG. 4, when the manual handle 302 of one of the dispensing assemblies 10 is actuated by an operator, a signal is sent via line 84 (shown in FIG. 1) to the valves 106, 114 connected to that dispensing assembly 10. For example, when the manual handle 302 of the dispensing assembly 10 labeled DIS2 in FIG. 4 is actuated, signals $A_1$, $A_2$ are sent that simultaneously (1) open (signal $A_1$) the three-way valve 114 labeled V4 in FIG. 4 between the pressurized gas source 200 and the dispensing assembly 10 DIS2, (2) close (signal $A_1$) the three-way valve 114 V4 between the dispensing assembly 10 DIS2 and the venturi 108 labeled VENT2 in FIG. 4, and (3) close (signal $A_2$) the two-way valve 106 labeled V2 in FIG. 4 between the pressurized gas source 200 and the venturi 108 VENT2. Pressurized gas is thereby allowed to flow through the line 118 to the three-way valve 114 V4 and then through line 122 from the three-way valve 114 V4 into the pressure chamber 60 of the dispensing assembly 10 DIS2 as shown by the arrow 206. This flow 206 of pressurized gas causes the piston 50 to move 52 toward the second end 26 of the receptacle 20, forcing the product 30 out of the spigot 76 of the pressure lid assembly 70 (shown in FIG. 1). In FIG. 4, the dispensing assembly 10 labeled DIS1 is also illustrated in the dispensing mode.

When the operator of the dispensing assembly 10 wishes to increase the dispense rate of the product 30, the operator pulls harder on the manual activating handle 302. This harder pull activates a signal $A_3$ that goes to the step-down pressure regulator 134 PR2. Signal $A_3$ signals the pressure regulator PR2 to provide more pressure to the dispensing assembly 10 in order to increase the force applied by the piston 50, so that the dispense rate of the product 30 is increased. Up to about 60 psi pressure is delivered to the dispensing assembly 10. In the event that the piston 50 becomes stuck due to frost in the receptacle 20 or for another reason, the operator can provide more pressure to the piston 50 in the same manner, by pulling harder on the manual activating handle 302.

ii. Exhaust Mode

When the manual handle 302 of the dispensing assembly 10 is not actuated, or when the casing door is opened, the pneumatic dispensing control system 5 enters the exhaust mode. As illustrated in FIG. 5, in the exhaust mode the three-way valve 114 closes between the pressurized gas source 200 and the dispensing assembly 10 and opens between the dispensing assembly 10 and the venturi 108, allowing the pressurized gas in the dispensing assembly 10 to exhaust through the venturi 108 and from there out the exhaust port 126. The two-way valve 106 between the pressurized gas source 200 and the venturi 108 remains closed during this time. Thus, the pressure inside the dispensing assembly 10 is reduced to atmospheric pressure and pressure is reduced on the piston 50.

For example, after the desired amount of product 30 has been dispensed from dispensing assembly 10 DIS2 as described above and in FIG. 4, the manual handle 302 is released by the operator. Signals $B_1$, $B_2$ are sent by this release that simultaneously (1) close (signal $B_1$) the three-way valve 114 V4 between the pressurized gas source 200 and the dispensing assembly 10, (2) open (signal $B_1$) the three-way valve V4 between the dispensing assembly and the venturi 108 VENT2, and (3) close (signal $B_2$) the two-way valve 106 V2 between the pressurized gas source 200 and the venturi 108 VENT2, as illustrated in FIG. 5. The pressurized gas within the dispensing assembly 10 is thereby allowed to flow from the dispensing assembly 10 through line 122 to the three-way valve 114 V4, as shown by the arrow 136, and then through line 124 to the venturi 108 VENT2, and finally through line 130 and out the exhaust port 126, as shown by arrows 138 and 208. In this manner the gas pressure inside the dispensing assembly 10 is quickly reduced (in about five seconds) from about 15–60 psi to ambient atmospheric pressure.

iii. Retraction Mode

There are times when it is necessary to move the piston 50 away from the second end 26 and toward the first end 24 of the receptacle 20, that is, away from the dispensing end. For example, when all the product 30 has been dispensed, the piston 50 will be located close to the second end 26 of the receptacle 20, and must be moved in order to insert more of the product 30. Or, after the product 30 has been dispensed, it may be necessary to clean the dispensing assembly 10.

FIG. 6 illustrates the positions of the valves 106, 114 that enable the piston 50 to be rapidly retracted from the second end 26 toward the first end 24. The operator initiates the retraction of the piston 50 by moving the switch 308 on the control panel 300 (shown in FIG. 1) to the top position, indicated by R in FIG. 1. The switch 308 sends signals $C_1$ and $C_2$ to the valves 114 and 106, respectively. For example, to retract the piston 50 in the dispensing assembly 10 labeled DIS2 in FIG. 6, the three-way valve 114 V4 is opened by signal $C_1$ between the dispensing assembly 10 DIS2 and the venturi 108 VENT2 and is closed by signal $C_1$ between the pressurized gas source 200 and the dispensing assembly 10 DIS2, as was the situation in the exhaust mode described above and in FIG. 5. In the retraction mode, however, the two-way valve 106 V2 is opened by signal $C_2$ between the pressurized gas source 200 and the venturi 108 VENT2, allowing the pressurized gas to flow through the venturi 108 VENT2 as shown by arrow 140 and out the exhaust port 126 as shown by arrow 208. The pressurized gas flowing 140 through the venturi 108 VENT2 increases in velocity as it passes through the venturi 108 VENT2. This increase in velocity causes a corresponding decrease in the gas pressure, which creates a vacuum (shown by arrow 142) in lines 124 and 122 and then in the pressure chamber 60. This vacuum 142 retracts 54 the piston 50 from the second end 26 of the receptacle 20 toward the first end 24, as shown in FIG. 1.

When the piston 50 has been retracted the desired amount, as determined either visually or with the sensor 80, the switch 308 is released by the operator and the valves 106, 114 are positioned so that the system 5 is in the exhaust mode, as described above and illustrated in FIG. 5. This allows ambient atmosphere to enter the dispensing assembly 10, and the piston 50 therefore stops moving.

In an alternative embodiment, the switch 308 is a momentary switch. In this case, the operator moves the switch 308 to the top position R and immediately releases it, rather than holding it in place. This motion of the switch 308 both places the pneumatic dispensing control system 5 into the retraction mode and activates a single-shot timer (not illustrated). The timer ends the retraction process at a predetermined instant, for example, fifteen seconds after the switch 308 is released.

In FIG. 6, the dispensing assembly 10 labeled DIS1 is shown in the exhaust mode.

C. Operation of the pneumatic dispensing control system 5

The operation of the various modes of the pneumatic dispensing control system 5 as described above and in FIGS. 4–6 for dispenser DIS2 is set forth in the following Table I.

TABLE I

| Mode | Manual handle 302 | Switch 308 | Signals | Signal sent to: |
|---|---|---|---|---|
| Dispensing | Pulled | Dispensing mode D | $A_1$ | Valve V4 |
|  |  |  | $A_2$ | Valve V2 |
|  | Pulled harder |  | $A_3$ | Regulator PR2 |
| Exhaust | Released | Exhaust mode E | $B_1$ | Valve V4 |
|  |  |  | $B_2$ | Valve V2 |
| Retraction | Released | Retraction mode R | $C_1$ | Valve V4 |
|  |  |  | $C_2$ | Valve V2 |

It is to be expressly understood that the signals (i.e., A, B, and C) can be of any suitable electrical value required to open and close the valves of the present invention. For example, signal A could be high (i.e., +5 volts direct current) to open valve V4 and low (i.e., 0 volts direct current) to close valve V4.

3. Alternative Embodiment of the First Preferred Embodiment

Figure 7:
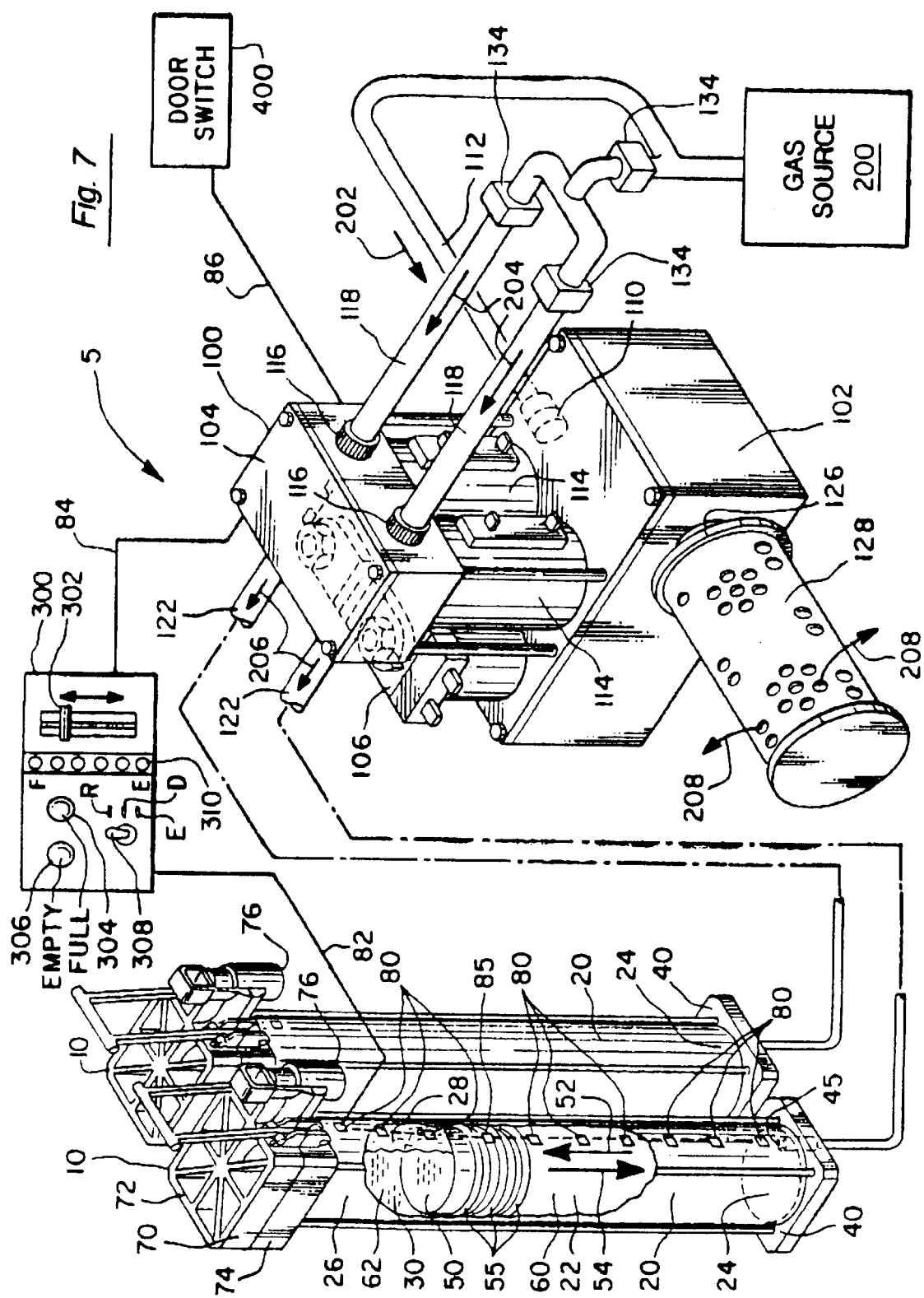
FIG. 7 is a perspective view of the manifold and dispensing assemblies of the first preferred embodiment of the present invention illustrating a door switch.

In an alternative of the first preferred embodiment illustrated in FIG. 7, a door switch 400 is located on the door (not shown) of the casing enclosing the dispensing assemblies 10. The door switch 400 is activated by the opening and closing of the door. Signals from the door switch 400 are sent to the pneumatic dispensing control system 5 via line 86.

In this alternative embodiment, the control panel 300 comprises a switch 308 that, when pressed by an operator, activates the three modes of the pneumatic control system 5 in conjunction with the door switch 400. The modes are indicated by the lines R (retraction) (momentary), D (dispense) (sustained), and E (exhaust) (sustained) on the control panel 300, as shown in FIG. 7. The switch 308 is preferably spring loaded.

In the discussion of the modes set forth below, in each case the description is limited to only one dispensing assembly 10, dispensing assembly DIS2 as illustrated in FIGS. 4, 5, and 6.

A. Dispensing Mode

The switch 308 is generally set in the middle position, as indicated by line D on the control panel 300 shown in FIG. 7, which configures the dispensing mode of the pneumatic control system 5 when the door is closed and the door switch 400 is on. In the dispensing configuration of this alternative embodiment, the switch 308 sends a signal $A_1$ via line 84 to the three-way valve 114 V4 and a signal $A_2$ to the two-way valve 106 V2, setting the valves 106, 114 in the configuration illustrated in FIG. 4. Pressurized gas is thus able to flow from the pressurized gas source 200 to the dispensing assembly 10 DIS2. The pressure of this flowing gas is regulated by the step-down regulators 134 PR1, PR2 to be about 15 psi.

When the manual handle 302 is then pulled by an operator, this increases the gas pressure released by the step-down regulator 134 PR2 from about 15 psi to about 60 psi. The increased gas pressure causes the piston 50 to move in the direction of arrow 52 in FIG. 7, forcing the product 30 out of the spigot 76. When the desired amount of product 30 has been dispensed, the operator releases the manual handle 302, which in turn causes the gas pressure released by the step-down regulator 134 PR2 to be reduced to about 15 psi. This level of gas pressure is insufficient to move the piston 50.

B. Exhaust Mode

In the alternative first preferred embodiment, there are two ways to cause the pneumatic dispensing control system 5 to enter the exhaust mode. The first exhaust mode is activated when the switch 308 is moved into the exhaust position, as shown by line E in the control panel 300 in FIG. 7. The switch 308 sends signal $B_1$ to the three-way valve 114, closing the three-way valve 114 V4 between the gas source 200 and the dispensing assembly 10 DIS2 and opening the three-way valve 114 between the dispensing assembly 10 DIS2 and the venturi 108 VENT2. This allows the pressurized gas in the dispensing assembly 10 to escape out to the atmosphere through the exhaust port 126. The switch 308 also sends signal $B_2$ to the two-way valve 106, closing the two-way valve 106 V2.

The second exhaust mode is activated by opening the door of the casing. When the door is opened, the door switch 400 is turned off and sends signal $B_1$ via line 86 to the three-way valve 114 V4 and sends signal $B_2$ to the two-way valve 106 V2, setting the valves 114 V4 and 106 V2 into the exhaust mode setup in the same manner as described above. Because these signals $B_1$ and $B_2$ are sent by the door switch 400 turning off, the door switch 400 acts as a fail-safe in case of power failure to the system 5.

C. Retract Mode

When the operator wishes to retract the piston 50, the operator opens the door, turning off the door switch 400 and placing the pneumatic control system 5 in the exhaust mode as described above. The operator then presses the spring-loaded switch 308 up into the retract position, as indicated by line R on the control panel 300 as shown in FIG. 7. Because of the spring loading, either the operator must hold the switch 308 in the retract position R until the desired amount of retraction has been achieved. Alternatively, a timer activated by the momentary pressing of the switch 308 to the retract position R can be utilized to provide a given time period of retraction, as described above in the first preferred embodiment. If the door switch 400 is not turned off, moving the switch 308 into the retract position R will not have any effect on the pneumatic control system 5.

When the switch 308 is moved into the retract position R after the door switch 400 has been turned off by the opening of the door, the switch 308 sends a signal $C_2$ via line 86 to the two-way valve 106 V2, and the door switch 400 sends a signal $C_1$ via line 86 to the three-way valve 114 V4. Signal $C_1$ closes the three-way valve 114 V4 between the pressurized gas source 200 and the dispensing assembly 10 DIS2 and opens the three-way valve 114 V4 between the dispensing assembly DIS2 and the venturi 108 VENT2. Signal $C_2$ opens the two-way valve 106 V2 between the gas source 200 and the venturi 108 VENT2. As described above for the first preferred embodiment, the gas flowing through the venturi 108 VENT2 generates a vacuum 142 in the dispensing assembly 10 DIS2, and this vacuum 142 causes the piston 50 to move 54 toward the first end 24 of the receptacle 20 and away from the dispensing or second end 26.

When the piston 50 has been retracted to the desired position, the operator releases the spring-loaded switch 308, signaling the two-way valve 106 V2 to close. Because the door switch 400 is still turned off at this time, the pneumatic dispensing control system 5 returns to the exhaust mode, releasing the vacuum on the piston 50. The amount of piston 50 retraction can be determined visually or by the sensors 80 as described above. Other methods of determining the amount of retraction will be evident to those skilled in the art, and the present invention is not meant to be limited by any particular description herein.

D. Operation of the pneumatic dispensing control system 5

The operation of the various modes of the pneumatic dispensing control system 5 as described above for the alternative first preferred embodiment and in FIGS. 4–6 and 7 for dispenser DIS2 is set forth in the following Table II.

TABLE II

| Mode | Manual handle 302 | Switch 308 | Door switch 400 | Signals | Signal sent to: |
|---|---|---|---|---|---|
| Dispensing | Released or pulled | Dispensing position D | On | $A_1$ (by switch 308) | Valve V4 |
| | | | | $A_2$ (by switch 308) | Valve V2 |
| | | | | $A_3$ (by handle 302) | Regulator PR2 |
| Exhaust 1 | Released | Exhaust position E | On | $B_1$ | Valve V4 |
| | | | | $B_2$ | Valve V2 |
| Exhaust 2 | Released | Dispensing position D or exhaust position E | Off | $B_1$ | Valve V4 |
| | | | | $B_2$ | Valve V2 |
| Retraction | Released | Retract position R | Off | $C_1$ (by door switch 400) | Valve V4 |
| | | | | $C_2$ (by switch 308) | Valve V2 |

It is to be expressly understood that the signals (i.e., A, B, and C) can be of any suitable electrical value required to open and close the valves of the present invention. For example, signal A could be high (i.e., +5 volts direct current) to open valve V4 and low (i.e., 0 volts direct current) to close valve V4.

4. Other Preferred Embodiments

Other preferred embodiments of the present invention are contemplated under the teachings of this specification. The other preferred embodiments are illustrated in FIGS. 8 to 22. The other preferred embodiments are improved to enable the pressurized gas in the pneumatic dispensing control system 5 to exhaust more quickly than can be achieved in the first preferred embodiment. For convenience and clarity, the number components identified in FIGS. 1 to 7 are consistently used in FIGS. 8 to 22 where possible.

In the other preferred embodiments, the present invention comprises, as in the first embodiment and as illustrated in FIGS. 1 and 7, a dispensing assembly 10 having a receptacle 20 with a passageway 22 therein for holding a product 30 to be dispensed, preferably a frozen food product. A plurality of sensors 80 are placed on the receptacle 20. The receptacle 20 has a first end 24 and a second end 26. A free-floating piston 50 is placed within the passageway 22, with the receptacle 20, the piston 50, and the first end 24 defining a pressure chamber 60 within the passageway 22. A pressurized gas source 200 containing pressurized gas is in fluid communication with the pressure chamber 60.

In the other preferred embodiments, as illustrated in FIGS. 8 to 19, a first valve 105, 114 is located between the pressurized gas source 200 and the pressure chamber 60, and pressurized gas flows into the pressure chamber 60 when the first valve 105, 114 is opened. In the second preferred embodiment (FIGS. 8 to 13), the first valve 114 is preferably a three-way valve, and in the third preferred embodiment (FIGS. 14 to 19), the first valve 105 is preferably a two-way valve. The pressurized gas flowing into the pressure chamber 60 causes the piston 50 to move away from the first end 24 and toward the second end 26 of the receptacle 20 in the direction of arrow 52 in FIG. 1, forcing the product 30 out of the receptacle 20.

To retract the piston 50, a vacuum generator generates a vacuum in the pressure chamber 60. The vacuum generator is comprised of a venturi 108, a second valve 107 between the venturi 108 and the pressure chamber 60, and a third valve 106 between the venturi 108 and the pressurized gas source 200. The second 107 and third 106 valves are preferably two-way valves. The vacuum is generated by opening the third valve 106 between the pressurized gas source 200 and the venturi 108 and by opening the second valve 107 between the venturi 108 and the chamber 60. Gas moving through the venturi 108 generates a vacuum that extends through the second valve 107 to the chamber 60, causing the piston 50 to move toward the first end 24 of the receptacle 20 and away from the second end 26 in the direction of arrow 54 in FIG. 1.

In the other preferred embodiments and as will be discussed more fully, a release valve 109 is added to the pneumatic dispensing control system 5 to enable the pressurized gas in the pressure chamber 60 to be exhausted from the chamber 60 by a route that does not pass through the venturi 108, thus allowing the pressurized gas in the chamber 60 to be exhausted more quickly than is possible in the first preferred embodiment.

The release valve 109 of the other preferred embodiments is preferably a gas-driven or air-piloted valve having an attached check valve 111 as illustrated in FIGS. 20 to 25. Gas-driven release valves are signaled to open and close by changes in gas pressure. For example, an increase in gas pressure signals the release valve to close, whereas a decrease in gas pressure signals the release valve to open. It is to be understood that other types of equivalent valves may be used as a release valve, for example, solenoid valves, and the present invention is not meant to be limited to gas-driven valves for the release valve.

In a second preferred embodiment of the present invention, which is described in more detail below and illustrated in FIGS. 8 to 13, the release valve 109 is in fluid communication with the pressurized gas source 200 via a signal input line 113 to the first valve 114. The first valve 114 is also in fluid communication with the pressure chamber 60. When pressurized gas flows through the first valve 114 to the signal input line 113 of the release valve 109, the release valve 109 is signaled to close. When the pressure is reduced in the signal input line 113 by the opening of the first valve 114 to an outlet line 125, the release valve 109 is signaled to open, and the pressurized gas in the pressure chamber 60 is thus exhausted through the release valve 109.

In a third preferred embodiment of the present invention, which is described in more detail below and illustrated in FIGS. 14 to 19, the release valve 109 is in fluid communication with a pressurized gas source 200 via a signal input line 113 to a fourth valve 115. The fourth valve 115 is preferably a three-way valve. The signal input line 113 in the third preferred embodiment is a dedicated line from the fourth valve 115, unlike the signal input line 113 in the second preferred embodiment. Thus, when pressurized gas flows through the fourth valve 115 to the signal input line 113 of the release valve 109, the release valve 109 is signaled to close. When the fourth valve 115 is closed to the pressurized gas source 200 and opened to an outlet line 125, the pressurized gas in the signal input line 113 is reduced in pressure, and the release valve 109 is signaled to open, causing the pressurized gas in the pressure chamber 60 of the dispensing assembly 10 to exhaust.

A. Second Preferred Embodiment

A second preferred embodiment of the present invention is illustrated in FIGS. 8 through 13. In this embodiment, additional valves 107, 109, 111 are added to the pneumatic dispensing control system 5 of FIG. 1 to enable the pressurized gas to be exhausted from the pressure chamber 60 more quickly than is possible in the first preferred embodiment, in which the pressure chamber 60 is exhausted only through the venturi 108 and its exhaust port 126.

i. Manifold Assembly 100

Figure 8:
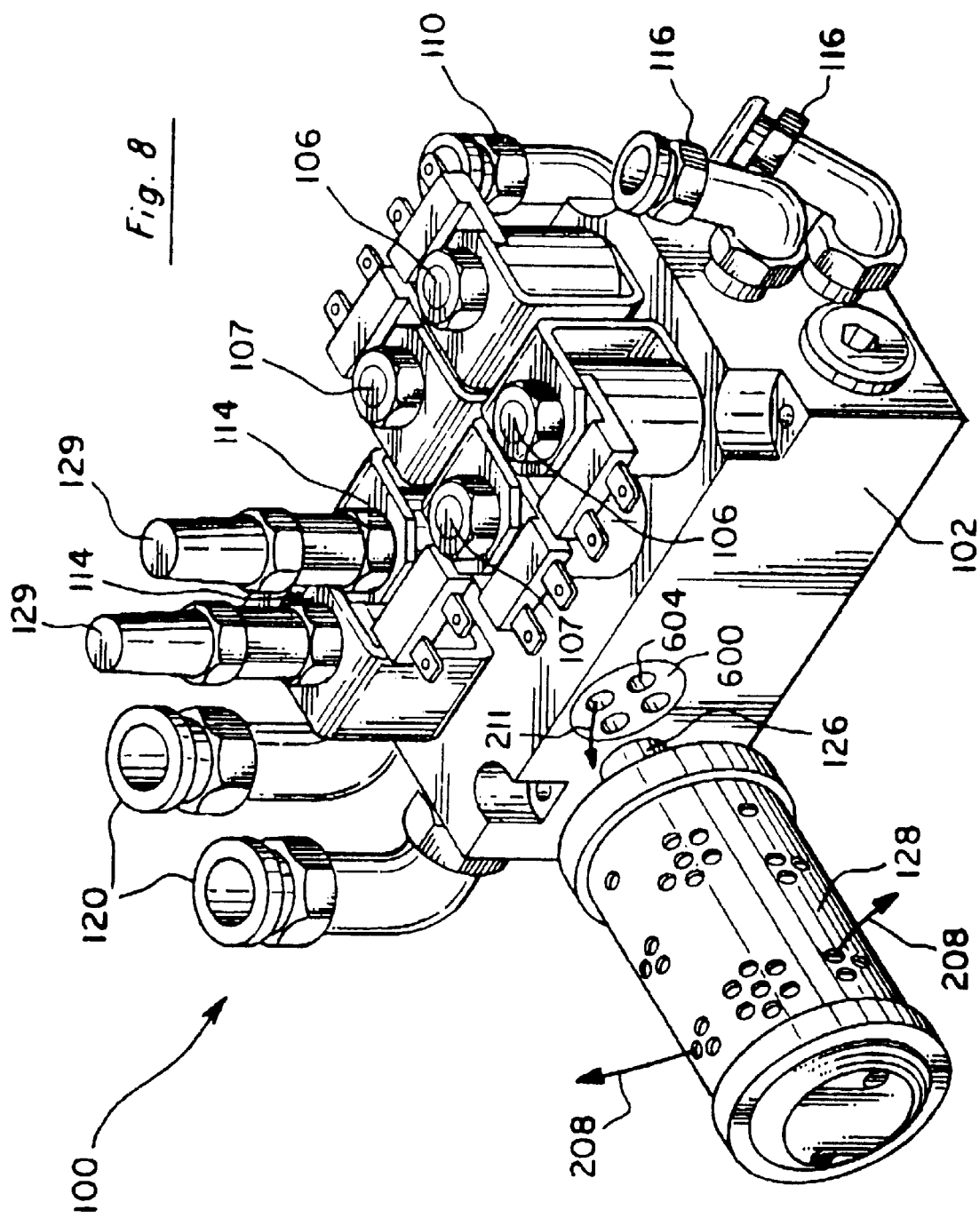
FIG. 8 is a perspective view of a manifold of a second preferred embodiment of the invention.
Figure 9:
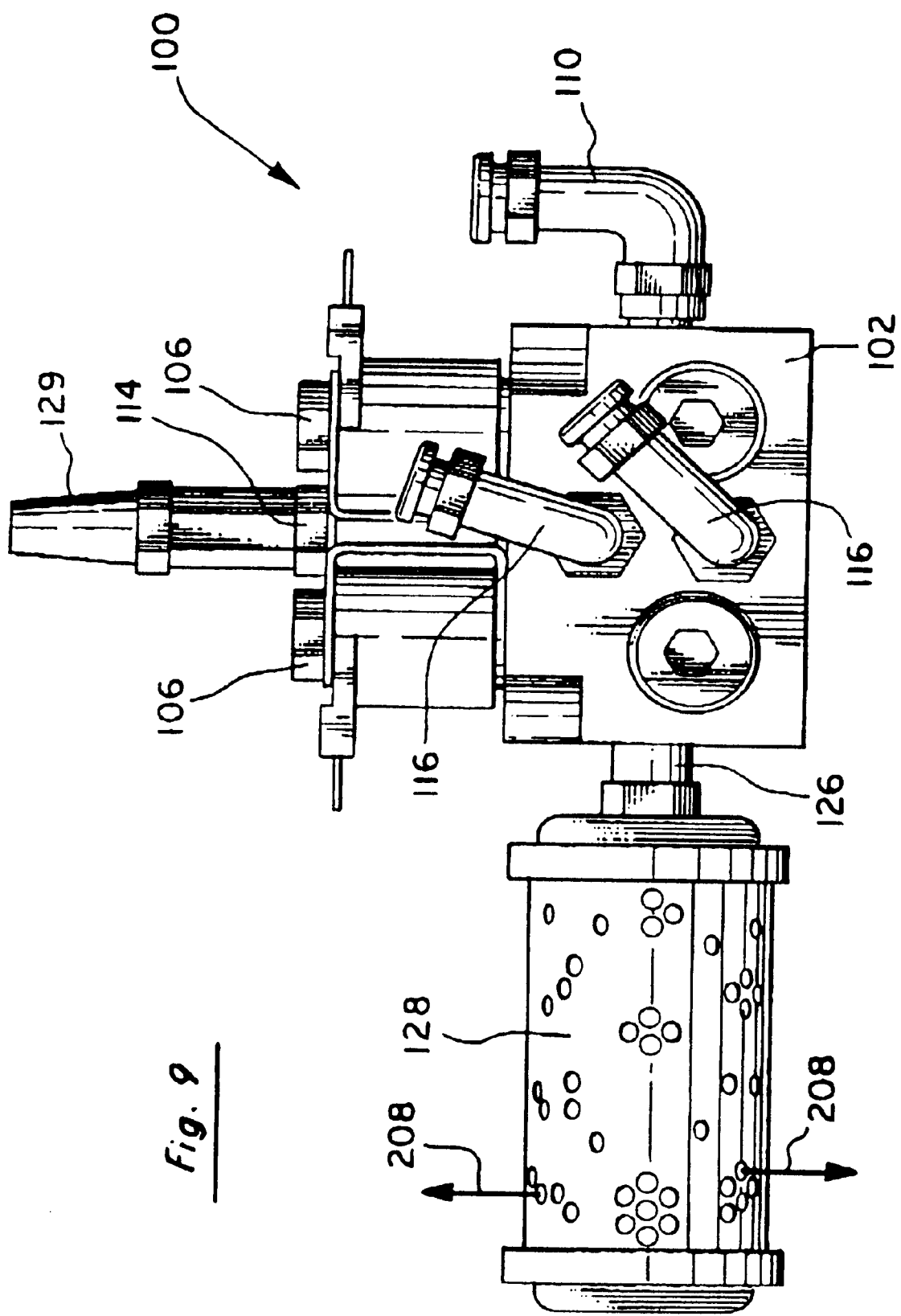
FIG. 9 is an end elevational view of the manifold of FIG. 8.
Figure 10:
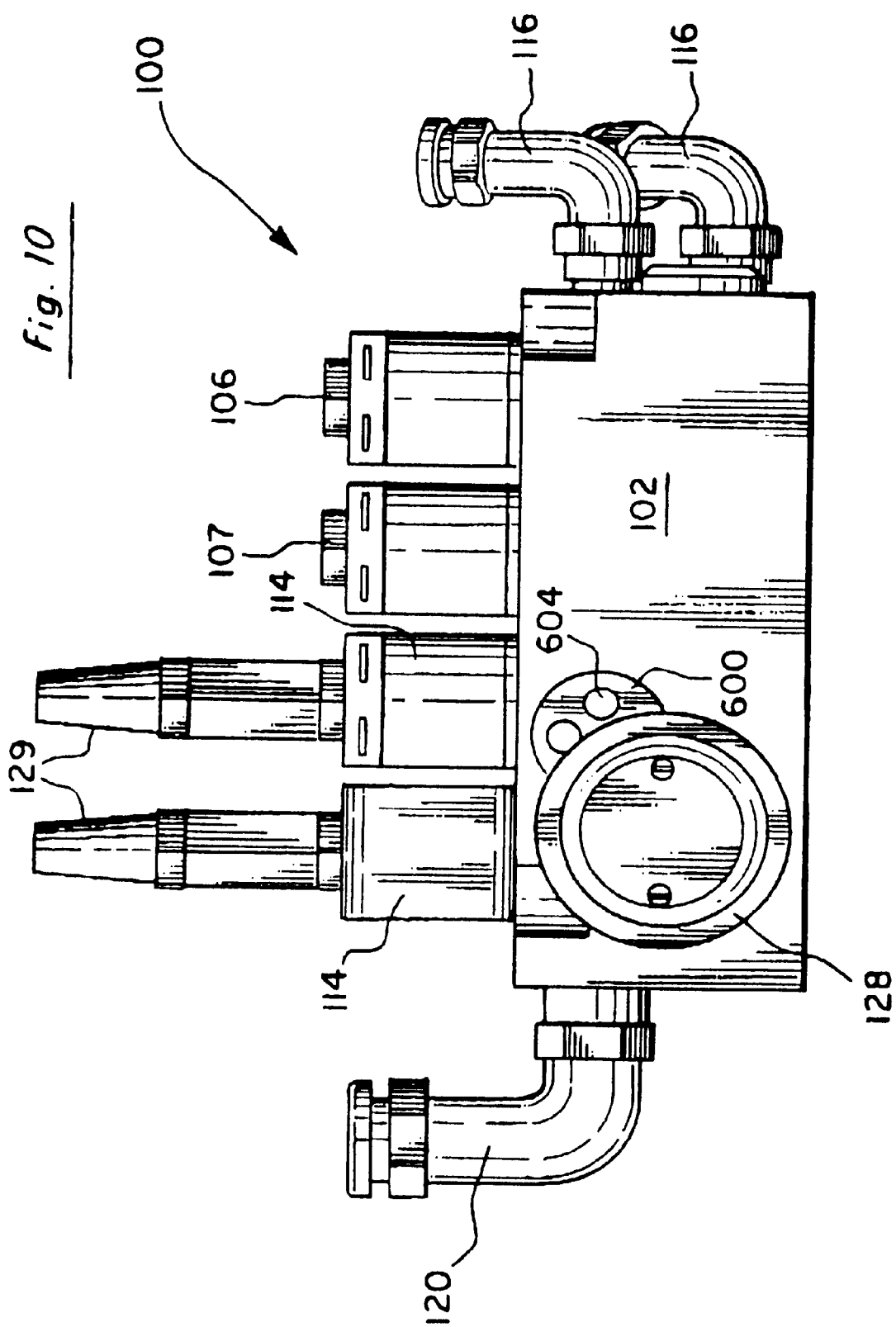
FIG. 10 is a side elevational view of the manifold of FIG. 8.
Figure 11:
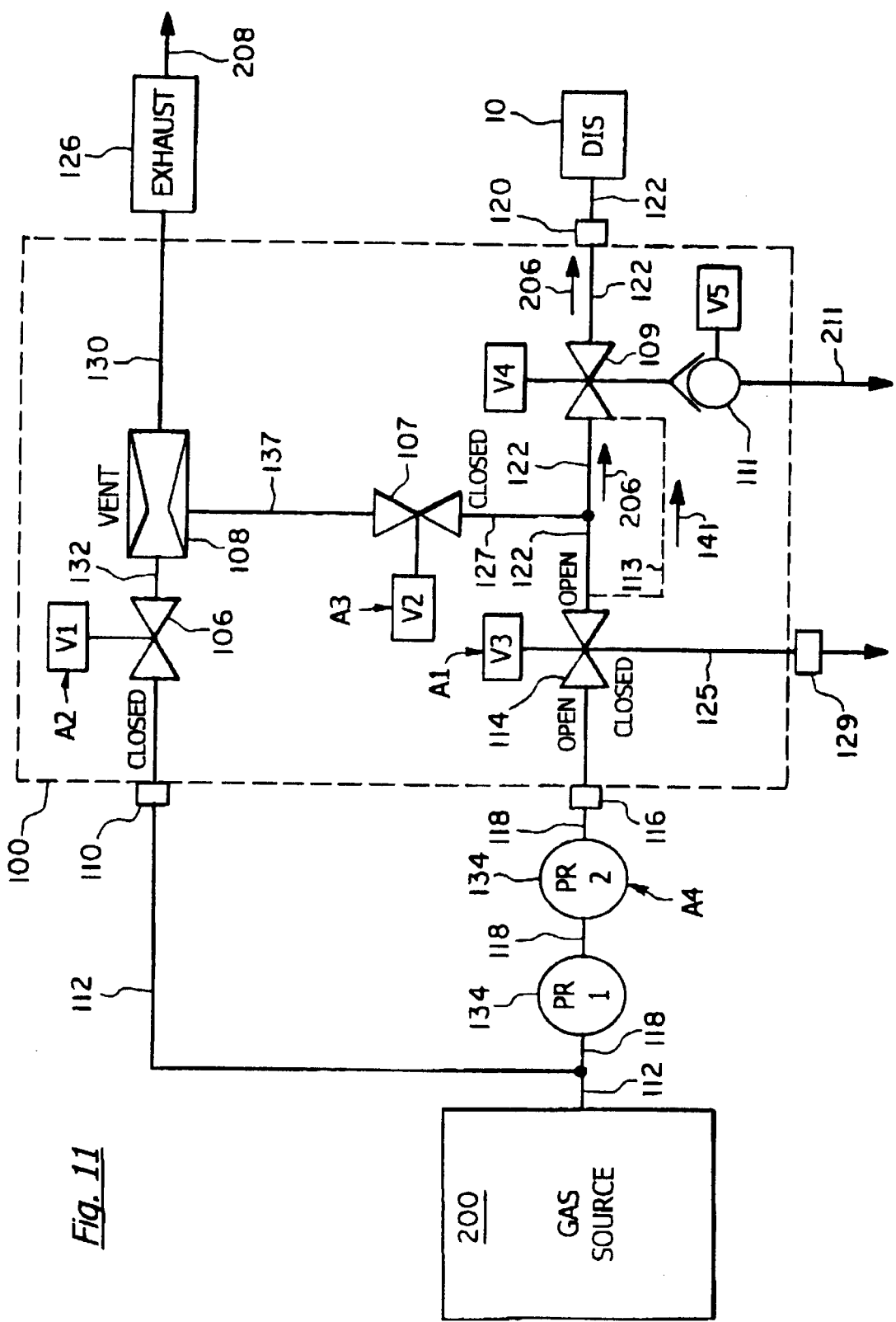
FIG. 11 is a schematic view illustrating the second preferred embodiment of the pneumatic dispensing control system in the dispensing mode.

FIGS. 8 through 10 illustrate the manifold assembly 100 of the second preferred embodiment of the present invention. The manifold assembly 100 comprises a base manifold 102 atop which are placed a plurality of valves 106, 107, 114. The base manifold 102 houses a plurality of venturis 108, a plurality of release valves 109, and a plurality of check valves 111 (as shown in FIGS. 11 to 13). The base manifold 102 also houses the connections between the pressurized gas source 200, the dispensing assembly 10, the plurality of valves 106, 107, 109, 111, 114, and the plurality of venturis 108 (as shown in FIGS. 11 to 13).

The second preferred embodiment comprises a first valve 114, a second valve 107, a third valve 106, a release valve 109, and a check valve 111 for each dispensing assembly 10 that is connected to the manifold assembly 100. For example, in FIGS. 8 to 10, two dispensing assemblies 10 can be connected via outlet ports 120 to the manifold assembly 100. The base manifold 102 includes at least one inlet port 116 for each dispensing assembly 10 and an inlet port 110, to which are connected a pressurized gas source 200 by lines 118 and 112, respectively (see FIG. 1). The pressurized gas source 200 is in fluid communication with the plurality of valves 106, 114 and with the plurality of venturis 108, as illustrated in FIGS. 11 to 13. The pressurized gas source 200, via the plurality of valves 106 and venturis 108, is also in fluid communication with an exhaust port 126 delivering exhausted gas 208 from the venturis 108 when the pneumatic dispensing control system 5 is in the retract mode, as described in greater detail below.

Atop the base manifold 102 are placed a plurality of first valves 114, one first valve 114 for each dispensing assembly 10 that is attached to the manifold assembly 100. The first valves 114 are preferably three-way valves. Each first valve 114 is connected to the pressurized gas source 200 via lines 112 and 118 (as shown in FIG. 11). Pressurized gas flows through line 112 to line 118 and into the first valve 114 via the inlet port 116. Each first valve 114 is connected by a line 122 leading through an outlet port 120 to a dispensing assembly 10, as shown in FIGS. 11 to 13. Each first valve 114 is also connected to a release valve 109 by a signal input line 113 from line 122 (see FIGS. 11 to 13) and to an outlet line 125 that leads to the atmosphere. Thus, each dispensing assembly 10 is in fluid communication with the pressurized gas source 200 and also with its respective release valve 109. A check valve 111 is positioned at the exterior end of the release valve 109.

As shown in FIGS. 11 to 13, a second valve 107 is located between the pressure chamber 60 and the venturi 108. The second valve 107 is preferably a two-way valve. The second valve 107 is in fluid communication with the pressure chamber 60 in the dispensing assembly 10 via line 127 and with the venturi 108 via line 137. A third valve 106 is connected to the pressurized gas source via line 112 through inlet port 110. The third valve 106 is preferably a two-way valve. The third valve 106 is connected to the venturi 108 by line 132. The second valve 10, the venturi 108, and the third valve 106 comprise a vacuum generator.

The two-way valves 106, 107 and the three-way valve 114 in the second preferred embodiment are preferably solenoid valves, and the release valve 109 is preferably a gas-driven valve. However, the present invention is not meant to be limited to the use of these types of valves, and other types of equivalent valves known to those skilled in the art are included in the present invention.

The base manifold 102 also comprises an exhaust port 126 to which a muffler 128 is attached, as illustrated in FIGS. 8 to 10. The exhaust port 126 is connected to the venturi 108 by line 130, as shown in FIGS. 11 to 13. Thus, each dispensing assembly 10, via its venturi 108, is in fluid communication with the exhaust port 126. Air or gas is exhausted from the exhaust port 126 through the muffler 128 as shown by arrow 208.

The connections among the dispensing assembly 10, the manifold assembly 100, and the pressurized gas source 200 are illustrated in FIGS. 11 to 13 and are discussed in more detail below.

ii. Regulation of the pressurized gas flow

FIGS. 11, 12a, 12b, and 13 provide schematic illustrations of the connections that are made among the dispensing assembly 10, the manifold assembly 100, and the pressurized gas source 200 in the various operating modes of the second preferred embodiment of the pneumatic dispensing control system 5 of the present invention. In the second preferred embodiment, as in the first preferred embodiment, the pneumatic dispensing control system 5 has three operating modes: a dispensing mode, shown in FIG. 11; an exhaust mode, shown in FIGS. 12a and 12b; and a retraction mode, shown in FIG. 13. For simplicity, FIGS. 11 to 13 illustrate a second preferred embodiment with only one dispensing assembly 10 connected to one manifold assembly 100. In the discussion below, it should be understood that a plurality of dispensing assemblies 10 can share a common pressurized gas source 200 via a manifold assembly 100 having an additional set of valves 106, 107, 109, 111, 114 and venturi 108 for each additional dispensing assembly 10. For example, FIGS. 8 to 10 illustrate a second preferred embodiment in which two dispensing assemblies 10 can be run from a single manifold assembly 100.

The pressurized gas source 200 in the second preferred embodiment illustrated in FIGS. 11 to 13 preferably comprises a 2.5-gallon storage tank containing air or gas pressurized to a pressure of at least 100 psi. It is to be understood that other types of pressurized gas or fluid sources are included under the teachings of the present invention. For example, a compressor can be used to maintain the pressurized air or gas. Other methods of providing pressurized air or gas (or other suitable fluid) will be evident to those skilled in the art, and the present invention is not meant to be limited by the particular description herein.

Pressurized air or gas at 100 psi flows directly via line 112 through the inlet port 110 to the third valve 106 and from the third valve 106 via line 132 to the venturi 108. For the first valve 114, however, the gas pressure is preferably regulated by a plurality of step-down pressure regulators 134 before the pressurized gas reaches the first valve 114. As shown in FIG. 11, the dispensing assembly 10 is connected to the pressurized gas source 200 by lines 112 and 118. On line 118 between the pressurized gas source 200 and the first valve 114 is located at least one step-down pressure regulator 134 to reduce the gas pressure from 100 psi to a range of about 15 to about 60 psi. In a preferred embodiment illustrated in FIG. 11, two step-down regulators 134, PR1 and PR2, are located on line 118 for the dispensing assembly 10. The first step-down regulator 134, PR1, reduces the gas pressure from about 100 psi to about 60 psi. The second step-down regulator 134, PR2, further reduces the gas pressure to between about 15 psi and about 60 psi. The second step-down regulator 134 PR2 provides a variable amount of gas pressure to the pressure chamber 60 in response to the amount of pull on the manual handle 302 (which is illustrated in FIG. 1), as discussed above for the first preferred embodiment.

iii. Release valve 109 and check valve 111

Figure 20:
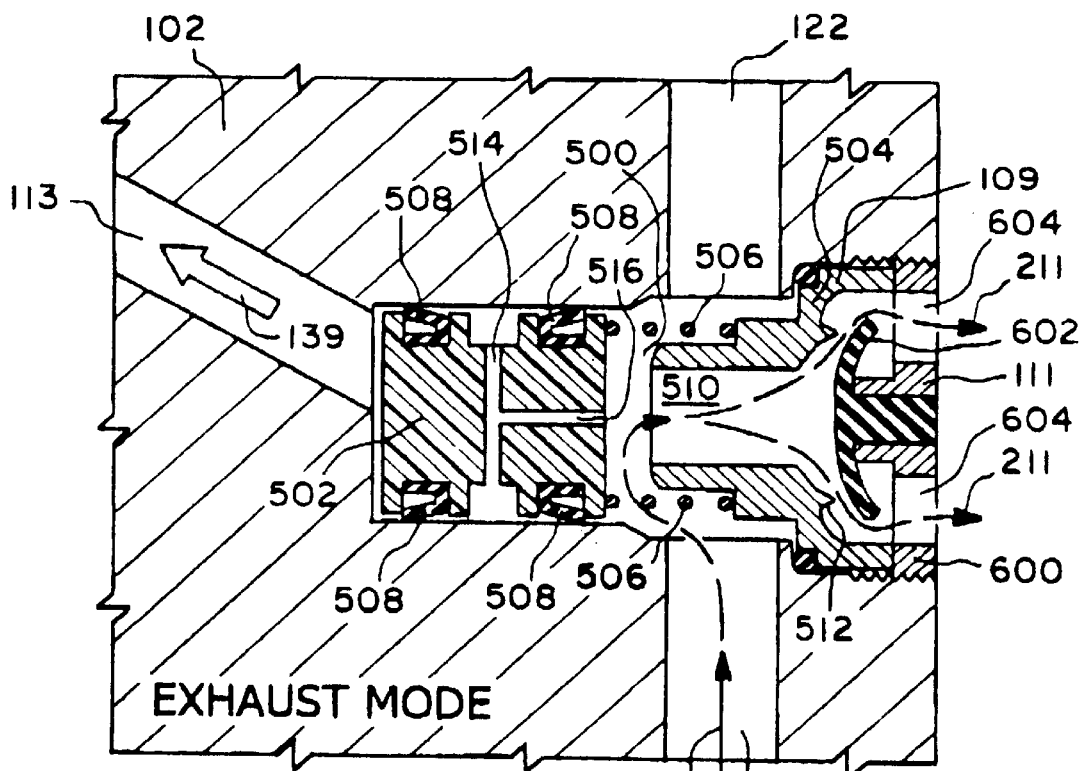
FIG. 20 is a partial cross-sectional view of a first embodiment of a release valve and a check valve of the present invention in the exhaust mode.
Figure 21:
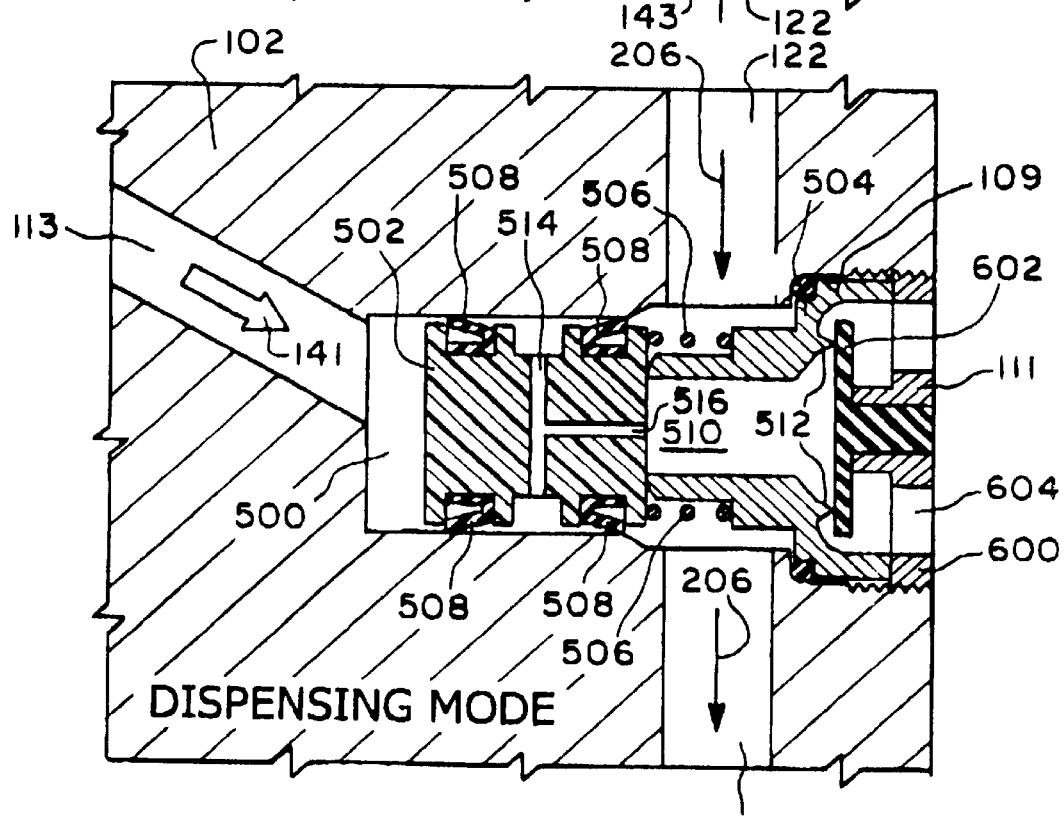
FIG. 21 is a partial cross-sectional view of the first embodiment of the release valve and check valve of the present invention in the dispensing mode.

The release valve 109 and check valve 111 are illustrated in more detail in FIGS. 20 to 22. A cavity 500 is formed into the base manifold 102 into which is fitted the release valve 109 and the check valve 111. The check valve 111 is placed at the exterior end of the release valve 109. The cavity 500 is in fluid communication with a signal input line 113 from the first valve 114 and with a line 122 which leads from the pressurized gas source 200 to the dispensing assembly 10 through the release valve 109.

The release valve 109 comprises a seal 502, 518 and a base 504 fitted within the cavity 500. The base 504 comprises an outlet 510 bored through the center of the base 504. A raised rim 512 surrounds the outlet 510 at the exterior end of the base 504 near the check valve 111. The seal is defined in this specification to mean an element that seals off the outlet 510 of the vase 504 by moving toward and abutting the outlet 510 when the signal input line 113 is pressurized. In a first preferred embodiment, illustrated in FIGS. 20 to 22, the seal is a shuttle 502. In a second preferred embodiment, illustrated in FIGS. 23 to 25, the seal is a diaphragm 518.

In the first preferred embodiment of the release valve 109 illustrated in FIGS. 20 to 22, a spring 506 is positioned between the shuttle 502 and the base 504 and surrounds a portion of the base 504. The shuttle 502 fits closely within the cavity 500. The shuttle 502 of the release valve 109 moves within the cavity 500 toward or away from the base 504 in response to changes in pressure in signal input line 113. A plurality of slideable seals 508 both assist the shuttle 502 to move in the cavity 500 and provide an air-tight sliding seal between the shuttle 502 and the sides of the cavity 500.

Figure 24:
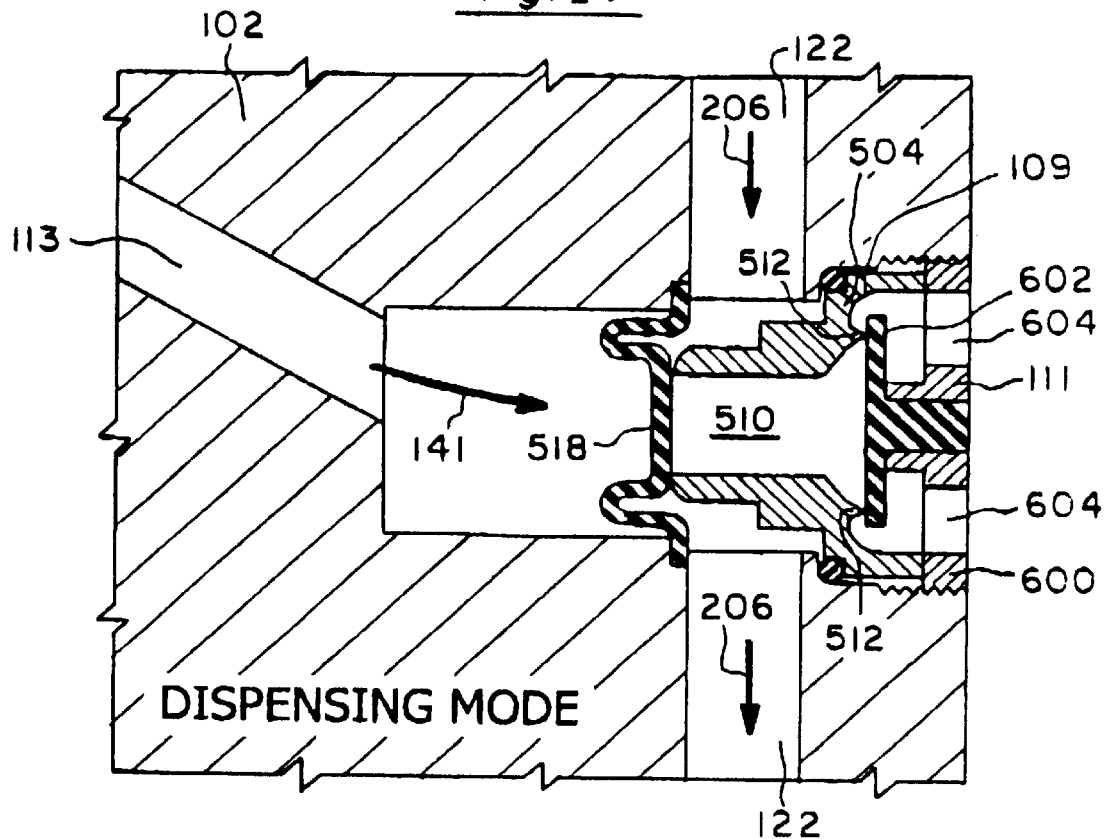
FIG. 24 is a partial cross-sectional view of the second embodiment of the release valve and check valve of the present invention in the dispensing mode.
Figure 25:
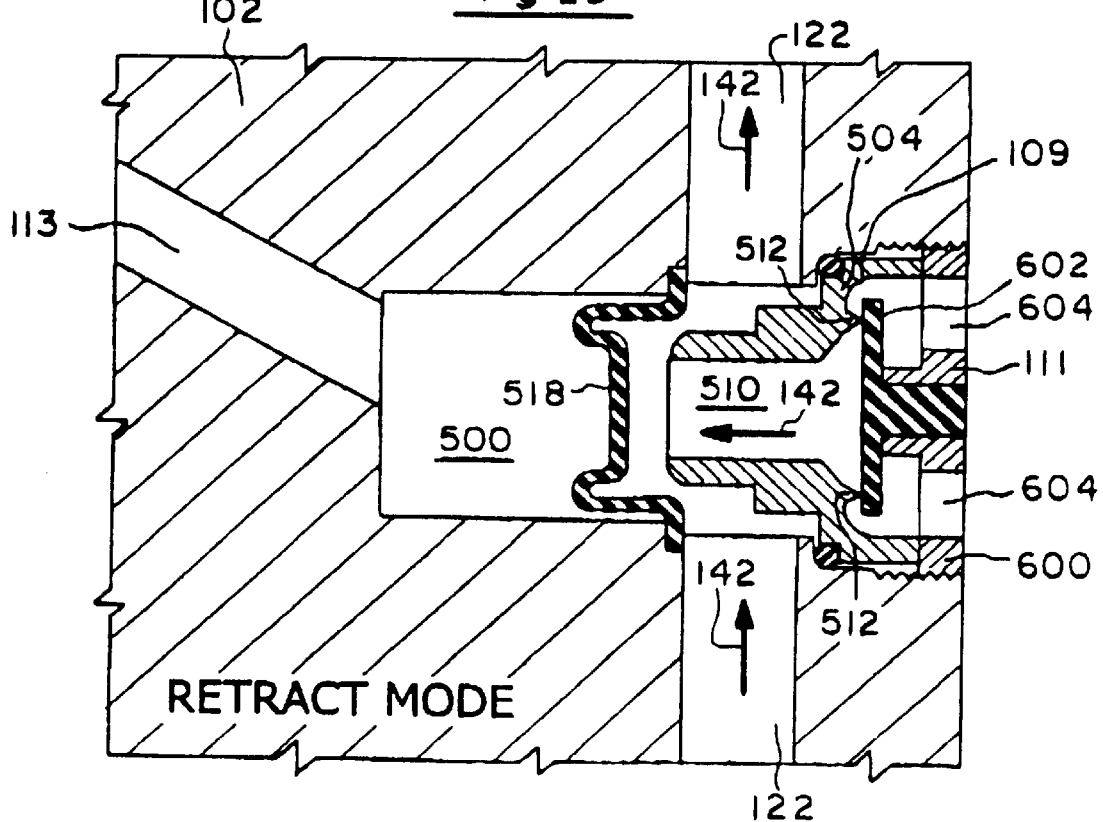
FIG. 25 is a partial cross-sectional view of the second embodiment of the release valve and check valve of the present invention in the retraction mode.

In the second preferred embodiment of the release valve 109 illustrated in FIGS. 23 to 25, the seal is a diaphragm 518 that is stretched across the cavity 500 near the base 504. The diaphragm 518 is preferably formed of rubber or other flexible material.

The check valve 111 comprises a base 600 that supports a flexible rubber disk 602. A plurality of outlet holes 604 are drilled into the base 600 and are in fluid communication with the outlet 510 of the release valve 109. The rubber disk 602 abuts the raised rim 512 of the base 504 of the release valve 109.

The release valve 109 is preferably a gas-driven valve. That is, the release valve 109 is opened and closed in response to changes in gas pressure in the signal input line 113. As described above, the signal input line 113 is in fluid communication with the pressurized gas source 200 via line 122 from the first valve 114. When it is desired to close the release valve 109, for example, in the dispensing mode as shown in FIGS. 11 and 21 and discussed in more detail below, the first valve 114 is opened between the pressurized gas source 200 and line 122 and thus to the signal input line 113. The first valve 114 is simultaneously closed to the outlet line 125. Thus, pressurized gas flows 141 as shown in FIG. 21 from the pressurized gas source 200 into line 122 and into the signal input line 113, increasing the pressure of the gas in the signal input line 113.

In the first preferred embodiment of the release valve 109 with a shuttle 502 (see FIG. 21), about 15 psi to about 60 psi is used to move the shuttle 502. (Although the shuttle 502 will move under a pressure of about 5 to about 10 psi, this amount of pressure is insufficient to hold the shuttle 502 in place against the dispensing pressure that is applied to the pressure chamber 60.) This pressure increase causes the shuttle 502 in the release valve 109 to move toward the base 504, blocking the outlet 510 and thus closing the release valve 109. By about the time the pressurized gas reaches the release valve 109, the shuttle 502 has closed. The pressurized gas flowing through line 122 thus moves around the base 504 of the release valve 109 toward the pressure chamber 60 rather than exiting through the outlet 510. This movement of the shuttle 502 toward the base 504 also compresses the spring 506. The rubber disk 602 abuts against rim 512 as fully illustrated in FIG. 21.

In the second preferred embodiment of the release valve 109 illustrated in FIGS. 23 to 25, the diaphragm 518 is formed and located so that its default position is the open or exhaust position illustrated in FIG. 23. When the dispensing mode is entered, as illustrated in FIG. 24, the first valve 114 is positioned as described above for the first embodiment of the release valve 109. When the pressurized gas flows into line 113, it pushes the diaphragm 518 firmly against the outlet 510 of the base 504 of the release valve 109, thus preventing the pressurized gas flowing through line 122 from exiting through the outlet 510.

When it is desired to open the exhaust valve 109, for example, in the exhaust mode described in FIGS. 12a, 12b, 20, and 23 and discussed in more detail below, the first valve 114 is closed between the pressurized gas source 200 and line 122 (and thus the signal input line 113) and simultaneously opened between line 122 and the signal input line 113 and the outlet 125 to the first valve 114. Thus, the pressurized gas in the signal input line 113 flows out through line 122 to the outlet 125 of the first valve 114, as shown by arrow 139 in FIG. 20, lowering the pressure of the gas in the signal input line 113. (There is also a small amount of pressurized gas flowing from the pressure chamber 60 through line 122 to the outlet 125.) This pressure decrease in signal input line 113 permits the spring 506 to push the shuttle 502 in the release valve 109 away from the base 504 as shown in FIG. 20 for the first embodiment, or permits the diaphragm 518 of the second embodiment to return to its default open position, as shown in FIG. 23. The pressure of the gas in line 122 also assists in pushing the shuttle 502 or the diaphragm 518 away from the base 504. The movement of the seal 502, 518 away from the base 504 opens the release valve 109 and allows the pressurized gas in the dispensing assembly 10 to exhaust through line 122 to the outlet 510 as shown by arrows 143 and 211. The exhausting gas 211 pushes against the rubber disk 602 of the check valve 111, opening the check valve 111 so that the gas can exhaust through the plurality of outlet holes 604 of the check valve 111.

FIGS. 22 and 25 illustrate the first and second embodiments, respectively, of the release valve 109 and the check valve 111 when the pneumatic dispensing control system 5 is in the retract mode, which is described in more detail below and in FIG. 13. In the retract mode, the seal 502, 518 is in the open position, because no pressurized gas is flowing into the signal input line 113. A vacuum 142 is generated in line 122, which is in fluid communication with the outlet 510 of the release valve 109, and the vacuum 142 thus extends through the outlet 510. The vacuum 142 pulls the rubber disk 602 of the check valve 111 against the raised rim 512 of the base 504 of the release valve 109, sealing the outlet 510 of the release valve 109 and preventing atmospheric air from entering the pneumatic dispensing control system 5 through the release valve 109.

Since up to about 60 psi pressurized gas may enter the signal input line 113 in the second preferred embodiment of the pneumatic dispensing control system 5, or up to 100 psi in the third preferred embodiment discussed below, it is important for safety reasons for this high pressure to be contained in the signal input line 113 and not to enter other parts of the pneumatic dispensing control system 5. The seal 502, 518 provides an airtight seal between the signal input line 113 and the other parts of the pneumatic dispensing control system 5. In the first embodiment of the release valve 109, the airtight seal is provided by the seals 508 placed around the shuttle 502. At least one seal 508 is placed around the shuttle 502, and preferably two seals 508 are used as shown in FIGS. 20 to 22.

U-cup seals 508 are preferably used in the present invention to seal the shuttle 502. The open end of the "U" is placed so that it faces toward the source of the pressurized gas, that is, toward line 113. Thus, if some pressurized gas should leak from line 113 around the edges of the shuttle 502, it will fill the U-cup seal 508, causing the seal 508 to expand against the side of the cavity 500 holding the shuttle 502 and seating the seal 508 more firmly against the side of the cavity 500. A similar seal 508 faces line 122, which may contain pressurized gas up to about 60 psi. Thus, the pressurized gas in signal input line 113 does not flow into line 122 to the dispensing assembly 10, nor does pressurized gas in line 122 flow into signal input line 113.

If, when the signal input line 113 and/or line 122 is pressurized, the U-cup seals 508 should fail, a back-up exhaust system exists to safely exhaust highly pressurized gas to the atmosphere. This exhaust system is illustrated in FIG. 21, in which the release valve 109 is shown in the dispensing mode. In this situation, the shuttle 502 is moved toward the base 504 by pressurized gas in the signal input line 113. Pressurized gas also flows 206 through line 122 around the base 504 to the dispensing assembly 10. The shuttle 502 has a first hole 514 bored through its diameter, and a second hole 516 bored partway through it at a 90-degree to the first hole 514 and in fluid communication with the first hole 514 and with the outlet 510 bored through the base 504. Any pressurized gas escaping around the U-cup seals 508 from line 113 or line 122 thus passes into the first hole 514 and through the second hole 516 and exits through the outlet 510 of the release valve 109.

The various gas flows through the release valve 109 and check valve 111 are described in more detail below.

iv. Dispensing Mode

In the dispensing mode shown in FIG. 11, when the manual handle 302 (shown in FIG. 1) of one of the dispensing assemblies 10 is actuated by an operator, signals are sent via line 84 (shown in FIG. 1) to the first valve 114 and the second 107 and third 106 valves connected to that dispensing assembly 10. For example, when the manual handle 302 of the dispensing assembly 10 labeled DIS in FIG. 11 is actuated, signals $A_1$, $A_2$, and $A_3$ are sent that simultaneously (1) open (signal $A_1$) the first (three-way) valve 114 labeled V3 in FIG. 11 between the pressurized gas source 200 and line 122 (and thus the signal input line 113 to the release valve 109) to the dispensing assembly 10 DIS, (2) close (signal $A_1$) the first valve 114 V3 between the pressurized gas source 200 and the outlet line 125 of the three-way valve 114, (3) close (signal $A_2$) the third (two-way) valve 106 labeled VI in FIG. 11 between the pressurized gas source 200 and the venturi 108 VENT, and (4) close (signal $A_3$) the second (two-way) valve 107 labeled V2 in FIG. 11 between the dispensing assembly 10 DIS and the venturi 108 VENT. Pressurized gas as reduced by the pressure regulators 134 PR1 and PR2 is thereby allowed to flow through line 118 through inlet port 116 to the first valve 114 V3 and then through line 122 from the first valve 114 V3 around the base 504 of the release valve 109 (as shown in FIG. 21) into the dispensing assembly 10 DIS as shown by the arrows 206. This flow 206 of pressurized gas causes the piston 50 to move toward the second end 26 of the receptacle 20, forcing the product 30 out of the spigot 76 of the pressure lid assembly 70, as shown in FIG. 1.

A portion of the pressurized gas flowing through the first valve 114 is diverted to the signal input line 113 leading from line 122 to the release valve 109 V4, as shown by arrow 141. The pressurized gas flowing 141 into the signal input line 113 closes the release valve 109 V4 as described above, thus preventing pressurized gas flowing through line 122 from escaping the pneumatic dispensing control system 5 through the release valve 109 V4.

When the operator of the dispenser assembly 10 DIS wishes to increase the dispense rate of the product 30 (or to dispense harder product 30), the operator pulls harder on the manual activating handle 302 shown in FIG. 1. This harder pull activates a signal $A_4$ that goes to the step-down pressure regulator 134 PR2. Signal $A_4$ signals the pressure regulator 134 PR2 to provide more pressure to the dispensing assembly 10 DIS in order to increase the force applied by the piston 50, so that the dispense rate of the product 30 is increased. Up to about 60 psi pressure can be delivered to the dispensing assembly 10 DIS. In the event that the piston 50 becomes stuck due to frost in the receptacle 20 or for another reason, the operator can provide more pressure to the piston 50 in the same manner, by pulling harder on the manual activating handle 302.

V. Exhaust Mode

Figure 12A:
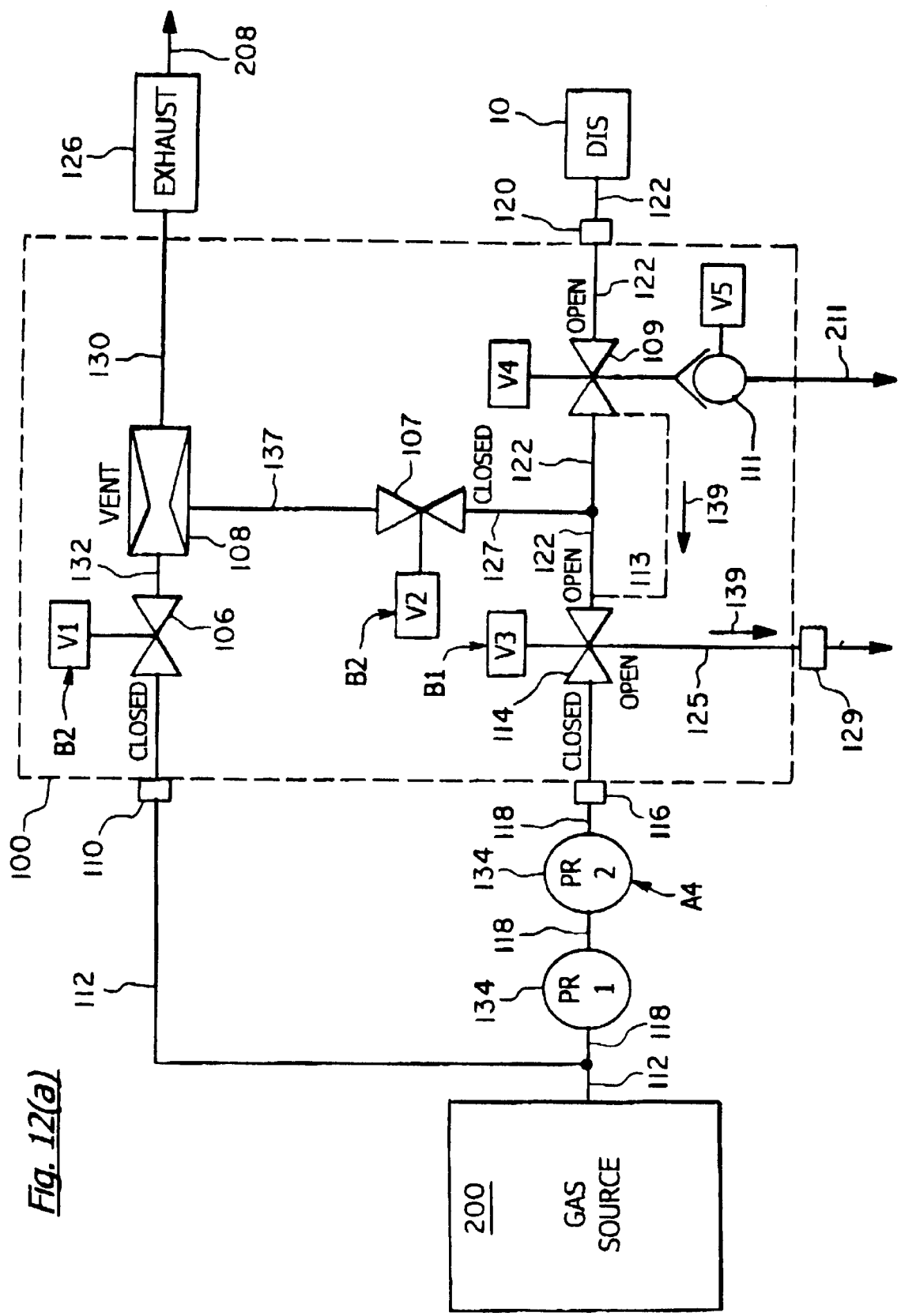
FIG. 12a is a schematic view illustrating the second preferred embodiment of the pneumatic dispensing control system in the first part of the exhaust mode.
Figure 12B:
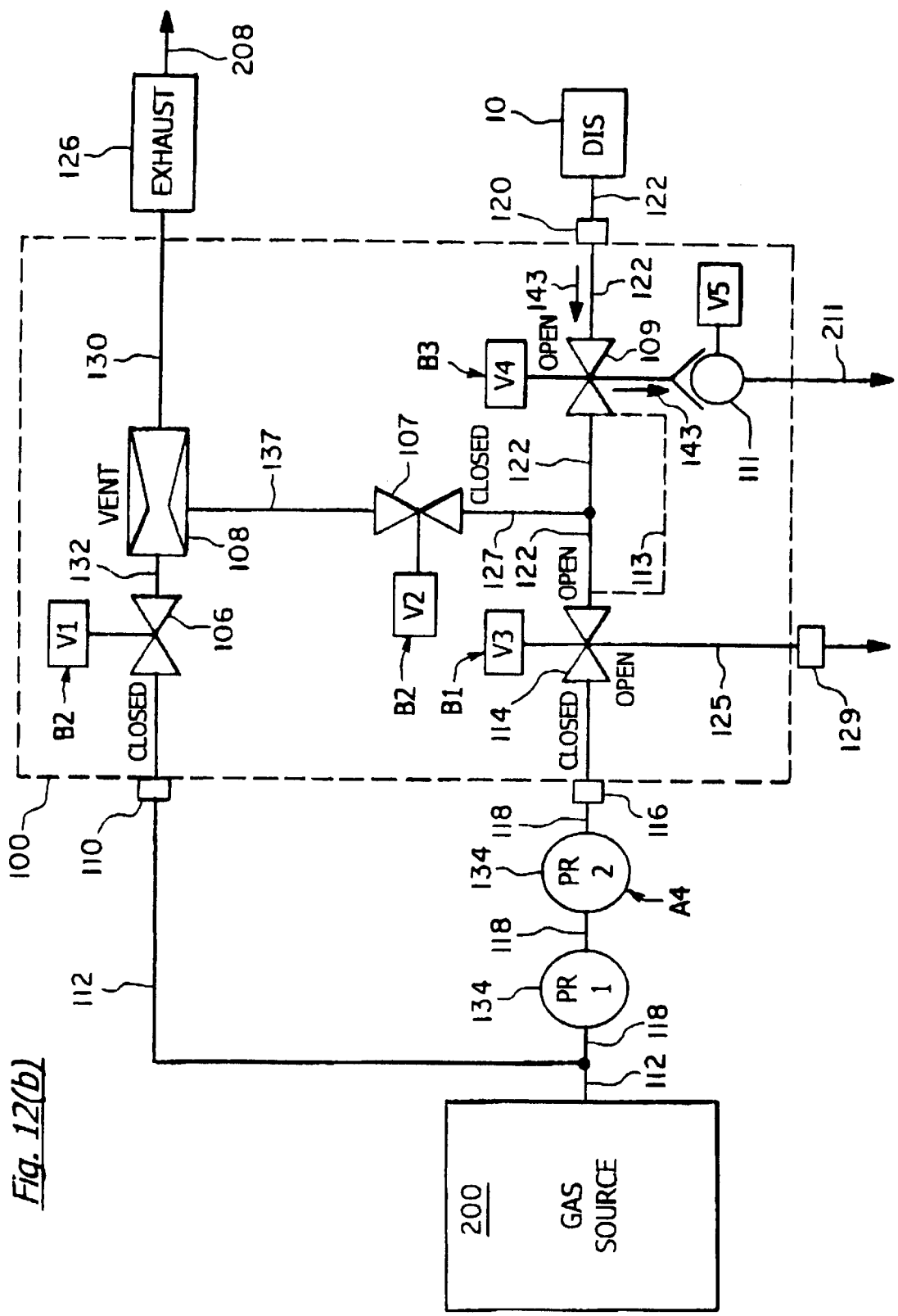
FIG. 12b is a schematic view illustrating the second preferred embodiment of the pneumatic dispensing control system in the second part of the exhaust mode.
Figure 13:
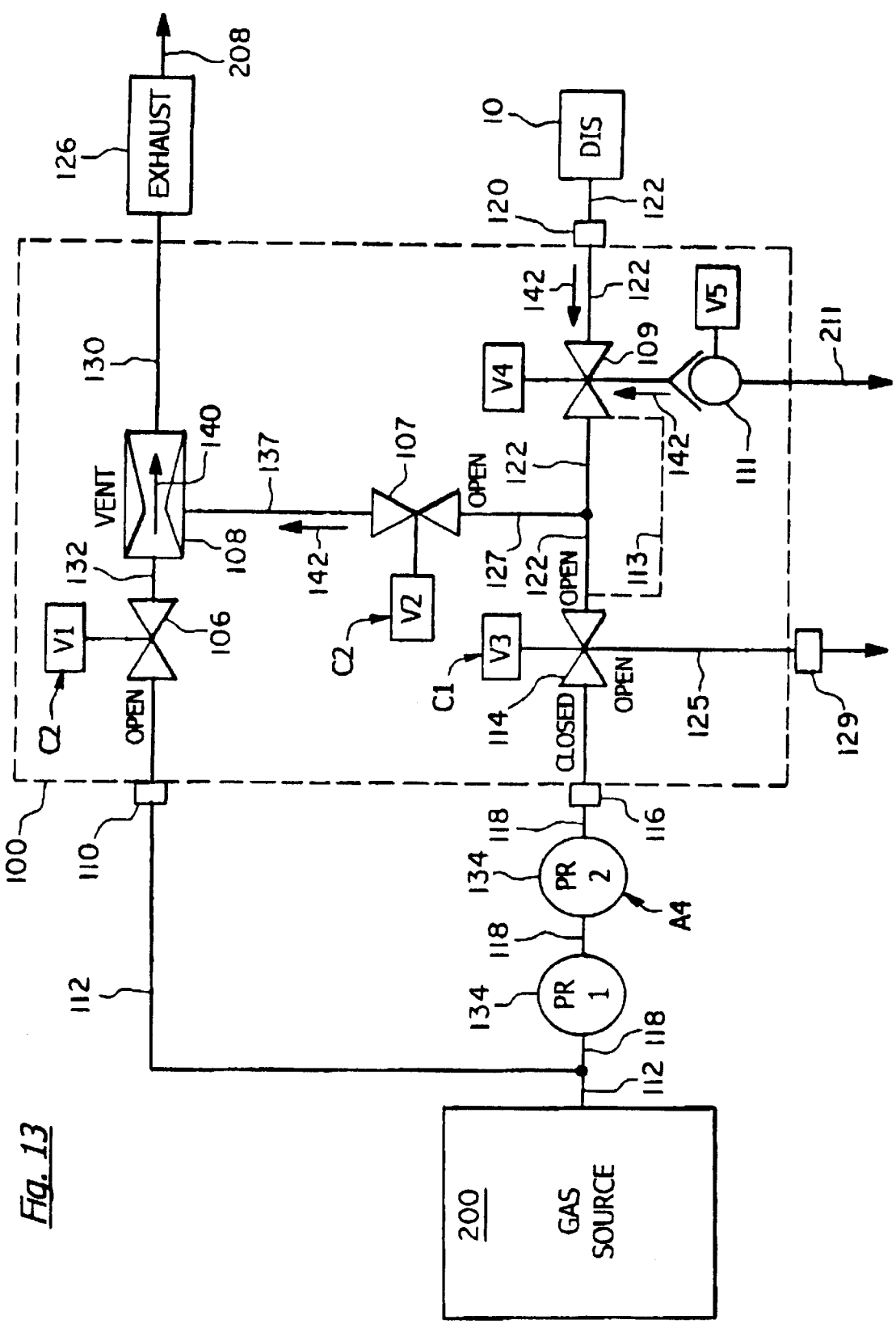
FIG. 13 is a schematic view illustrating the second preferred embodiment of the pneumatic dispensing control system in the retraction mode.

When the manual handle 302 of the dispensing assembly 10 is not actuated, the pneumatic dispensing control system 5 is placed in the exhaust mode, as illustrated in FIGS. 12a, 12b, and 20. The exhaust mode is the "default" mode of the pneumatic dispensing control system 5, that is, the pneumatic dispensing control system 5 is in the exhaust mode at all times when it is not either dispensing product or retracting the piston 50. The exhaust mode is also triggered when the door to the casing containing the pneumatic dispensing control system 5 is opened, as described above for the first preferred embodiment. The door switch 400 (illustrated in FIG. 7) sends the appropriate signals as described below to the pneumatic dispensing control system 5 to enter the exhaust mode when the door is opened.

Two steps must occur to place the pneumatic dispensing control system 5 in the exhaust mode. As shown in FIG. 12a, in a first step of the exhaust mode, the second 107 and third 106 valves are closed. The first valve 114 is closed between the pressurized gas source 200 and line 122 and is opened between line 122 (and thus the signal input line 113 of the release valve 109) and the outlet line 125 of the first valve 114. This allows the pressurized gas in the signal input line 113 to exhaust as shown by arrows 139 (see also FIG. 20), lowering the pressure in the signal input line 113, thus signaling the release valve 109 to open as described above and as shown in FIG. 20. Thus, in the first step of the exhaust mode, the position of the first valve 114 allows only the pressurized gas in the signal input line 113 to flow through the first valve 114 and be exhausted through the outlet line 125, as shown by arrows 139 (FIG. 20). (Although some pressurized gas will also move from the pressure chamber 60 through 122 to the outlet line 125, this amount of pressure release is negligible.)

When the pressurized gas in the signal input line 113 is exhausted to atmosphere through the outlet line 125, the pneumatic dispensing control system 5 enters the second step of the exhaust mode, as illustrated in FIG. 12b. When the pressure of the gas in the signal input line 113 is lowered, the release valve 109 opens between the dispensing assembly 10 and the atmosphere, thus exhausting the pressurized gas in the dispensing assembly 10 via line 122 through the outlet 510 of the release valve 109, as shown by arrows 143 and 211. The pressure of the exhausting gas 211 pushes open the rubber disk 602 of the check valve 111 and the gas flows out the plurality of outlet holes 604 in the base 600 of the check valve 111. The pressurized gas in the dispensing assembly 10 is thus more quickly exhausted than is possible in the first preferred embodiment, in which the gas is exhausted solely through the narrow venturi 108. It is to be understood that a larger or more outlet holes 604 would decrease the exhaust time further.

The second valve 107 between the dispensing assembly 10 and the venturi 108 and the third valve 106 between the pressurized gas source 200 and the venturi 108 remain closed during both steps of the exhaust mode. Thus, the pressure inside the dispensing assembly 10 is quickly reduced to atmospheric pressure and the piston 50 stops moving.

For example, after the desired amount of product 30 has been dispensed from dispensing assembly 10 DIS during the dispensing mode as described above and in FIG. 11, the manual handle 302 (shown in FIG. 1) is released by the operator. In the first step of the exhaust mode, signals $B_1$ and $B_2$ are sent by this release that simultaneously (1) close (signal $B_1$) the first valve 114 V3 between the pressurized gas source 200 and line 122 to the dispensing assembly 10 DIS, (2) open (signal $B_1$) the first valve 114 V3 between line 122 (and thus the signal input line 113) and the outlet line 125, (3) close (signal $B_2$) the third valve 106 VI between the pressurized gas source 200 and the venturi 108 VENT, and (4) close (signal $B_2$) the second valve 107 V2 between the dispensing assembly 10 DIS and the venturi 108 VENT, as illustrated in FIG. 12a. The pressurized gas within the signal input line 113 thereby flows to the first valve 114 V3 and exits through outlet line 125, as shown by arrows 139 (FIGS. 12a, 20, and 23).

When the signal input line 113 is depressurized, the second step of the exhaust mode begins as illustrated in FIG. 12b. A signal $B_3$ is sent by the depressurization of the signal input line 113 to the release valve 109 V4, opening the release valve 109 V4 between the dispensing assembly 10 DIS and the outlet 510 of the release valve 109 V4. Signal $B_3$ consists of the reduction in pressure of the gas in the signal input line 113, which causes the seal 502, 518 to move away from the base 504 as shown in FIGS. 20 and 23 and described above. In the case of using a solenoid-controlled valve 109, then $B_3$ would be a suitable electric control signal. The pressurized gas in the dispensing assembly 10

DIS is thereby allowed to flow from the dispensing assembly 10 through line 122 to the release valve 109 V4, as shown by the arrows 143, and then through the outlet 510 of the release valve 109 V4 and through the plurality of outlet holes 604 of the check valve 111 to the atmosphere, as shown by arrows 211. In this manner the gas pressure inside the dispensing assembly 10 is quickly reduced from about 15 to 60 psi to ambient atmospheric pressure. The reduction in gas pressure in the second preferred embodiment is significantly faster than can be achieved by exhausting the pressurized gas through the venturi 108 as done in the first preferred embodiment.

vi. Retraction Mode

There are times when it is necessary to move the piston 50 away from the second end 26 and toward the first end 24 of the receptacle 20, that is, away from the dispensing end. For example, when all the product 30 has been dispensed, the piston 50 will be located close to the second end 26 of the receptacle 20, and must be moved in order to insert more of the product 30. Or, after the product 30 has been dispensed, it may be necessary to clean the dispensing assembly 10.

FIG. 13 illustrates the positions of the valves 106, 107, 109, 114 that enable the piston 50 to be rapidly retracted from the second end 26 toward the first end 24 by using a vacuum generator to generate a vacuum in the pressure chamber 60 (shown in FIG. 1) of the dispensing assembly 10. The vacuum generator comprises the venturi 108, the second valve 107 between the venturi 108 and the pressure chamber 60, and the third valve 106 between the pressurized gas source 200 and the venturi 108.

The operator initiates the retraction of the piston 50 by moving the switch 308 on the control panel 300 (shown in FIG. 1) to the top position, indicated by R in FIG. 1, or the retract mode is initiated automatically by a signal from the sensors 80 as described above. The switch 308 or the automatic signal sends signal $C_1$ to the first valve 114 and signal $C_2$ to the second and third valves 106, 107. No signal is sent by the switch 308 to the release valve 109, which is closed by another method as described below. For example, to retract the piston 50 in the dispensing assembly 10 labeled DIS in FIG. 13, the first valve 114 V3 is closed by signal $C_1$ between the pressurized gas source 200 and line 122 and is opened by signal $C_1$ between line 122 (and thus the signal input line 113) and the outlet line 125, as was the situation in the first step of the exhaust mode described above and in FIG. 12a and 21.

In the retraction mode, however, the second valve 107 V2 is opened by signal $C_2$ between the dispensing assembly 10 DIS and the venturi 108 VENT. At the same time, the third valve 106 VI is opened by signal $C_2$ between the pressurized gas source 200 and the venturi 108 VENT, allowing pressurized gas at 100 psi to flow through the venturi 108 VENT as shown by arrow 140 and out the exhaust port 126 as shown by arrow 208. The pressurized gas flowing 140 through the venturi 108 VENT increases in velocity as it passes through the venturi 108 VENT. This increase in velocity causes a corresponding decrease in the gas pressure, which generates a vacuum (shown by arrows 142) in lines 137 and 127 and then in the pressure chamber 60 of the receptacle 20 of the dispensing assembly 10 DIS. This vacuum 142 retracts the piston 50 from the second end 26 of the receptacle 20 toward the first end 24, as shown in FIG. 1.

The flow 140 of the pressurized gas through the venturi 108 VENT also generates a vacuum 142 in the release valve 109 V4 via line 122, as shown in FIG. 22. This vacuum 142 would normally pull air into the release valve 109 V4 through the outlet 510. However, the check valve 111 V5 is placed at the outlet 510 of the release valve 109 V4, as shown in FIG. 22. The vacuum 142 pulls the rubber disk 602 of the check valve 111 V5 tightly against the raised rim 512 of the outlet 510 of the release valve 109 V4, thus preventing atmospheric air from entering the pneumatic dispensing control system 5 through the release valve 109 V4.

Atmospheric air may enter through the outlet line 125 of the first valve 114 during the retraction mode, but the rate of air infiltration is negligible and does not affect piston retraction performance. A second check valve (not illustrated) may be attached to the outlet line 125 of the first valve 114 if desired to prevent such air infiltration.

When the piston 50 has been retracted the desired amount, as determined either visually or with a sensor 80 as shown in FIG. 1, the switch 308 is released by the operator and the valves 106, 107, 109, 114 are positioned so that the pneumatic dispensing control system 5 is in the "default" or exhaust mode, as described above and illustrated in FIGS. 12a and 12b. This allows ambient atmosphere to enter the dispensing assembly 10, displacing the vacuum, and the piston 50 therefore stops moving.

In an alternative embodiment, the switch 308 is a "momentary" switch. In this case, the operator moves the switch 308 to the top position R and immediately releases it, rather than holding it in place. This motion of the switch 308 both places the pneumatic dispensing control system 5 into the retraction mode and activates a "single-shot" timer (not illustrated). The timer ends the retraction process at a predetermined instant, for example, fifteen seconds after the switch 308 is released.

vii. Operation of the pneumatic dispensing control system 5

The operation of the various modes of the pneumatic dispensing control system 5 of the second preferred embodiment as described above and in FIGS. 11 to 13 is set forth in the following Table III.

TABLE III

| Mode | Manual handle 302 | Switch 308 | Signals | Signal sent to: |
|---|---|---|---|---|
| Dispensing | Pulled | Dispensing mode D | $A_1$ | Valve V3 |
|  |  |  | $A_2$ | Valve V1 |
|  |  |  | $A_3$ | Valve V2 |
|  | Pulled harder |  | $A_4$ | Regulator PR2 |
| Exhaust Step 1 | Released | Exhaust mode E | $B_1$ | Valve V3 |
|  |  |  | $B_2$ | Valves V1 & V2 |
| Exhaust Step 2 | Released | Exhaust mode E | $B_1$ | Valve V3 |
|  |  |  | $B_2$ | Valves V1 & V2 |
|  |  |  | $B_3$(gas) | Valve V4 |
| Retraction | Released | Retraction mode R | $C_1$ | Valve V3 |
|  |  |  | $C_2$ | Valves V1 & V2 |

It is to be expressly understood that the signals (i.e., A, B, and C) can be of any suitable electrical value required to open and close the valves of the present invention. For example, signal A could be high (i.e., +5 volts direct current) to open valve V3 and low (i.e., 0 volts direct current) to close valve V3. It is also to be understood that signal $B_3$ is gas driven.

B. Third Preferred Embodiment

A third preferred embodiment of the present invention is illustrated in FIGS. 14 through 19. In the third preferred embodiment, a plurality of valves 105, 106, 107, 109, 111, 115 are used to move the piston 50. The advantage of the third preferred embodiment over the second preferred embodiment is that the release valve 109 is controlled by a discrete signal to the signal input line 113 from a fourth valve 115 that is not connected to any other part of the pneumatic dispensing control system 5 except the pressurized gas source 200. This eliminates unwanted release of gas pressure when the dispensing pressure in the dispensing assembly 10 is reduced by returning the dispensing handle to its upright position when the regulator 134 PR2 is controlled by the dispensing handle. It also eliminates the need for a check valve on the outlet line 125 of the fourth valve 115 to prevent atmospheric air from entering during piston retraction.

i. Manifold Assembly 100

Figure 15A:
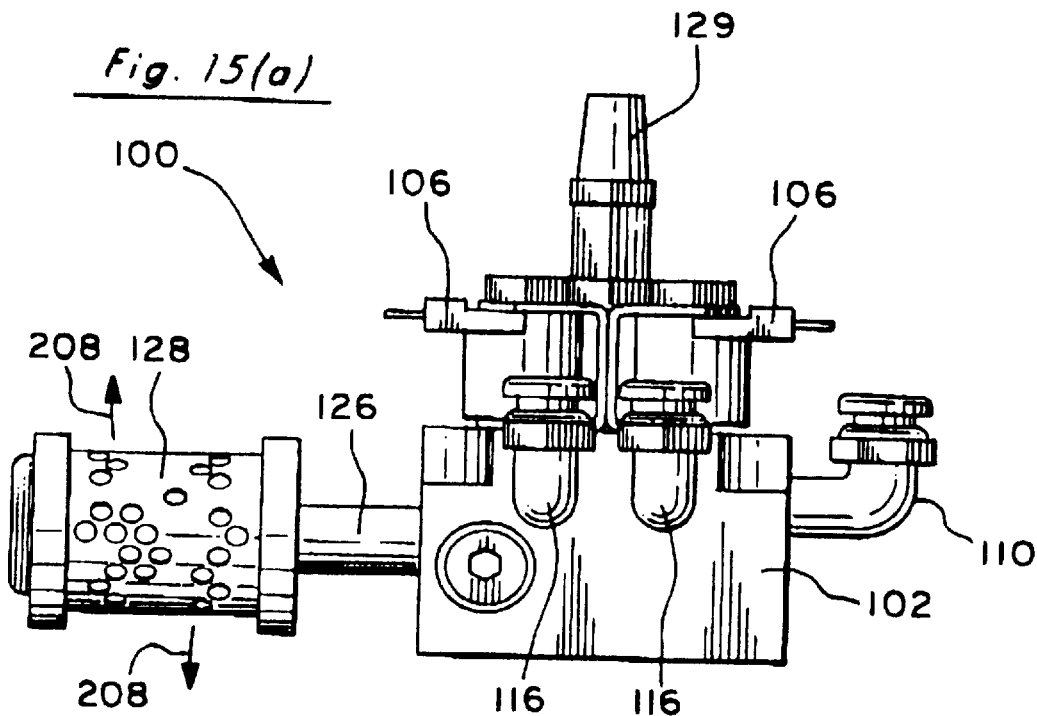
FIG. 15a is an end elevational view of the manifold of FIG. 14.
Figure 15B:
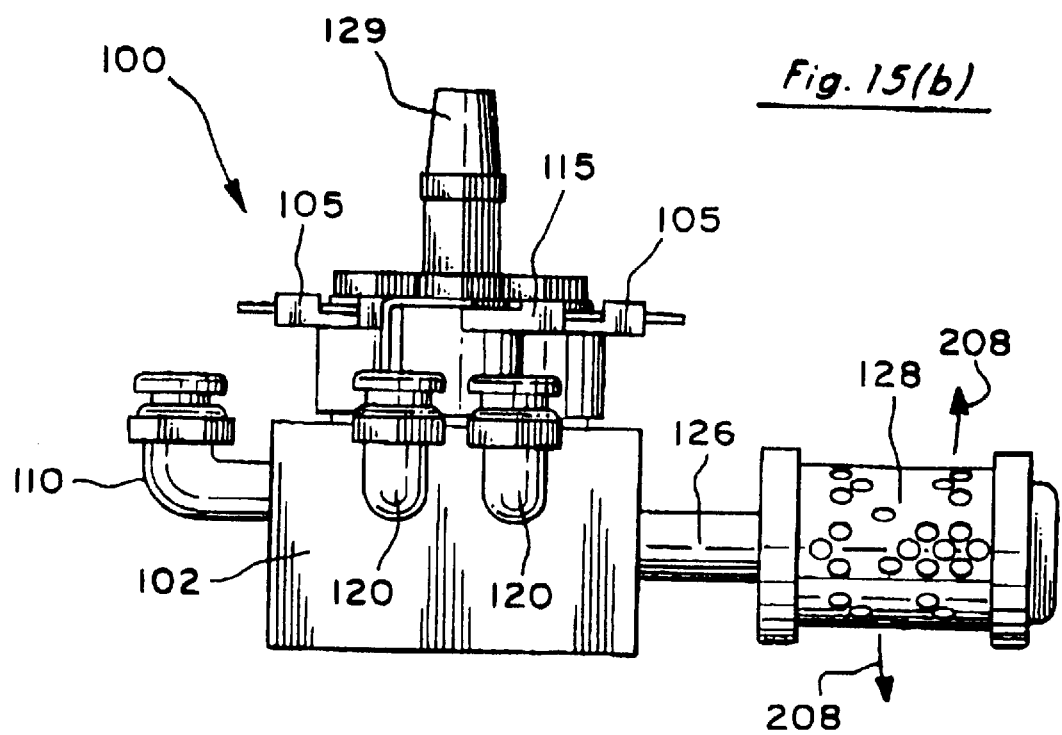
FIG. 15b is an end elevational view of the manifold of FIG. 14.
Figure 16A:
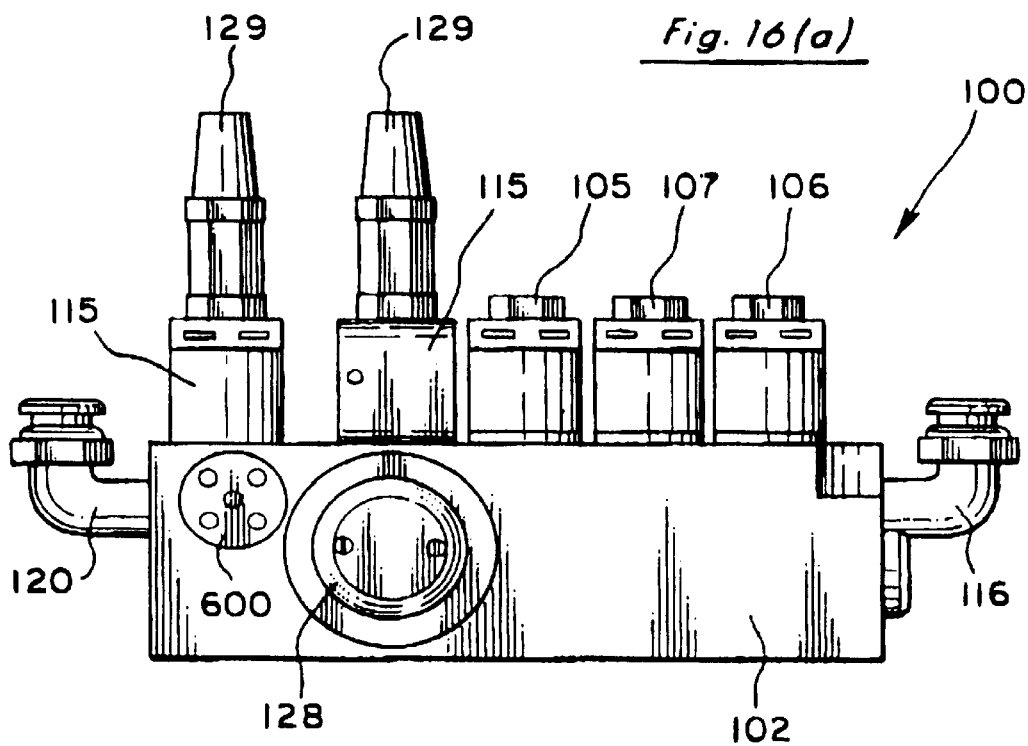
FIG. 16a is a side elevational view of the manifold of FIG. 14.
Figure 16B:
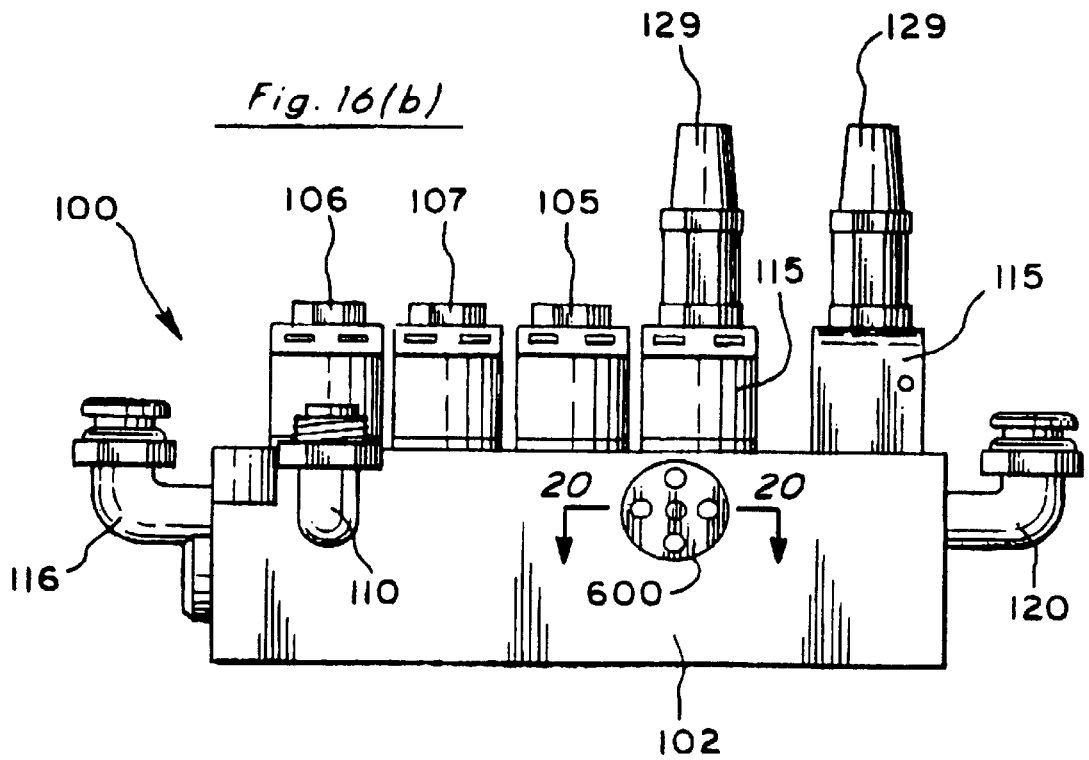
FIG. 16b is a side elevational view of the manifold of FIG. 14.
Figure 17:
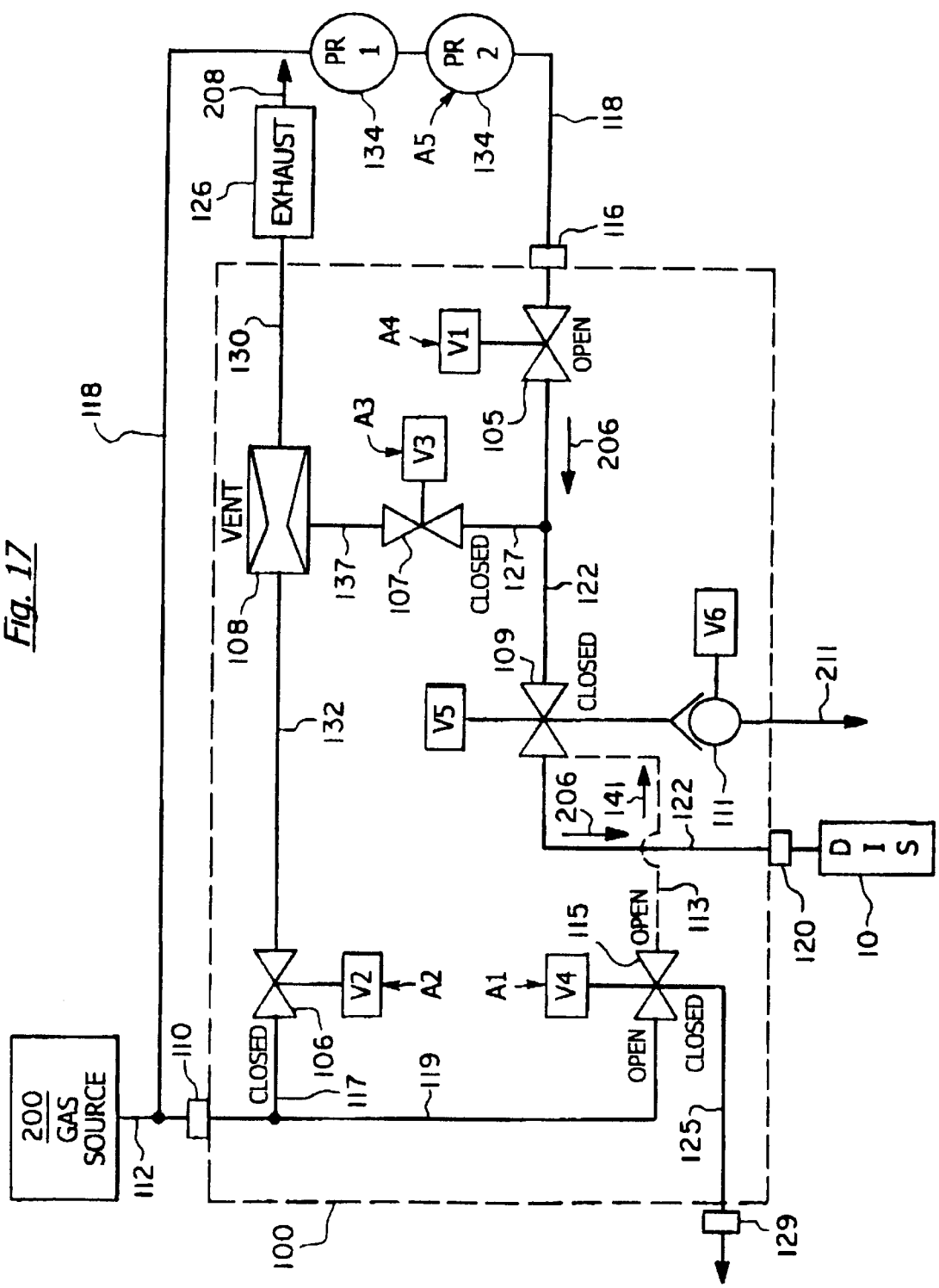
FIG. 17 is a schematic view illustrating the third preferred embodiment of the pneumatic dispensing control system in the dispensing mode.

FIGS. 14 through 16 illustrate the manifold assembly 100 of the third preferred embodiment. The manifold assembly 100 comprises a base manifold 102 atop which are placed a plurality of valves 105, 106, 107, 115. The base manifold 102 houses a plurality of venturis 108 (one of the plurality of venturis 108 is shown in FIGS. 17 to 19), a plurality of release valves 109, and a plurality of check valves 111 (as shown in FIGS. 14 to 16). The base manifold 102 also houses the connections between the plurality of valves 105, 106, 107, 109, 115 and the plurality of venturis 108.

The third preferred embodiment comprises a first valve 105, a second valve 107, a third valve 106, a fourth valve 115, a release valve 109, and a check valve 111 for each dispensing assembly 10 that is connected to the manifold assembly 100. For example, in FIGS. 14 to 16, two dispensing assemblies 10 can be connected via outlet ports 120 to the manifold assembly 100. The base manifold 102 includes at least one inlet port 116 for each dispensing assembly 10 and an inlet port 110, to which is attached a source of pressurized gas 200 (see FIG. 1). The pressurized gas source 200 is in fluid communication with the plurality of valves 105, 106, 107, 115 and venturis 108 via the connections contained by the base manifold 102 as illustrated in FIGS. 17 to 19. The pressurized gas source 200, via the plurality of valves 106 and venturis 108, is also in fluid communication via line 130 with an exhaust port 126 and muffler 128 that deliver exhausted gas 208 from the venturis 108 when the pneumatic dispensing control system 5 is in the retract mode, which is described in greater detail below.

For each dispensing assembly 10, a first valve 105 (shown atop the base manifold 102 in FIG. 14) is placed between the pressurized gas source 200 and the dispensing assembly 10. The first valve 105 is preferably a two-way valve in the third preferred embodiment, rather than a three-way valve as in the first and second embodiments described above. Line 118 (shown in FIGS. 17 to 19) supplies the pressurized gas from the pressurized gas source 200 to the first valve 105, and line 122 runs from the first valve 105 to the dispensing assembly 10. A second valve 107 is placed between the dispensing assembly 10 and the venturi 108. A third valve 106 is positioned between the pressurized gas source 200 and the venturi 108 and is supplied with pressurized gas by line 117 (shown in FIGS. 17 to 19). The second 107 and third 106 valves are preferably two-way valves.

Atop the base manifold 102 are also placed a plurality of fourth valves 115, one fourth valve 115 for each dispensing assembly 10 that is attached to the manifold assembly 100. The fourth valves 115 are preferably three-way valves. For example, the base manifold 102 shown in FIG. 14 can be attached to two dispensing assemblies 10 (which are not shown in FIG. 14), and therefore has two fourth valves 115, one for each dispensing assembly 10. Each fourth valve 115 is connected to the pressurized gas source 200 via lines 112 and 119 (as shown in FIG. 17) through which the pressurized gas 200 flows. Each fourth valve 115 is connected by a dedicated signal input line 113 to a release valve 109. Each fourth valve 115 is also connected by an outlet line 125 to a muffler 129 that leads to the atmosphere. Unlike the first and second preferred embodiments described above, there is no direct connection between the fourth valve 115 and the dispensing assembly 10.

Figure 18A:
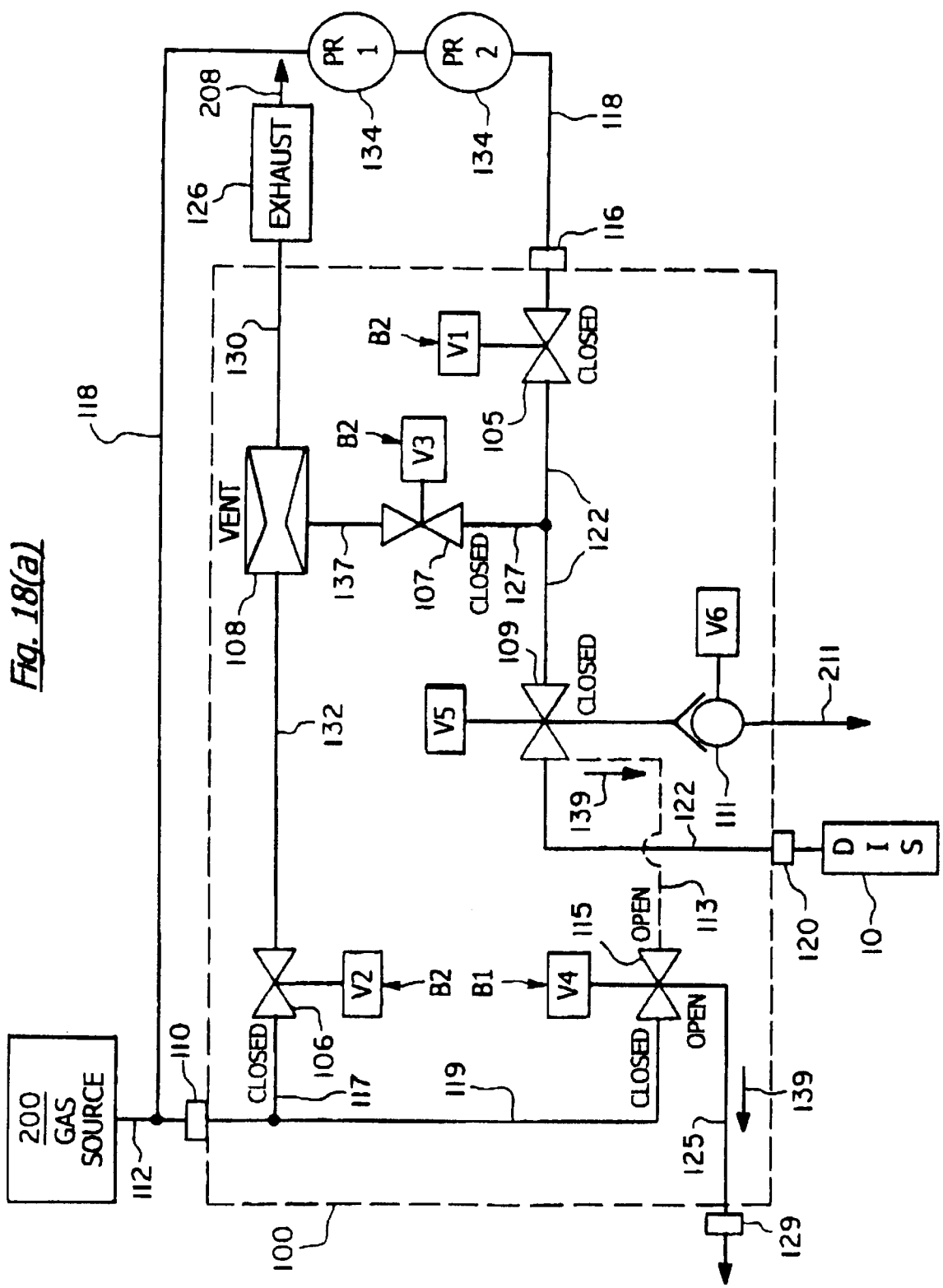
FIG. 18a is a schematic view illustrating the third preferred embodiment of the pneumatic dispensing control system in the first part of the exhaust mode.
Figure 18B:
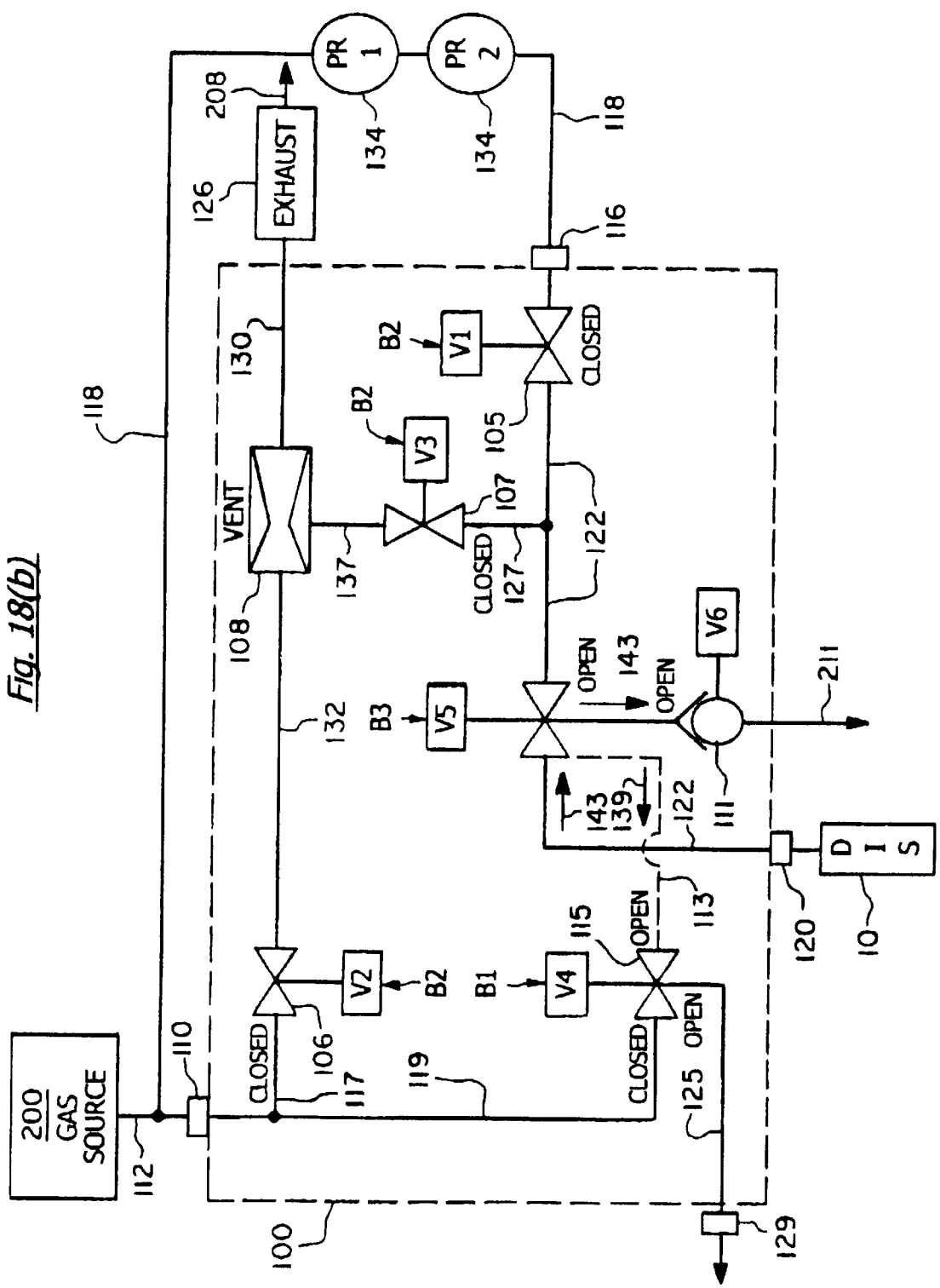
FIG. 18b is a schematic view illustrating the third preferred embodiment of the pneumatic dispensing control system in the second part of the exhaust mode.
Figure 19:
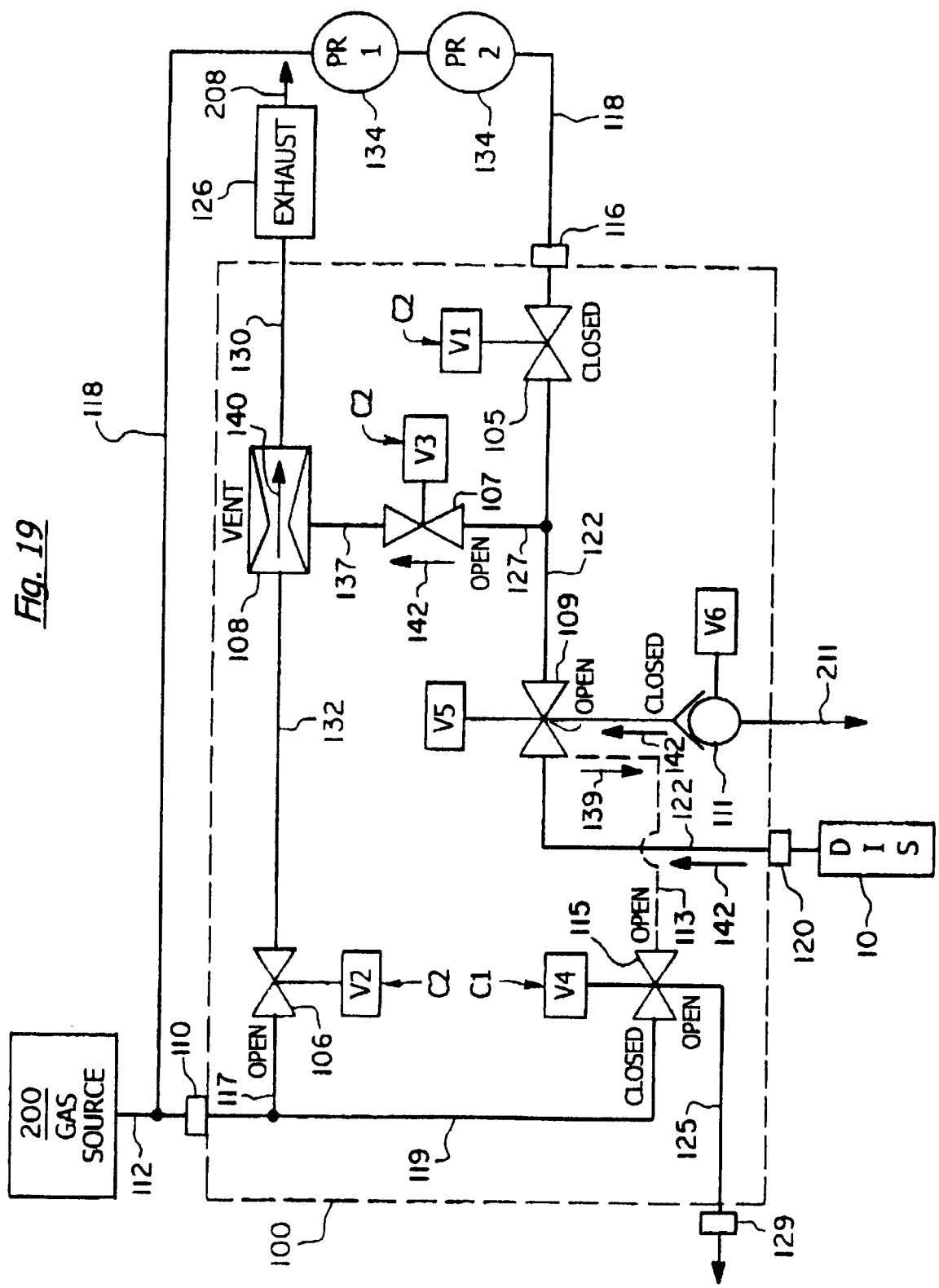
FIG. 19 is a schematic view illustrating the third preferred embodiment of the pneumatic dispensing control system in the exhaust mode.

A release valve 109 is in fluid communication with the dispensing assembly 10 via line 122 (shown in FIGS. 17 to 19). The release valve 109 is preferably a gas-driven valve as described above for the second embodiment. That is, the release valve 109 is opened and closed by a signal ($B_3$ in FIG. 18b) that is produced by the signal input line 113 in response to changes in gas pressure in the line 113. As described above, the signal input line 113 is in fluid communication with the pressurized gas source 200 via the fourth valve 115. When it is desired to close the release valve 109, for example, in the dispensing mode described below and in FIGS. 17, 21, and 24, the fourth valve 115 is opened between the pressurized gas source 200 and the signal input line 113. The fourth valve 115 is simultaneously closed to the outlet line 125. Thus, pressurized gas flows directly from the pressurized gas source 200 into the signal input line 113, increasing the pressure of the gas in the signal input line 113. This pressure increase closes the release valve 109 by moving the seal 502, 518 toward the base 504. When it is desired to open the release valve 109, for example, in the exhaust mode described below and in FIGS. 18A and 18B and 20, the fourth valve 115 is closed between the pressurized gas source 200 and the signal input line 113 and simultaneously opened between the signal input line 113 and the outlet 125 to the fourth valve 115. Thus, the pressurized gas in the signal input line 113 flows 139 out through the outlet line 125 of the fourth valve 115, lowering the pressure of the gas in the signal input line 113. This pressure decrease causes the seal 502, 518 to move away from the base 504, opening the release valve 109.

The two-way valves 105, 106, 107 and three-way valve 115 in the third preferred embodiment preferably are solenoid valves. The release valve 109 is preferably a gas-driven or air-piloted valve. However, the present invention is not meant to be limited to the use of these types of valves, and other types of valves that will be known to those skilled in the art are included in the present invention.

The base manifold 102 also comprises an exhaust port 126 to which a muffler 128 is attached, as illustrated in FIG. 14. The exhaust port 126 is connected to each venturi 108 by lines 130, as shown in FIGS. 17 to 19 for one venturi 108. Thus, each dispensing assembly 10, via its venturi 108, is in fluid communication with the exhaust port 126. Air or gas is exhausted from the exhaust port 126 through the attached muffler 128 as shown by arrow 208.

The connections among the dispensing assembly 10, the manifold assembly 100, and the pressurized gas source 200 are illustrated in more detail in FIGS. 17 to 19 and are discussed in more detail below.

ii. Regulation of the pressurized gas flow

FIGS. 17, 18a, 18b, and 19 provide schematic illustrations of the connections that are made between the dispensing assembly 10, the manifold assembly 100, and the pressurized gas source 200 in the various operating modes of the third preferred embodiment of the pneumatic dispensing control system 5 of the present invention. In the third preferred embodiment, as in the first and second preferred embodiments, the pneumatic dispensing control system 5 has three operating modes: a dispensing mode, shown in FIG. 17; an exhaust mode, shown in FIGS. 18a and 18b; and a retraction mode, shown in FIG. 19. For simplicity, FIGS. 17 to 19 illustrate a third preferred embodiment with only one dispensing assembly 10 connected to the manifold assembly 100. In the discussion below, it should be understood that a plurality of dispensing assemblies 10 can share a common pressurized gas source 200 via a single manifold assembly 100 having an additional set of valves 105, 106, 107, 109, 115 and venturi 108 for each additional dispensing assembly 10. For example, FIGS. 14 to 16 illustrate a third preferred embodiment in which two dispensing assemblies 10 can be run from a single manifold assembly 100.

The pressurized gas source 200 in the third preferred embodiment illustrated in FIGS. 17 to 19 comprises a 2.5-gallon storage tank containing air or gas pressurized to a pressure of at least 100 psi. It is to be understood that other types of pressurized gas sources are included under the teachings of the present invention. For example, a compressor can be used to maintain the pressurized air or gas. Other methods of providing pressurized air or gas (or other suitable fluid) will be evident to those skilled in the art, and the present invention is not meant to be limited by the particular description herein.

Pressurized air or gas at 100 psi flows directly via lines 112 and 117 to the third valve 106 and from the third valve 106 via a line 132 to the venturi 108. Pressurized gas at 100 psi also flows directly to the fourth valve 115 via lines 112 and 119. Pressurized gas is also directed to the first valve 105 via lines 112 and 118. However, for the first valve 105, the gas pressure is preferably regulated by a plurality of step-down pressure regulators 134 positioned on line 118 between the pressurized gas source 200 and the first two-way valve 105. For example, on line 118 between the pressurized gas source 200 and the first valve 105 is located at least one step-down pressure regulator 134 to reduce the gas pressure from 100 psi to a range of about 15 to about 60 psi. In the preferred embodiment illustrated in FIG. 17, two step-down regulators 134, PR1 and PR2, are located on line 118 between the pressurized gas source 200 and the first valve 105. The first step-down regulator 134, PR1, reduces the gas pressure from about 100 psi to about 60 psi. The second step-down regulator 134, PR2, further reduces the gas pressure to between about 15 psi and about 60 psi. The second step-down regulator 134 PR2 provides a variable amount of gas pressure to the pressure chamber 60 in response to the amount of pull on the manual handle 302 shown in FIG. 1, as discussed in more detail below.

a. Dispensing Mode

In the dispensing mode shown in FIG. 17, when the manual handle 302 (shown in FIG. 1) of one of the dispensing assemblies 10 is actuated by an operator, signals are sent via line 84 (shown in FIG. 1) to the valves 105, 106, 107, 115 connected to that dispensing assembly 10. For example, when the manual handle 302 of the dispensing assembly 10 labeled DIS in FIG. 17 is actuated, signals $A_1$, $A_2$, $A_3$, and $A_4$ are sent that simultaneously (1) open (signal $A_1$) the fourth valve 115 labeled V4 in FIG. 17 between the pressurized gas source 200 and the signal input line 113 to the release valve 109 V5, (2) close (signal $A_1$) the fourth valve 115 V4 between the pressurized gas source 200 and the outlet line 125 of the three-way valve 115 V4, (3) close (signal $A_2$) the third valve 106 labeled V2 in FIG. 17 between the pressurized gas source 200 and the venturi 108 VENT, (4) close (signal $A_3$) the second valve 107 labeled V3 in FIG. 17 between the dispensing assembly 10 and the venturi 108 VENT, and (5) open (signal $A_4$) the first valve 105 labeled VI in FIG. 17 between the pressurized gas source 200 and the dispensing assembly 10. Pressurized gas is thereby allowed to flow through line 118 to the first valve 105 VI and then through line 122 from the first valve 105 VI into the dispensing assembly 10 DIS as shown by arrows 206. This flow 206 of pressurized gas causes the piston 50 to move 52 toward the second end 26 of the receptacle 20, forcing the product 30 out of the spigot 76 of the pressure lid assembly 70, as shown in FIG. 1.

Pressurized gas at 100 psi flows through line 119 to the fourth valve 115 V4 and from the fourth valve 115 V4 to the release valve 109 V5 over signal input line 113, as shown by arrow 141. The pressurized gas flowing 141 into the signal input line 113 causes the release valve 109 V5 to close as described above and in FIGS. 21 and 24, thus preventing pressurized gas flowing 206 from the first valve 105 to the dispensing assembly 10 DIS from escaping through the outlet 510 of the release valve 109 V5.

When the operator of the dispenser assembly 10 DIS wishes to increase the dispense rate of the product 30, the operator pulls harder on the manual activating handle 302. This harder pull activates a signal $A_5$ that goes to the step-down pressure regulator 134 PR2. Signal $A_5$ signals the pressure regulator 134 PR2 to provide more pressure to the dispensing assembly 10 DIS, so that the dispense rate of the product 30 is increased. Up to about 60 psi pressure can be delivered to the dispensing assembly 10 DIS. In the event that the piston 50 becomes stuck due to frost in the receptacle 20 or for any other reason, the operator can provide more pressure to the piston 50 in the same manner, by pulling harder on the manual activating handle 302.

b. Exhaust Mode

When the manual handle 302 of the dispensing assembly 10 is not actuated, the pneumatic dispensing control system 5 is placed in the exhaust mode, as illustrated in FIGS. 18a, 18b, 20, and 23. The exhaust mode is the "default" mode of the pneumatic dispensing control system 5, that is, the pneumatic dispensing control system 5 is in the exhaust mode at all times when it is not either dispensing product or retracting the piston 50. The exhaust mode is also triggered when the door to the casing containing the pneumatic dispensing control system 5 is opened, as described above for the first preferred embodiment. The door switch 400 (illustrated in FIG. 7) sends the appropriate signals as described below to the pneumatic dispensing control system 5 to enter the exhaust mode when the door is opened.

Two steps must occur to place the pneumatic dispensing control system 5 in the exhaust mode. As shown in FIG. 18a, in a first step of the exhaust mode, all the two-way valves 105, 106, 107 are closed. The fourth valve 115 closes between the pressurized gas source 200 and the signal input line 113 and opens between the signal input line 113 and the outlet line 125 of the fourth valve 115. Thus, in the first step of the exhaust mode, the position of the fourth valve 115 allows only the pressurized gas in the signal input line 113 to flow through the fourth valve 115 and be exhausted through the outlet line 125 via the muffler 129, as shown by arrows 139 (FIG. 20).

When the pressurized gas in the signal input line 113 is exhausted to atmosphere through the outlet line 125, the pneumatic dispensing control system 5 enters the second step of the exhaust mode, as illustrated in FIG. 18b. When the pressure of the gas in the signal input line 113 is lowered,, the release valve 109 is signaled to open as described above between the dispensing assembly 10 and the atmosphere, thus exhausting the pressurized gas in the dispensing assembly 10 through the outlet 510 of the release valve 109, as shown by arrows 143 and 211. The pressurized gas in the dispensing assembly 10 is thus very quickly exhausted.

The first valve 105 between the pressurized gas source 200 and the dispensing assembly 10, the second valve 107 between the dispensing assembly 10 and the venturi 108, and the third valve 106 between the pressurized gas source 200 and the venturi 108 remain closed during this time. Thus, the pressure inside the dispensing assembly 10 is quickly reduced to atmospheric pressure and the piston 50 stops moving.

For example, after the desired amount of product 30 has been dispensed from dispensing assembly 10 DIS as described above and in FIG. 17, the manual handle 302 is released by the operator. In the first step of the exhaust mode shown in FIG. 18a, signals $B_1$ and $B_2$ are sent by this release that simultaneously (1) close (signal $B_1$) the fourth valve 115 V4 between the pressurized gas source 200 and the signal input line 113, (2) open (signal $B_1$) the fourth valve 115 V4 between the signal input line 113 and the outlet line 125, (3) close (signal $B_2$) the first valve 105 V1 between the pressurized gas source 200 and the dispensing assembly 10, (4) close (signal $B_2$) the second valve 107 V3 between the dispensing assembly 10 DIS and the venturi 108 VENT, and (5) close (signal $B_2$) the third valve 106 V2 between the pressurized gas source 200 and the venturi 108 VENT, as illustrated in FIG. 18a. The pressurized gas within the signal input line 113 thereby flows through line 113 to the fourth valve 115 V4 and out through outlet line 125, as shown by arrows 139. Any noise resulting from this exhaust flow 139 is muffled by the muffler 129 attached to outlet line 125.

When the signal input line 113 is depressurized, the second step of the exhaust mode begins as illustrated in FIG. 18b. A signal $B_3$ is sent by the depressurization of the signal input line 113 to the release valve 109 V5, causing the release valve 109 V5 to open between the dispensing assembly 10 DIS and the outlet 510 of the release valve 109 V5, as shown in FIG. 20. Signal $B_3$ consists of the reduction in pressure of the gas in the signal input line 113, which causes the seal 502, 518 to move away from the base 504 as shown in FIG. 20 and described above. In the case of using a solenoid-controlled valve 109, then $B_3$ would be a suitable electric control signal. The pressurized gas in the dispensing assembly 10 DIS is thereby allowed to flow from the dispensing assembly 10 through line 122 to the release valve 109 V5, as shown by arrows 143, and then through the outlet 510 of the release valve 109 to the atmosphere, as shown by arrow 211 (see FIG. 20). In this manner the gas pressure inside the dispensing assembly 10 is quickly reduced from about 15–60 psi to ambient atmospheric pressure. The reduction in gas pressure in the third preferred embodiment is significantly faster than can be achieved by exhausting the pressurized gas through the venturi 108 as done in the first preferred embodiment.

c. Retraction Mode

There are times when it is necessary to move the piston 50 away from the second end 26 and toward the first end 24 of the receptacle 20, that is, away from the dispensing end. For example, when all the product 30 has been dispensed, the piston 50 will be located close to the second end 26 of the receptacle 20, and must be moved in order to insert more of the product 30. Or, after the product 30 has been dispensed, it may be necessary to clean the dispensing assembly 10.

FIG. 19 illustrates the positions of the valves 105, 106, 107, 109, 115 that enable the piston 50 to be rapidly retracted from the second end 26 toward the first end 24 by using a vacuum generator to generate a vacuum in the pressure chamber 60 (shown in FIG. 1) of the dispensing assembly 10. The vacuum generator comprises the venturi 108, the second valve 107 between the venturi 108 and the pressure chamber 60, and the third valve 106 between the pressurized gas source 200 and the venturi 108.

The operator initiates the retraction of the piston 50 by moving the switch 308 on the control panel 300 (shown in FIG. 1) to the top position, indicated by R in FIG. 1. (Or the retraction mode can be started by an automatic signal from the sensors 80.) The switch 308 sends a signal $C_1$ to the three-way valve 115 and a signal $C_2$ to the two-way valves 105, 106, and 107. No signals are sent by the switch 308 to the release valve 109, which is closed by another method as described below. For example, to retract the piston 50 in the dispensing assembly 10 labeled DIS in FIG. 19, the fourth valve 115 V4 is closed by signal $C_1$ between the pressurized gas source 200 and the signal input line 113 and is opened by signal $C_1$ between the signal input line 113 and the outlet line 125, as was the situation in the first step of the exhaust mode described above and in FIGS. 18a and 21. This sends a signal to open the release valve 109 as in the exhaust mode; however, the release valve 109 is later closed by another method, as described below. As was also the case in the exhaust mode, the first two-way valve 105 VI receives a signal $C_2$ that closes the first two-way valve 105 V1 between the pressurized gas source 200 and the dispensing assembly 10 DIS.

In the retraction mode, the second two-way valve 107 V3 is opened by signal $C_2$ between the dispensing assembly 10 DIS and the venturi 108 VENT. At the same time, the third two-way valve 106 V2 is opened by signal $C_2$ between the pressurized gas source 200 and the venturi 108 VENT, allowing the pressurized gas to flow through the venturi 108 VENT as shown by arrow 140 and out the exhaust port 126 as shown by arrow 208. The pressurized gas flowing 140 through the venturi 108 VENT increases in velocity as it passes through the venturi 108 VENT. This increase in velocity causes a corresponding decrease in the gas pressure, which generates a vacuum (shown by arrows 142) in lines 137 and 127 and then in the pressure chamber 60 of the dispensing assembly 10 DIS. This vacuum 142 retracts the piston 50 from the second end 26 of the receptacle 20 toward the first end 24, as shown in FIG. 1.

The flow 140 of the pressurized gas through the venturi 108 VENT also generates a vacuum 142 in the release valve 109 V5 leading to the check valve 111 V6. This vacuum 142 causes the check valve 111 V6 to close the release valve 109 V5 by pulling the rubber disk 602 against the raised rim 512 of the outlet 510 of the release valve 109 V5, as shown in FIGS. 22 and 25, thus preventing atmospheric air from entering the pneumatic dispensing control system 5 through the release valve 109 V5.

When the piston 50 has been retracted the desired amount, as determined either visually or with a sensor 80 as shown in FIG. 1, the switch 308 is released by the operator and the valves 105, 106, 107, 109, 115 are positioned so that the pneumatic dispensing control system 5 is in the exhaust mode, as described above and illustrated in FIGS. 18a, 18b, 20, and 23. This allows ambient atmosphere to enter the dispensing assembly 10, displacing the vacuum, and the piston 50 therefore stops moving.

In an alternative embodiment, the switch 308 is a momentary switch. In this case, the operator moves the switch 308 to the top position R and immediately releases it, rather than holding it in place. This motion of the switch 308 both places the pneumatic dispensing control system 5 into the retraction mode and activates a single-shot timer (not illustrated). The timer ends the retraction process at a predetermined instant, for example, fifteen seconds after the switch 308 is released.

d. Operation of the pneumatic dispensing control system 5

The operation of the various modes of the pneumatic dispensing control system 5 as described above and in FIGS.

17–19 is set forth in the following Table IV.

TABLE IV

| Mode | Manual handle 302 | Switch 308 | Signals | Signal sent to: |
|---|---|---|---|---|
| Dispensing | Pulled | Dispensing mode D | $A_1$ | Valve V4 |
| | | | $A_2$ | Valve V2 |
| | | | $A_3$ | Valve V3 |
| | | | $A_4$ | Valve V1 |
| | Pulled harder | | $A_5$ | Regulator PR2 |
| Exhaust Step 1 | Released | Exhaust mode E | $B_1$ | Valve V4 |
| | | | $B_2$ | Valves V1, V2 & V3 |
| Exhaust Step 2 | Released | Exhaust mode E | $B_1$ | Valve V4 |
| | | | $B_2$ | Valves V1, V2 & V3 |
| | | | $B_3$(gas) | Valve V5 |
| Retraction | Released | Retraction mode R | $C_1$ | Valve V4 |
| | | | $C_2$ | Valves V1, V2 & V3 |

It is to be expressly understood that the signals (i.e., A, B, and C) can be of any suitable electrical value required to open and close the valves of the present invention. For example, signal A could be high (i.e., +5 volts direct current) to open valve V4 and low (i.e., 0 volts direct current) to close valve V4. It is also to be understood that signal B3 is preferably gas driven.

In both the second and third embodiments, a quick release of the pressurized gas in the dispensing assembly 10 is provided without going through the narrow venturi 108 and without having to provide an additional aperture in the dispenser 10. Although a particular design for the release valve 109 is disclosed in this specification, other equivalent designs could be provided.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A system for pneumatically dispensing a product, said system comprising:
   a receptacle having a passageway therein for holding said product, said receptacle having a first end and a second end;
   a free-floating piston within said passageway in said receptacle, said receptacle, said piston, and said first end defining a chamber;
   a pressurized gas source containing pressurized gas in fluid communication with said chamber,
   a first valve between said pressurized gas source and said chamber, whereby said pressurized gas flows through said first valve and into said chamber when said first valve is open, said pressurized gas causing said piston to move away from said first end and toward said second end, forcing said product out of said receptacle;
   a vacuum generator that generates a vacuum in said chamber, said system further comprising a second valve between said vacuum generator and said chamber, said vacuum extending through said second valve when said second valve is open between said vacuum generator and said chamber, said vacuum causing said piston to move toward said first end and away from said second end; and
   a release valve in fluid communication with said chamber, said pressurized gas in said chamber flowing through said release valve when said release valve is open.

2. The system of claim 1 wherein said vacuum generator further comprises:
   a venturi, said venturi in fluid communication with said chamber via said second valve; and
   a third valve between said venturi and said pressurized gas source.

3. The system of claim 1 wherein said release valve is gas driven.

4. The system of claim 1 further comprising a check valve attached to said release valve, said check valve closing said release valve when said vacuum generator generates a vacuum.

5. The system of claim 1 further comprising a container within said passageway between said piston and said second end, said container holding said product, said piston collapsing said container as said piston moves toward said second end.

6. The system of claim 1 further comprising a plurality of sensors attached to said receptacle, wherein said sensors determine the amount of said product dispensed, control the amount of said product dispensed, and determine the amount of said product remaining in said receptacle by sensing the position of said piston in said receptacle.

7. A system for pneumatically dispensing a product, said system comprising:
   a receptacle having a passageway therein for holding said product, said receptacle having a first end and a second end;
   a free-floating piston within said passageway in said receptacle, said receptacle, said piston, and said first end defining a chamber;
   a pressurized gas source containing pressurized gas in fluid communication with said chamber,
   a first valve between said pressurized gas source and said chamber, whereby said pressurized gas flows through said first valve and into said chamber when said first valve is open, said pressurized gas causing said piston to move away from said first end and toward said second end, forcing said product out of said receptacle;
   a vacuum generator that generates a vacuum in said chamber, said system further comprising a second valve between said vacuum generator and said chamber, said vacuum extending through said second valve when said second valve is open between said vacuum generator and said chamber, said vacuum causing said piston to move toward said first end and away from said second end;
   a release valve in fluid communication with said chamber, said pressurized gas in said chamber flowing through said release valve when said release valve is open; and
   a plurality of sensors attached to said receptacle, wherein said sensors determine the amount of said product dispensed, control the amount of said product dispensed, and determine the amount of said product remaining in said receptacle by sensing the position of said piston in said receptacle.

8. A system for pneumatically dispensing a product, said system comprising:
   a receptacle having a passageway therein for holding said product, said receptacle having a first end and a second end;
   a free-floating piston within said passageway in said receptacle between said first end and said second end, said receptacle, said piston, and said first end defining a chamber within said receptacle;

a pressurized gas source in fluid communication with said chamber;

a first valve between said pressurized gas source and said chamber;

a venturi in fluid communication with said chamber, said venturi being attached to an exhaust port;

a second valve between said chamber and said venturi;

a third valve between said pressurized gas source and said venturi; and a release valve in fluid communication with said chamber; said system operating in one of three modes:

(a) a dispensing mode, wherein pressurized gas from said pressurized gas source flows through said first valve and enters said chamber when said first valve is opened between said pressurized gas source and said chamber, said second valve is closed between said chamber and said venturi, said third valve is closed between said pressurized gas source and said venturi, and said release valve is closed, said pressurized gas moving said piston away from said first end and toward said second end, forcing said product out of said receptacle;

(b) an exhaust mode, wherein said pressurized gas in said chamber is exhausted from said chamber when said first valve is closed between said pressurized gas source and said chamber, said second valve is closed between said chamber and said venturi, said third valve is closed between said pressurized gas source and said venturi, and said release valve is opened, said pressurized gas exhausting from said system through said release valve; and (c) a retraction mode, wherein said first valve is closed between said chamber and said venturi, said second valve is opened between said chamber and said venturi, said third valve is opened between said pressurized gas source and said venturi, and said release valve is closed, said pressurized gas flowing through said venturi generating a vacuum in said chamber, said vacuum moving said piston toward said first end and away from said second end.

9. The system of claim 8 wherein said release valve is gas driven.

10. The system of claim 8 further comprising a check valve attached to said release valve, said check valve closing said release valve when said system is in said retraction mode.

11. The system of claim 8 further comprising a container within said passageway between said piston and said second end, said container holding said product, said piston collapsing said container as said piston moves toward said second end in said dispensing mode.

12. The system of claim 8 further comprising a plurality of sensors attached to said receptacle, wherein said sensors determine the amount of said product dispensed, control the amount of said product dispensed, and determine the amount of said product remaining in said receptacle by sensing the position of said piston in said receptacle.

13. A system for pneumatically dispensing a product, said system comprising:

a receptacle having a passageway therein for holding said product, said receptacle having a first end and a second end;

a free-floating piston within said passageway in said receptacle between said first end and said second end, said receptacle, said piston, and said first end defining a chamber within said receptacle;

a pressurized gas source in fluid communication with said chamber;

a first valve between said pressurized gas source and said chamber;

a venturi in fluid communication with said chamber;

a second valve between said chamber and said venturi;

a third valve between said pressurized gas source and said venturi;

a release valve in fluid communication with said chamber; and a fourth valve between said pressurized gas source and said release valve;

said system operating in one of three modes:

(a) a dispensing mode, wherein pressurized gas from said pressurized gas source flows through said first valve and enters said chamber when said first valve is opened between said pressurized gas supply and said chamber, said second valve is closed between said chamber and said venturi, said third valve is closed between said pressurized gas source and said venturi, said fourth valve is open between said pressurized gas source and said release valve, and said release valve is closed, said pressurized gas moving said piston away from said first end and toward said second end, forcing said product out of said receptacle;

(b) an exhaust mode, wherein said pressurized gas in said chamber is exhausted from said chamber when said first valve is closed between said pressurized gas source and said chamber, said second valve is closed between said chamber and said venturi, said third valve is closed between said pressurized gas source and said venturi, said fourth valve is closed between said pressurized gas source and said release valve, and said release valve is opened, said pressurized gas in said chamber exhausting from said system through said release valve; and (c) a retraction mode, wherein said first valve is closed between said pressurized gas source and said chamber, said second valve is opened between said chamber and said venturi, said third valve is opened between said pressurized gas source and said venturi, said fourth valve is closed between said pressurized gas source and said release valve, and said release valve is closed, said pressurized gas flowing through said venturi generating a vacuum in said chamber, said vacuum moving said piston toward said first end and away from said second end.

14. The system of claim 13 wherein said release valve is gas driven.

15. The system of claim 13 further comprising a check valve attached to said release valve, said check valve closing said release valve when said system is in said retraction mode.

16. The system of claim 13 further comprising a container within said passageway between said piston and said second end, said container holding said product, said piston collapsing said container as said piston moves toward said second end.

17. The system of claim 13 further comprising a plurality of sensors attached to said receptacle, wherein said sensors determine the amount of said product dispensed, control the amount of said product dispensed, and determine the amount of said product remaining in said receptacle by sensing the position of said piston in said receptacle.

18. A method for pneumatically dispensing a product, said method comprising the steps of:

providing a receptacle having a passageway therein to hold said product, said receptacle having a first end and a second end;

placing within said passageway a free-floating piston, said receptacle, said first end, and said piston defining a chamber;

delivering pressurized gas into said chamber through a first valve between said pressurized gas and said chamber, said pressurized gas causing said piston to move away from said first end and toward said second end, forcing said product out of said receptacle;

generating a vacuum with a vacuum generator in said chamber, said vacuum extending through a second valve into said chamber and causing said piston to move toward said first end and away from said second end;

exhausting said chamber through a release valve in fluid communication with said first valve and said chamber, said exhausting step further comprising the step of opening said release valve; and sensing the position of said piston by using a plurality of sensors attached to said receptacle, wherein said sensors determine the amount of said product dispensed, control the amount of said product dispensed, and determine the amount of said product remaining in said receptacle by sensing the position of said piston in said receptacle.

19. A method for pneumatically dispensing a product, said method comprising the steps of:

providing a receptacle having a passageway therein to hold said product, said receptacle having a first end and a second end;

placing within said passageway a free-floating piston, said receptacle, said first end, and said piston defining a chamber;

delivering pressurized gas into said chamber through a first valve between said pressurized gas and said chamber, said pressurized gas causing said piston to move away from said first end and toward said second end, forcing said product out of said receptacle;

generating a vacuum with a vacuum generator in said chamber, said vacuum extending through a second valve between said vacuum generator and said chamber into said chamber and causing said piston to move toward said first end and away from said second end, wherein said vacuum generator comprises:
a venturi; and
a third valve between said pressurized gas source and said venturi; and exhausting said chamber through a release valve in fluid communication with said chamber, said exhausting step further comprising the step of opening said release valve; and sensing the position of said piston by using a plurality of sensors attached to said receptacle, wherein said sensors determine the amount of said product dispensed, control the amount of said product dispensed, and determine the amount of said product remaining in said receptacle by sensing the position of said piston in said receptacle.

20. A method for pneumatically dispensing a product, said method comprising the steps of:

providing a receptacle having a passageway therein to hold said product, said receptacle having a first end and a second end;

placing within said passageway in said receptacle a free-floating piston, said receptacle, said first end, and said piston defining a chamber;

delivering pressurized gas from a pressurized gas source into said chamber through a first valve between said pressurized gas source and said chamber, said pressurized gas causing said piston to move away from said first end and toward said second end, said moving piston forcing said product out of said receptacle;

generating a vacuum with a vacuum generator in said chamber, said vacuum extending through a second valve between said vacuum generator and said chamber into said chamber and causing said piston to move toward said first end and away from said second end, wherein said vacuum generator comprises:
a venturi; and
a third valve between said pressurized gas source and said venturi; and exhausting said pressurized gas in said chamber through a release valve in fluid communication with said chamber, said exhausting step further comprising the step of opening said release valve by removing pressurized gas from said release valve via a fourth valve between said pressurized gas source and said release valve; and sensing the position of said piston by using a plurality of sensors attached to said receptacle, wherein said sensors determine the amount of said product dispensed, control the amount of said product dispensed, and determine the amount of said product remaining in said receptacle by sensing the position of said piston in said receptacle.

* * * * *